US012325949B2

(12) United States Patent
Bae et al.

(10) Patent No.: US 12,325,949 B2
(45) Date of Patent: Jun. 10, 2025

(54) LAUNDRY TREATING APPARATUS

(71) Applicant: LG Electronics Inc., Seoul (KR)

(72) Inventors: Yeeseok Bae, Seoul (KR); Juhan Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 657 days.

(21) Appl. No.: 17/667,024

(22) Filed: Feb. 8, 2022

(65) Prior Publication Data
US 2022/0251768 A1 Aug. 11, 2022

(30) Foreign Application Priority Data

Feb. 8, 2021 (KR) .................. 10-2021-0017561
Jan. 17, 2022 (KR) .................. 10-2022-0006695

(51) Int. Cl.
*D06F 58/24* (2006.01)
*D06F 58/08* (2006.01)
*F16J 15/06* (2006.01)
*H02K 5/10* (2006.01)

(52) U.S. Cl.
CPC .............. *D06F 58/24* (2013.01); *D06F 58/08* (2013.01); *F16J 15/062* (2013.01); *H02K 5/10* (2013.01)

(58) Field of Classification Search
CPC ......... D06F 58/24; D06F 58/08; F16J 15/062; H02K 5/10
USPC .................................................. 34/595–610
See application file for complete search history.

(56) References Cited

U.S. PATENT DOCUMENTS

| | | | | |
|---|---|---|---|---|
| 2,114,776 A | * | 4/1938 | Davis | D06F 43/08 68/19.2 |
| 8,984,767 B2 | * | 3/2015 | Grunert | D06F 58/45 68/5 R |
| 9,133,575 B2 | * | 9/2015 | Hong | D06F 25/00 |
| 9,335,095 B2 | * | 5/2016 | Bison | D06F 39/12 |
| 9,605,375 B2 | * | 3/2017 | Frank | D06F 58/44 |
| 9,863,704 B2 | * | 1/2018 | Vild | F26B 25/005 |

(Continued)

FOREIGN PATENT DOCUMENTS

| | | |
|---|---|---|
| CN | 105780417 A | 7/2016 |
| CN | 106939493 A | 7/2017 |

(Continued)

OTHER PUBLICATIONS

International Search Report and Written Opinion in International Application No. PCT/KR2022/001817, dated May 27, 2022, 8 pages.

(Continued)

*Primary Examiner* — Stephen M Gravini
(74) *Attorney, Agent, or Firm* — Fish & Richardson P.C.

(57) ABSTRACT

A laundry treating apparatus includes a cabinet, a drum, a base, a motor, a supply duct, a heat exchange unit, a duct cover, duct sealing unit, and sealing mount part. The base includes the supply duct in fluid communication with the drum, the heat exchange unit provided in the supply duct and including first and second heat exchangers, the duct cover coupled to an upper portion of the supply duct and covering the first and second heat exchangers, the duct sealing unit disposed between the supply duct and the duct cover and configured to block air in the supply duct from leaking, and the sealing mount part provided on a surface of the duct cover and configured to receive the duct sealing unit. The sealing mount part includes first and second sealing mount parts that are in fluid communication with each other and integrally provided as one body.

20 Claims, 41 Drawing Sheets

(56) References Cited

U.S. PATENT DOCUMENTS

| | | | |
|---|---|---|---|
| 10,544,539 B2* | 1/2020 | Bocchino | D06F 58/22 |
| 12,000,073 B2* | 6/2024 | Kellow | D06F 33/60 |
| 12,000,081 B2* | 6/2024 | Ekbundit | D06F 58/32 |
| 2014/0298671 A1 | 10/2014 | Lee et al. | |
| 2018/0245274 A1 | 8/2018 | Bocchino et al. | |
| 2022/0251766 A1* | 8/2022 | Bae | D06F 58/24 |
| 2022/0251767 A1* | 8/2022 | Bae | D06F 58/206 |
| 2022/0251768 A1* | 8/2022 | Bae | D06F 58/08 |
| 2022/0251769 A1* | 8/2022 | Bae | D06F 58/24 |

FOREIGN PATENT DOCUMENTS

| | | | | |
|---|---|---|---|---|
| CN | 111485408 A | | 8/2020 | |
| CN | 112088231 A | | 12/2020 | |
| CN | 114941223 A | * | 8/2022 | D06F 58/08 |
| EP | 2628846 | | 8/2013 | |
| EP | 3045581 | | 7/2016 | |
| EP | 3190225 | | 7/2017 | |
| EP | 4039878 A1 | * | 8/2022 | D06F 58/08 |
| KR | 20190128471 | | 11/2019 | |
| WO | WO 2014040923 | | 3/2014 | |
| WO | WO2019216631 | | 11/2019 | |
| WO | WO-2022169322 A1 | * | 8/2022 | D06F 58/08 |

OTHER PUBLICATIONS

Extended European Search Report in European Appln. No. 22155582.4, dated Jul. 12, 2022, 8 pages.

Office Action in Chinese Appln. No. 202210116719.6, mailed on May 1, 2025, 17 pages (with English translation).

* cited by examiner

- Related Art -

- Related Art -

- Related Art -

LAUNDRY TREATING APPARATUS

CROSS-REFERENCE TO RELATED APPLICATIONS

This application claims priority to and the benefit of Korean Patent Application Nos. 10-2022-0006695, filed on Jan. 17, 2022, and 10-2021-0017561, filed on Feb. 8, 2021, the disclosures of which are incorporated herein by reference in their entirety.

TECHNICAL FIELD

The present disclosure relates to a laundry treating apparatus, and more particularly, to a laundry treating apparatus including a driving unit directly connected to a drum so as to rotate the drum, where the drum is configured to receive laundry.

BACKGROUND

In general, laundry treating apparatuses are apparatuses configured to remove dust and foreign substances from laundry by applying physical force thereto, and include washers, dryers, clothes refreshers (i.e., clothes stylers), etc.

The washers are configured to perform a washing cycle in which foreign substances can be separated and removed from laundry by supplying water and detergent.

The dryers are classified into an exhaust-type dryer and a circulation-type dryer, and both dryers are configured in common to perform a drying cycle in which moisture is removed from laundry by producing hot air having a high temperature through a heater and exposing the laundry to the hot air.

Recently, a dryer can be configured to intensively perform the drying cycle by omitting components configured to supply water to laundry or to drain water and omitting a tub provided in a cabinet to receive water. Thereby, the inner structure of the dryer can be simplified, and drying efficiency can be improved by directly supplying hot air to the drum configured to accommodate the laundry.

Such a dryer can include a drum configured to accommodate laundry, a hot air supplier configured to supply hot air to the drum, and a driving unit configured to rotate the drum. The dryer can dry the laundry accommodated in the drum by supplying hot air to the inside of the drum, and can uniformly expose the surface of the laundry to hot air by rotating the drum. Consequently, drying of the laundry can be completed through uniform contact of the overall surface of the laundry with hot air.

In order to rotate the drum, the driving unit needs to be fixed to the inside of the cabinet. Further, when the driving unit is provided to rotate a rotating shaft coupled to the drum, the driving unit needs to be provided parallel to the rotating shaft. However, the dryer does not include a tub fixed to the inside of the cabinet, and thus has a difficulty in fixing the driving unit to the tub in the same manner as the washer.

In order to solve this drawback, a conventional dryer includes a driving unit fixed to the rear surface of a cabinet.

FIG. 1 is a diagram illustrating the structure of a conventional dryer including a driving unit fixed to the rear surface of a cabinet.

The conventional dryer can include a cabinet 1 configured to form the external appearance of the dryer, a drum 2 rotatably provided within the cabinet 1 so as to accommodate laundry, and a driving unit 3 provided so as to rotate the drum 2.

The driving unit 3 can be disposed on the rear surface of the drum 2 so as to rotate the drum 2, and can be fixedly coupled to a rear panel 11 forming the rear surface of the cabinet 1. Therefore, the driving unit 3 can be fixed to the cabinet 1, and can thus rotate the drum 2.

The driving units 3 of the above-described conventional dryers can include in common a stator 31 fixed to the rear panel 11, a rotor 32 rotated by the stator 31, and a rotating shaft 33 coupled to the rotor 32 so as to rotate the drum 2, and can further include a reducer provided to increase torque while reducing the RPM of the rotating shaft 33 so as to rotate the drum 2.

Further, the conventional dryers can further include in common a fixing unit 4 configured to fix the driving unit 3 to the rear panel 11. The fixing unit 4 can include at least one of a first fixing member 41 configured to fix the stator 31 to the rear panel 11 or a second fixing member 42 configured to fix the rotating shaft 33 to the rear panel 11. Therefore, in the conventional dryers, the driving unit 3 is disposed parallel to the rotating shaft 33 coupled to the drum 2, and can thus stably rotate the drum 2.

However, the rear panel 11 of the cabinet 1 is provided as a thin steel plate, and is thus easily deformed or vibrated even by a considerably small external force. Further, the rear panel 11 receives not only the load of the driving unit 3 but also the load of the drum 2 through the rotating shaft 33, and maintaining the shape of the rear panel 11 can thus be difficult.

Further, when laundry is eccentrically disposed in the drum 2 or repeatedly falls in the drum 2 during the rotating process of the drum 2, external force is repeatedly transmitted to the rear panel 11, and thus, the rear panel 11 can be vibrated.

When the rear panel 11 is even temporarily bent or deformed due to vibration or external force transmitted thereto, the rotating shaft 33 configured to connect the driving unit 3 to the drum 2 can be distorted. Accordingly, the driving unit 3 can generate unnecessary vibration or noise and, in severe cases, the rotating shaft 33 can be damaged. Further, bending or deformation of the rear panel 11 can generate unnecessary noise.

Further, during a process of vibrating the rear panel 11, the distance between the rotor 32 and the stator 31 is temporarily varied, and can thus cause collision between the rotor 32 and the stator 31 or generate unnecessary vibration and noise.

Moreover, when the driving unit 3 further includes the reducer, the rotating shaft 33 coupled to the reducer and a reduction shaft configured to connect the reducer to the drum 2 are separated from each other. Here, since the reducer is supported by the rear panel 11 through the stator 31 or the rotating shaft 33, when the rear panel 11 is deformed even slightly, the reduction shaft and the rotating shaft 33 can be distorted or misaligned with each other.

That is to say, the reduction shaft connected to the drum 2 has a less position change than the rotating shaft 33 coupled to the driving unit 3 due to the load of the drum 2. Therefore, when the rear panel 11 is temporarily bent or deformed, the tilting degrees of the rotating shaft 33 and the reduction shaft 33a are different, and thus, the rotating shaft 33 and the reduction shaft are misaligned with each other.

Therefore, in the above conventional laundry treating apparatus, whenever the driving unit 3 is operated, the rotating shaft 33 and the reduction shaft are misaligned with each other, and thus, reliability of the reducer may not be secured and the reducer can be damaged.

Accordingly, the above-described dryer may not be launched as an actual product.

Further, such a conventional dryer does not suggest a flow path in which air of the drum flows in the base located below the drum, or an explicit implication or structure as to how to treat water condensed in the flow path. Therefore, the conventional dryer does not provide an implication as to how to change the structure of the base when the position of the driving unit 3 is changed.

FIGS. 2A and 2B show the dryer in related art having the driving unit 3 fixed to the bottom surface of the cabinet 1 or a base 5.

For example, the dryer may include the cabinet 1 and a drum 2, and may further include a circulation flow path configured to circulate air of the drum 2 to the outside, and a heat pump 6 accommodated in the circulation flow path and configured to condense air and reheat air. Water condensed by the heat pump 6 may be collected in a storage tank 9 using a pump 8.

Even when the driving unit 3 is vibrated or external force is temporarily transmitted to the cabinet 1 through the driving unit 3, the bottom surface of the cabinet 1 may not be deformed or tilted.

Therefore, the driving unit 3 may be fixed to the bottom surface of the cabinet 1 or the base 5 that is fixed to the bottom surface of the cabinet 1 below the drum 2. In the dryer, the driving unit 3 may not be disposed parallel to the axis of rotation of the drum 2, and thus, the drum 2 may be rotated using an additional element.

Specifically, the driving unit 3 may include a motor 34 fixed to the bottom surface of the cabinet 1, a rotating shaft 37 rotated by the motor 34, a pulley 35 rotated by the rotating shaft 37, and a belt 36 provided to connect the outer circumferential surface of the drum 2 to the outer circumferential surface of the pulley 35.

In some cases, when the motor 34 rotates the rotating shaft 37, the pulley 35 may rotate the belt 36, and the belt 36 may rotate the drum 2. In some examples, since the diameter of the pulley 35 is much smaller than the diameter of the drum 2, the dryer may omit a reducer.

In some cases, since the diameter of the pulley 35 is much smaller than the diameter of the drum 2, when the motor 34 is rapidly rotated, the belt 36 may slip on the drum 2 or the pulley 35. Therefore, the rotational acceleration of the motor 34 may be limited to a designated level or less, and the motor 34 may be slowly accelerated or decelerated so as to prevent slip of the belt 36 when the drum 2 is rotated.

Therefore, the conventional dryer may not rapidly change the rotating direction of the drum 2, thus being incapable of controlling rotation of the drum 2 or changing the rotating direction of the drum 2. Thereby, the dryer may not control the rotating direction and the rotational velocity of the drum 2 during the drying cycle, and thus may not maximally increase drying efficiency.

Referring to FIG. 2B, the base 5 of the conventional dryer may include a motor installation part 59 configured such that the motor 34 is installed thereon, a circulation flow path part 51 configured such that air of the drum 2 flows therein, a compressor installation part 58 provided outside the circulation flow path part 51 such that a compressor is installed on the compressor installation part 58, and a water collection part 57 configured to collect water condensed in the circulation flow path part 51. An evaporator fixing part 54 configured to fix an evaporator and a condenser fixing part 53 configured to fix a condenser may be provided in the circulation flow path part 51. Water condensed in the evaporator fixing part 54 may be collected in the water collection part 57 through a communication hole 56.

Further, the compressor installation part 58 may be installed as close to the circulation flow path part 51 as possible so as to reduce heat loss of a refrigerant. Further, the water collection part 57 needs to be installed as close to the circulation flow path part 51 as possible so as to accommodate the condensed water.

In some examples, the motor 34 is provided to have a considerable volume so as to generate power to rotate the drum 2, and change in the installed position of the motor 34 is limited in order to rotate the drum 2 through the belt 36. Therefore, the motor installation part 59 needs to occupy a specific area or more of the base 5 at one side of the circulation flow path part 51, and disposition of the motor installation part 59 needs to be determined before the compressor installation part 58 and the water collection part 57.

Therefore, the compressor installation part 58 and the water collection part 57 may be installed so as to avoid the motor installation part 59, and may be installed in a region of the base 5 other than the circulation flow path part 51 and the motor installation part 59.

The compressor 61 may also occupy a considerable volume, and thus, the compressor installation part 58 and the water collection part 57 may not be disposed in the extending direction (for example, in the forward and rearward directions) of the circulation flow path part 51.

In some examples, the water collection part 57 may be disposed immediately adjacent to the circulation flow path part 51, and thus, the water collection part 57 may be disposed between the compressor installation part 58 and the circulation flow path part 51.

SUMMARY

The present disclosure is directed to a laundry treating apparatus that can shorten an assembly process of a duct cover along which air discharged from a drum is transferred.

The present disclosure is also directed to a laundry treating apparatus that can integrally form a duct cover coupled to the upper part of a supply duct to which air discharged from a drum is transferred.

The present disclosure is also directed to a laundry treating apparatus that can include a duct sealing unit provided between a supply duct and a duct cover so as to block air in the supply duct from leaking.

The present disclosure is also directed to a laundry treating apparatus that can easily place a duct sealing unit on a duct cover.

According to one aspect of the subject matter described in this application, a laundry treating apparatus can include a cabinet defining an opening at a front portion of the cabinet, a drum rotatably provided in the cabinet and having an inlet configured to receive laundry, a base provided below the drum and defining a space configured to move air in the drum, and a motor that is (i) disposed behind the drum, (ii) spaced apart from the base, and (iii) configured to provide power to rotate the drum. The base can include a supply duct in fluid communication with the drum and configured to receive air from the drum and move the air to the drum, a heat exchange unit provided in the supply duct and comprising (i) a first heat exchanger configured to cool the air and (ii) a second heat exchanger spaced apart from the first heat exchanger and configured to heat the air cooled by the first heat exchanger, a duct cover (i) coupled to an upper portion of the supply duct, (ii) covering the first heat exchanger and the second heat exchanger, and (iii) defining an inflow communication hole through which the supply duct and the drum are in fluid communication with each other, a duct sealing unit disposed between the supply duct and the duct cover and configured to block the air in the supply duct from leaking through the duct cover, and a sealing mount part provided on a first surface of the duct cover facing the supply duct and configured to receive the duct sealing unit.

The sealing mount part can include a first sealing mount part extending along a circumference of the duct cover, and a second sealing mount part surrounding at least a portion of the inflow communication hole, where the first sealing mount part is in fluid communication with the second sealing mount part, and the duct sealing unit, the first sealing mount part, and the second sealing mount part are integrally provided as one body.

Implementations according to this aspect can include one or more of the following features. For example, the duct cover can include a duct cover body provided above the supply duct and covering an inside of the supply duct, and a duct cover extension extending from an outer surface of the duct cover body along a circumference of the duct cover body and coupled to the supply duct.

In some implementations, the sealing mount part can be provided on the duct cover extension such that an upper end of the supply duct is inserted into the sealing mount part. In some examples, the supply duct can include a duct coupling part extending upward from the base and inserted into the sealing mount part, and the duct sealing unit can be provided between the duct coupling part and the sealing mount part. In some examples, the duct coupling part can have a thickness equal to a thickness of the sealing mount part, and the duct sealing unit can be inserted into the sealing mount part so as to contact the duct coupling part.

In some implementations, the duct cover extension can include a cover insert part that (i) extends in a thickness direction from an inner circumferential surface of the sealing mount part and (ii) is inserted into the supply duct, and a cover stepped part extending in the thickness direction from an outer circumferential surface of the sealing mount part and coupled to the duct coupling part along an outer surface of the duct coupling part. In some examples, the duct coupling part can couple the cover insert part to the cover stepped part. In some examples, a length of the cover insert part extending in the thickness direction from the sealing mount part can be greater than a length of the cover stepped part extending in the thickness direction from the sealing mount part.

In some implementations, the supply duct can include a transfer duct extending upward from the base and configured to accommodate the first heat exchanger and the second heat exchanger, and an inflow duct that (i) extends forward from transfer duct and (ii) is in fluid communication with the inflow communication hole so that air discharged from the drum is supplied to the inflow duct. In some examples, the duct sealing unit can be provided along circumferences of the transfer duct and the inflow duct. In some examples, the duct cover body can include a shield cover body coupled to an upper portion of the inflow duct and covering the first heat exchanger and the second heat exchanger, and a communication cover body extending forward from the shield cover body, coupled to an upper portion of the inflow duct, and defining the inflow communication hole.

In some examples, the duct sealing unit can be provided along circumferences of the shield cover body and the communication cover body. In some examples, the duct sealing unit can include a first duct sealing part provided between the shield cover body and the transfer duct and configured to block air in the transfer duct from leaking through the shield cover body, and a second duct sealing part provided between the communication cover body and the inflow duct and configured to block air in the inflow duct from leaking through the communication cover body.

In some implementations, the first duct sealing part and the second duct sealing part can be integrally provided as one body. In some implementations, the second duct sealing part can surround at least a portion of the inflow communication hole and can be configured to block the air discharged from the drum from leaking through the inflow communication hole.

In some implementations, the first sealing mount part can be provided along a circumference of the shield cover body so that the first duct sealing part is inserted into the first sealing mount part, and the second sealing mount part can be provided along a circumference of the communication cover body so that the second duct sealing part is inserted into the second sealing mount part. In some examples, the first sealing mount part and the second sealing mount part can provide a continuous surface.

In some implementations, an upper end of the transfer duct can be inserted into the first sealing mount part, and the first duct sealing part can be (i) provided between the first sealing mount part and the upper end of the transfer duct and (ii) configured to block air in the transfer duct from leaking through the shield cover body.

In some implementations, an upper end of the inflow duct can be inserted into the second sealing mount part, and the second duct sealing part can be (i) provided between the second sealing mount part and the upper end of the inflow duct and (ii) configured to block air in the inflow duct from leaking through the communication cover body. In some implementations, the cover stepped part can include a plurality of duct sealing unit-engaging protrusions configured to press the duct sealing unit against the cover insert part.

DETAILED DESCRIPTION

Figure 1:
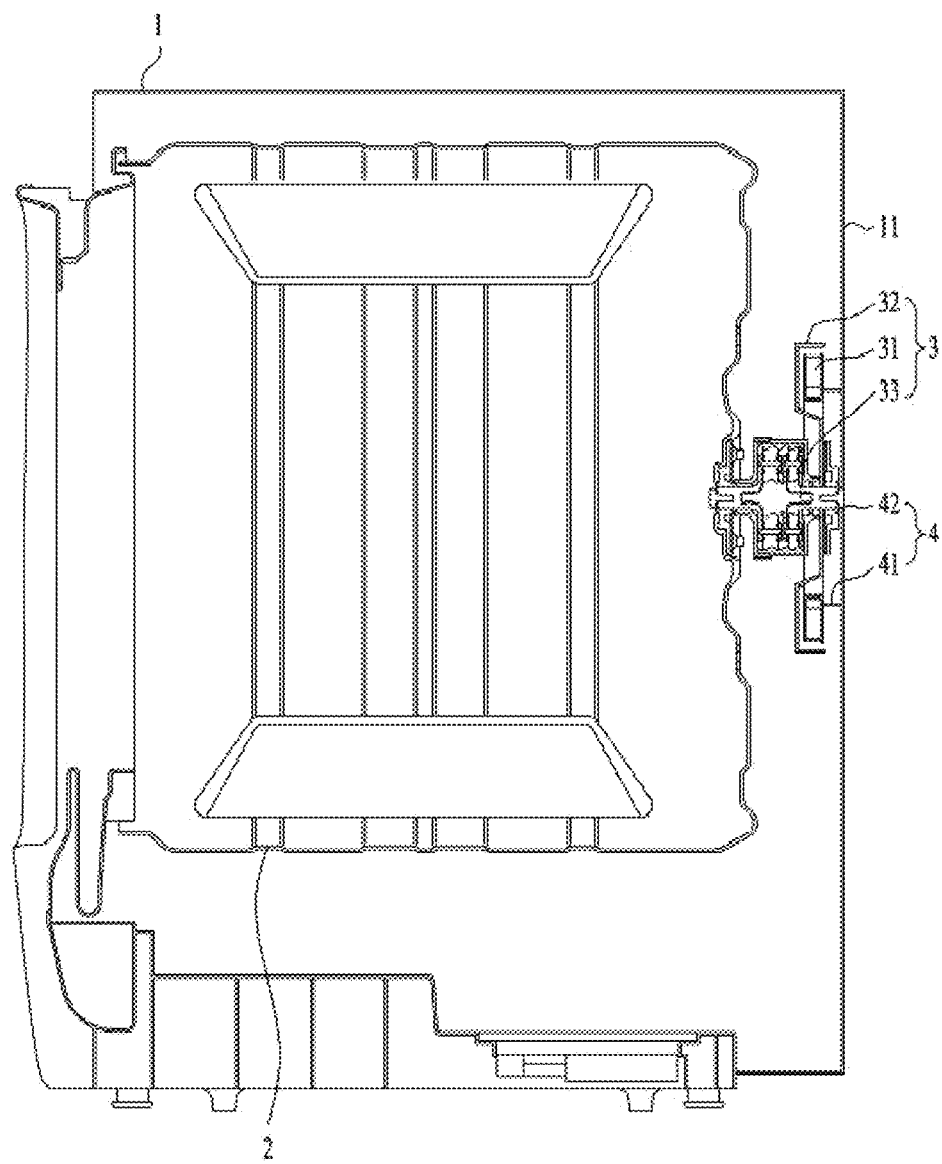
FIG. 1 is a diagram illustrating a cross-sectional view of a structure of a conventional dryer in which a driving unit is coupled to the rear surface of a cabinet.
Figure 2A:
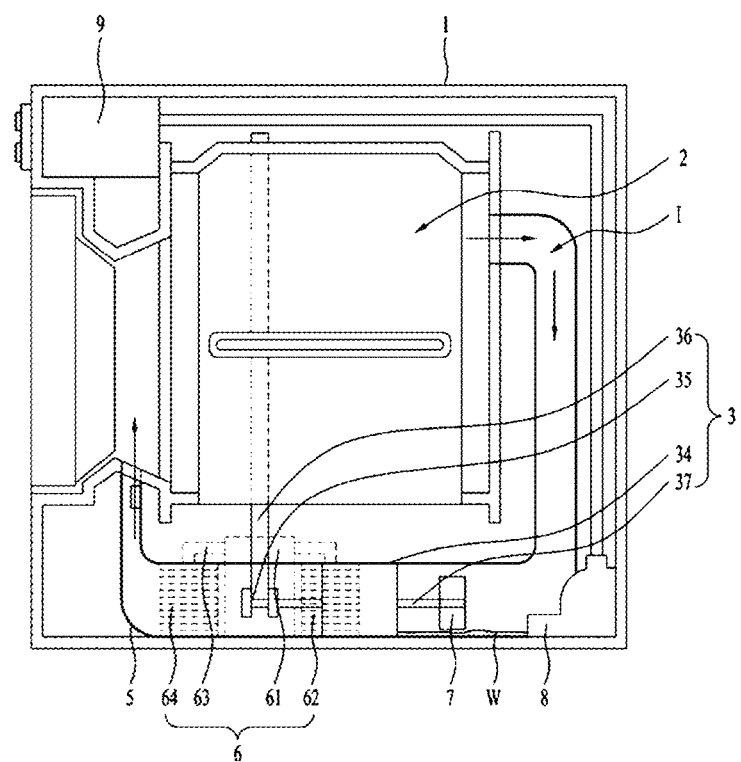
FIGS. 2A and 2B are diagrams illustrating views of an exemplary dryer in which a driving unit is coupled to a bottom surface of a cabinet or a base.
Figure 2B:
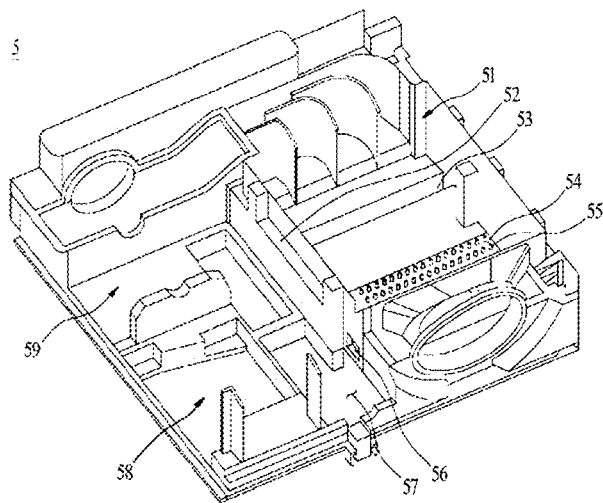
Figure 3:
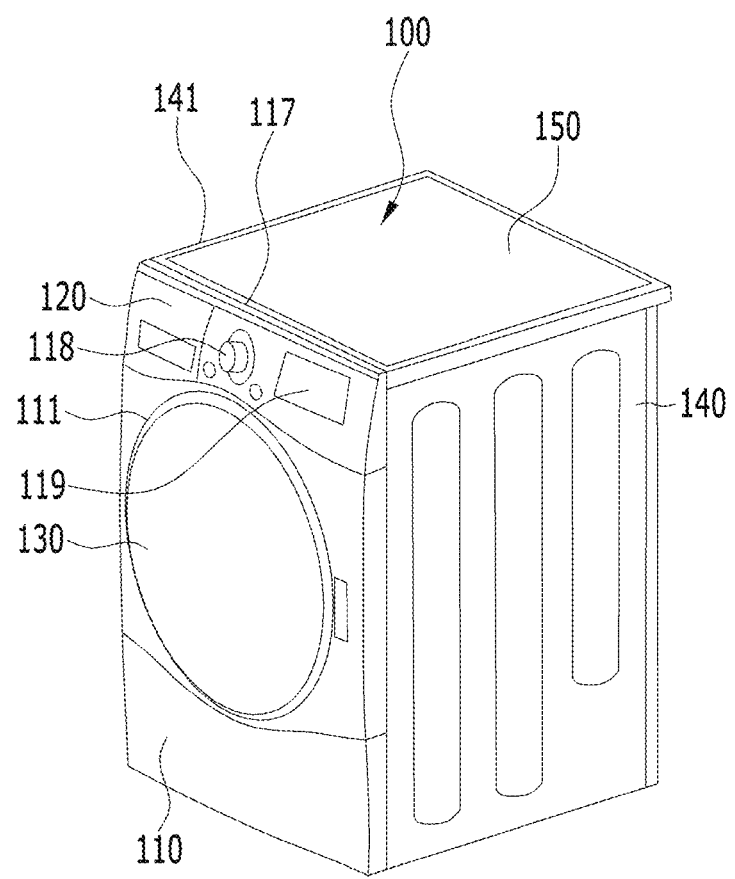
FIG. 3 is a diagram illustrating a perspective view of an external appearance of the exemplary laundry treating apparatus.

FIG. 3 is a diagram illustrating an external appearance of an exemplary laundry treating apparatus.

The laundry treating apparatus can include a cabinet 100 defining the external appearance of the laundry treating apparatus.

The cabinet 100 can include a front panel 110 defining a front surface of the laundry treating apparatus, an upper panel 150 defining an upper surface of the laundry treating apparatus, and side panels 140 defining side surfaces of the laundry treating apparatus. The side panels 140 can include a left side panel 141 defining a left side surface of the laundry treating apparatus. The front panel 110 can be provided with an opening 111 provided to communicate with the inside of the cabinet 100, and a door 130 rotatably coupled to the cabinet 100 so as to open and close the door 130.

A control panel 117 can be installed on the front panel 110. The control panel 117 can include an input unit 118 configured to receive control commands from a user, and a display 119 configured to output information, such as control commands selectable by the user. The control commands can include control commands for selecting a drying course configured to perform the drying cycle or selecting drying options. A control box (see FIG. 14) configured to control the inner elements of the laundry treating apparatus so as to perform the control command input through the input unit 118 can be installed in the cabinet 100. The control box can be connected to the inner elements of the laundry treating apparatus, and can thus control the corresponding elements so as to perform the input control command.

The input unit 118 can include a power supply request unit configured to request supply of power of the laundry treating apparatus, a course input unit configured to allow a user to select a desired one course among a plurality of courses, and an execution request unit configured to request starting of the course selected by the user.

The display 119 can include at least one of a display panel configured to output text and graphics or a speaker configured to output a voice signal and sound.

Further, the laundry treating apparatus can include a water storage tank 120 configured to separately store moisture generated during a process of drying the laundry. The water storage tank 120 can include a handle provided on one side of the front panel 110 so as to withdraw the water storage tank 120 to the outside therethrough. The water storage tank 120 can be provided to collect condensed water generated during the drying cycle. Therefore, the user can withdraw the water storage tank 120 from the cabinet 100, can remove the condensed water, and can then insert the water storage tank 120 again into the cabinet 100. Thereby, the laundry treating apparatus can be installed even in a place in which there is no drain.

The water storage tank 120 can be disposed above the door 130. Therefore, when the user withdraws the water storage tank 120 from the front panel 110, the user can bend his/her back relatively little and thus user convenience can be increased.

Figure 4:
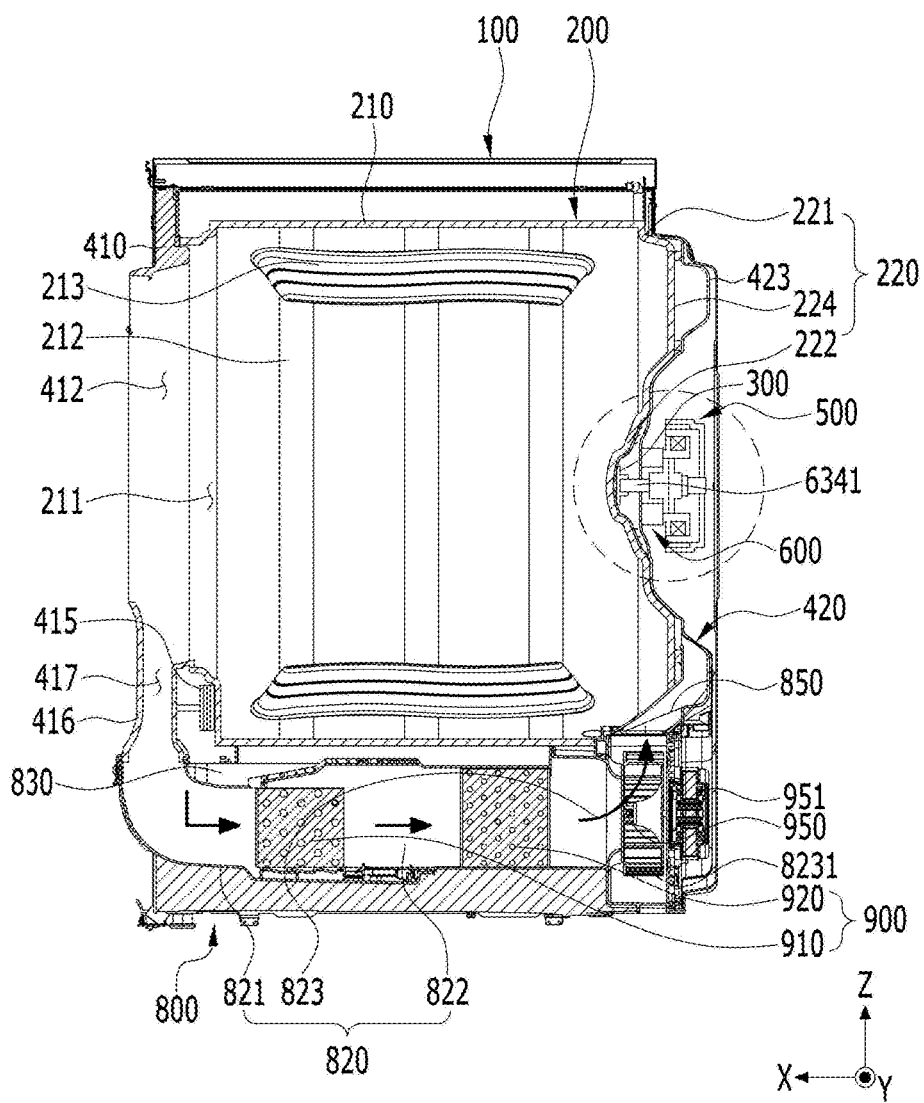
FIG. 4 is a diagram illustrating a cross-sectional view of an inside of the exemplary laundry treating apparatus.

FIG. 4 schematically illustrates the inside of the laundry treating apparatus. The laundry treating apparatus can include a drum 200 provided in the cabinet 100 so as to accommodate laundry, a driving unit configured to rotate the drum 200, a heat exchange unit 900 provided to supply hot air to the drum 20, and a base 800 provided with a circulation flow path part 820 provided therein. The circulation flow path part 820 is provided to communicate with the drum 200. Air discharged from the drum 200 can be supplied to the circulation flow path part 820. Further, air discharged from the circulation flow path part 820 can be supplied again to the drum 200.

The driving unit can include a motor 500 configured to provide power to rotate the drum 200. The driving unit can be directly connected to the drum 200 so as to rotate the drum 200. For example, the driving unit can be provided in a direct drive unit (DD) type. Therefore, the driving unit can directly rotate the drum 200 while omitting components, such as a belt, a pulley, etc., thus being capable of controlling the direction of rotation of the drum 200 or the rotational velocity of the drum 200.

The motor 500 can be rotated at a high RPM. For example, the motor 500 can be rotated at a much higher RPM than the RPM at which the drum 200 can be rotated in the state in which laundry is adhered to the inner wall of the drum 200.

However, when the drum 200 is continuously rotated in the state in which the laundry is adhered to the inner wall of the drum 200, portions of the laundry adhered to the inner wall of the drum 200 are not exposed to hot air, and thus, drying efficiency may be reduced.

When a rotor 520 is rotated at a low RPM in order to tumble or agitate the laundry in the drum 200 without being adhered to the inner wall of the drum 200, output or torque which can be generated by the driving unit is not properly used.

Therefore, the driving unit of the laundry treating apparatus can further include a reducer 600 configured to increase torque while reducing the RPM so as to utilize the maximum output of the motor 500.

Further, the driving unit can include a drum rotating shaft 6341 connected to the drum 200 so as to rotate the drum 200.

The drum 200 is provided in a cylindrical shape so as to accommodate laundry. Further, in contrast to a drum used in the washing cycle, in case of the drum 200 used only in the drying cycle, it is not necessary to put water into the drum 200 and to discharge water in a condensed liquid state from the drum 200 to the outside of the drum 200. Therefore, through holes defined through the circumferential surface of the drum 200 can be omitted. That is, the drum 200 used only in the drying cycle can be provided in a different structure from the drum used also in the washing cycle.

The drum 200 can be provided in an integrated cylindrical shape, and can be configured such that a drum body 210 and a drum rear surface 220 are coupled to each other, where the drum body 210 includes a circumferential surface and the drum rear surface 220 defines the rear surface of the drum 200.

An inlet 211 through which laundry enters or exits the drum 200 can be provided in the front surface of the drum body 210. The driving unit configured to rotate the drum 200 can be connected to the drum rear surface 220. The drum body 210 and the drum rear surface 220 can be coupled to each other by fastening members, such as bolts, but the present disclosure is not limited thereto and the drum body 210 and the drum rear surface 220 can be coupled to each other using various methods as long as the drum body 210 and the drum rear surface 220 can be coupled to each other so as to be rotatable together therewith.

Lifts 213 configured to move laundry in the drum body 210 upwards so as to mingle the laundry depending on rotation of the drum 200 can be provided on the drum body 210. When the drum 200 is rotated, laundry accommodated in the drum 200 can be repeatedly lifted and dropped, and can thus evenly contact hot air. Therefore, drying efficiency can be increased, and a drying time can be shortened.

Reinforcing beads 212 can be provided on the circumferential surface of the drum body 210. The reinforcing beads 212 can recess or protrude from the inner or outer circumferential surface of the drum 200. The reinforcing beads 212 can be provided in plural, and can be spaced apart from each other. The reinforcing beads 212 can be provided in a designated pattern on the inner or outer circumferential surface of the drum 200.

The reinforcing beads 212 can increase stiffness of the drum body 210. Therefore, even when a large amount of laundry is accommodated in the drum body 210 or sudden rotational power is transmitted to the drum body 210 through the driving unit, torsion of the drum body 210 can be prevented. Further, the reinforcing beads 212 can increase a distance between the inner circumferential surface of the drum body 210 and the laundry compared to the case in which the circumferential surface of the drum body 210 is flat, thereby allowing hot air supplied to the drum 200 to more effectively flow to a gap between the laundry and the drum 200. The reinforcing beads 212 can increase durability of the drum 200 and increase drying efficiency of the laundry treating apparatus.

In general, in a conventional DDT-type washer, a driving unit can be fixedly coupled to a tub configured to receive a drum, and the drum can be coupled to the driving unit so as to be supported by the tub. However, the laundry treating apparatus can be provided so as to concentratedly perform the drying cycle, and thus may not include a tub fixed to the cabinet 100 so as to accommodate the drum 200.

Therefore, the laundry treating apparatus can further include a support unit 400 provided to support or couple the drum 200 or the driving unit to the inside of the cabinet 100.

The support unit 400 can include a front plate 410 disposed in front of the drum 200, and a rear plate 420 disposed behind the drum 200. The front plate 410 and the rear plate 420 can have a plate shape, and can be disposed so as to face the front and rear ends of the drum 200. The distance between the front plate 410 and the rear plate 420 can be set to be equal to the length of the drum 200, or to be greater than the length of the drum 200. In some implementations, the front plate 410 and the rear plate 420 can be fixedly supported by the bottom surface of the cabinet 100 or the base 800.

The front plate 410 can be disposed between the front panel 110 defining the front surface of the cabinet 100 and the drum 200. Further, an inlet communication hole 412 configured to communicate with the inlet 211 can be provided in the front plate 410. Since the inlet communication hole 412 is provided in the front plate 410, the front surface of the drum 200 can be supported and laundry can be put into or withdrawn from the drum 200.

The front plate 410 can include a duct connector 416 provided under the inlet communication hole 412. The duct connector 416 can define the lower portion of the front plate 410.

The front plate 410 can include a duct communication hole 417 defined through the duct connector 416. The duct communication hole 417 can be provided in a hollow shape, and can guide air discharged from the inlet 211 of the drum 200 to a region under the drum 200. Further, the duct communication hole 417 can guide air discharged from the drum 200 to the circulation flow path part 820 located under the drum 200.

A filter can be installed in the duct communication hole 417 so as to filter out lint or foreign substances having a large particle size generated from laundry. The filter can filter air discharged from the drum 200, and can thus prevent accumulation of foreign substances in the laundry treating apparatus and disturbance of air circulation due to the accumulated foreign substances.

Since the inlet 211 is disposed at the front part of the laundry treating apparatus, the driving unit can be installed on the rear plate 420 rather than the front plate 410. The driving unit can be mounted on the rear plate 420 so as to be supported thereby. Therefore, the driving unit can rotate the drum 200 in the state in which the position of the driving unit is stably coupled by the rear plate 420.

At least one of the front plate 410 or the rear plate 420 can rotatably support the drum 200. At least one of the front plate 410 or the rear plate 420 can rotatably accommodate the front end or the rear end of the drum 200.

For example, the front part of the drum 200 can be rotatably supported by the front plate 410, and the rear part of the drum 200 can be spaced apart from the rear plate 420 so as to be connected to the motor 500 mounted on the rear plate 420 and can thus be indirectly supported by the rear plate 420. Therefore, a contact or friction area between the drum 200 and the support unit 400 can be minimized, and generation of unnecessary noise and vibration can be blocked.

In some implementations, the drum 200 can be provided to be rotatably supported by both the front plate 410 and the rear plate 420.

One or more support wheels 415 configured to support the front part of the drum 200 can be provided at the lower part of the front plate 410. The support wheels 415 can be rotatably provided on the rear surface of the front plate 410. The support wheels 415 can be rotated in the state in which the support wheels 415 come into contact with the lower surface of the drum 200.

When the drum 200 is rotated by the driving unit, the drum 200 can be supported by the drum rotating shaft 6341 connected to the rear surface of the drum 200. When laundry is accommodated in the drum 200, load applied to the drum rotating shaft 6341 can be increased due to the laundry. Therefore, the drum rotating shaft 6341 may be bent by the load.

When the support wheels 415 support the lower surface of the front part of the drum 200, the support wheels 415 can reduce the load applied to the drum rotating shaft 6341. Therefore, the support wheels 415 can block the drum rotating shaft 6341 from being bent, and can block generation of noise due to vibration.

The support wheels 415 can be provided at positions symmetrical to each other with respect to the center of rotation of the drum 200 so as to support the load of the drum 200. The support wheels 415 can be provided at the lower parts of the left and right sides of the drum 200 so as to support the drum 200. In some implementations, a greater number of support wheels 415 can be provided depending on the operating environment of the drum 200.

The circulation flow path part 820 provided on the base 800 can define a flow path along which air in the drum 200 is circulated and is then returned to the inside of the drum 200.

The circulation flow path part 820 can include an inflow duct 821 configured such that air discharged from the drum 200 flows thereinto, a discharge duct 823 configured to supply air to the drum 200, and a transfer duct 822 configured to connect the inflow duct 821 to the discharge duct 823.

When air is discharged from the front part of the drum 200, the inflow duct 821 can be located at the front portion of the circulation flow path part 820. Further, the discharge duct 823 can be located at the rear portion of the circulation flow path part 820.

The discharge duct 823 can include an air blowing part 8231 configured to discharge air to the outside of the circulation flow path part 820. The air blowing part 8231 can be provided at the rear part of the discharge duct 823. Air discharged through the air blowing part 8231 can flow towards the drum 200.

A duct cover 830 can be coupled to the upper portion of the circulation flow path part 820 so as to shield a part of the opened upper surface of the circulation flow path part 820. The duct cover 830 can block air from leaking to the outside of the circulation flow path part 820. For example, the duct cover 830 can form one surface of the flow path in which air is circulated.

Further, the heat exchange unit 900 provided on the base 800 can include a first heat exchanger 910 provided inside the circulation flow path part 820 so as to cool air, and a second heat exchanger 920 provided inside the circulation flow path part 820 so as to heat the air cooled by the first heat exchanger 910.

The first heat exchanger 910 can dehumidify air discharged from the drum 20, and the second heat exchanger 920 can heat the dehumidified air. The heated air can be supplied again to the drum 200 so as to dry laundry accommodated in the drum 200.

The first heat exchanger 910 and the second heat exchanger 920 can be provided as heat exchangers in which a refrigerant flows. When the first heat exchanger 910 and the second heat exchanger 920 are provided as heat exchangers in which the refrigerant flows, the first heat exchanger 910 can be provided as an evaporator, and the second heat exchanger 920 can be provided as a condenser. The first heat exchanger 910 and the second heat exchanger 920 can be provided such that the refrigerant flowing along the first heat exchanger 910 and the second heat exchanger 920 exchanges heat with air discharged from the drum 200.

The heat exchange unit 900 can include a circulation flow path fan 950 installed in the circulation flow path part 820 so as to generate air flow in the circulation flow path part 820. Further, the heat exchange unit 900 can further include a circulation flow path fan motor 951 configured to rotate the circulation flow path fan 950. The circulation flow path fan 950 can be rotated by rotational power supplied from the circulation flow path fan motor 951. When the circulation flow path fan 950 is operated, air dehumidified by the first heat exchanger 910 and heated by the second heat exchanger 920 can flow towards the rear part of the drum 200.

The circulation flow path fan 950 can be installed in any one of the inflow duct 821, the transfer duct 822, or the discharge duct 823. The circulation flow path fan 950 is provided to be rotated and, thus, when the circulation flow path fan 950 is rotated, noise may be generated. Therefore, the circulation flow path fan 950 can be disposed at the rear portion of the circulation flow path part 820.

The circulation flow path fan 950 can be installed at the air blowing part 8231. In some implementations, the circulation flow path fan motor 951 can be located behind the air blowing part 8231. When the circulation flow path fan 950 is rotated by the circulation flow path fan motor 951, air inside the circulation flow path part 820 can be discharged to the outside of the circulation flow path part 820 through the air blowing part 8231.

The inlet 211 of the drum 200 can be disposed at a relatively high position in order to allow a user to easily take laundry out of the drum 200, and thus, the circulation flow path part 820 and the heat exchange unit 900 can be disposed under the drum 200.

The rear plate 420 configured to guide air discharged from the circulation flow path part 820 to the drum 200 can be provided behind the drum 200. The rear plate 420 can be spaced apart from the drum rear surface 220. The circulation flow path part 820 can receive air from the inside of the drum 200 through the front plate 410, and can supply air to the drum 200 through the rear plate 420. Air discharged from the circulation flow path part 820 can pass through the rear plate 420 and can then be guided to the drum 200.

The base 800 can further include a connector 850 configured to guide air discharged from the circulation flow path part 820 to the rear plate 420. The connector 850 can uniformly disperse the air discharged from the circulation flow path part 820 throughout the rear plate 420.

The connector 850 can be installed at the air blowing part 8231. For example, the connector 850 can guide air discharged from the circulation flow path part 820 to the rear plate 420. Hot air supplied to the rear plate 420 can flow into the drum 200 through the drum rear surface 220.

The drum 200 of the laundry treating apparatus may not be coupled to a belt or the like so as to be indirectly rotated, and can be directly connected to the driving unit located behind the drum 200 so as to be rotated. Therefore, in contrast to the drum of the conventional dryer provided as a cylindrical shape having open front and rear ends, the rear end of the drum 200 of the laundry treating apparatus can be closed so as to be directly connected to the driving unit.

As described above, the drum 200 can include the drum body 210 provided in a cylindrical shape so as to accommodate laundry and the drum rear surface 220 coupled to the rear end of the drum body 210 so as to form the rear surface of the drum 200.

The drum rear surface 220 can provide a coupling surface provided to close the rear part of the drum body 210 and directly coupled to the driving unit. That is, the drum rear surface 220 can be connected to the driving unit, and can rotate the entirety of the drum 200 by rotational power supplied from the driving unit. Accordingly, the inlet 211 configured to put laundry into the drum 200 therethrough can be formed through the front part of the drum body 210, and the rear part of the drum body 210 can be closed by the drum rear surface 220.

A bushing 300 configured to connect the driving unit to the drum rear surface 220 can be provided on the drum rear surface 220. The bushing 300 provided on the drum rear surface 220 can form the center of rotation of the drum 200. The bushing 300 can be provided integrally with the drum rear surface 220, or can be formed of a material having greater stiffness and durability than the drum rear surface 220 so as to be firmly coupled to the rotating shaft configured to transmit power. The bushing 300 can be seated on the drum rear surface 220 and be coupled to the drum rear surface 220 so as to form a concentric axis with the center of rotation of the drum rear surface 220.

The drum rear surface 220 can include a flange part 221 coupled to the outer circumferential surface of the drum body 210, and a mounting plate 222 provided inside the flange part 221 so as to be coupled to the driving unit. The bushing 300 can be placed on the mounting plate 222. The rotating shaft configured to rotate the drum 200 is coupled to the mounting plate 222 through the bushing 300, thus being capable of being more firmly coupled to the mounting plate 222. Further, the bushing 300 can prevent deformation of the drum rear surface 220.

The drum rear surface 220 can include intake holes 224 defined therethrough between the flange part 221 and the mounting plate 222 so that regions in front of and behind the drum rear surface 220 communicate with each other through the intake holes 224. Hot air supplied through the circulation flow path part 820 can flow into the drum body 210 through the intake holes 224. The intake holes 224 can be provided as a plurality of holes defined through the drum rear surface 220 or can be provided as a mesh-type net.

The driving unit configured to rotate the drum 200 can be located behind the rear plate 420. The driving unit can include the motor 500 configured to generate rotational power and the reducer 600 configured to reduce the rotational power of the motor 500 and to transmit the reduced power to the drum 200.

The motor 500 can be disposed behind the rear plate 420. In some implementations, the motor 500 can be connected to the rear surface of the rear plate 420 through the reducer 600.

The reducer 600 can be coupled to the rear surface of the rear plate 420, and the motor 500 can be coupled to the rear surface of the reducer 600. For example, the rear plate 420 can provide a support plane configured to support the reducer 600 and the motor 500. In some implementations, the motor 500 can be coupled to the rear plate 420.

Figure 5:
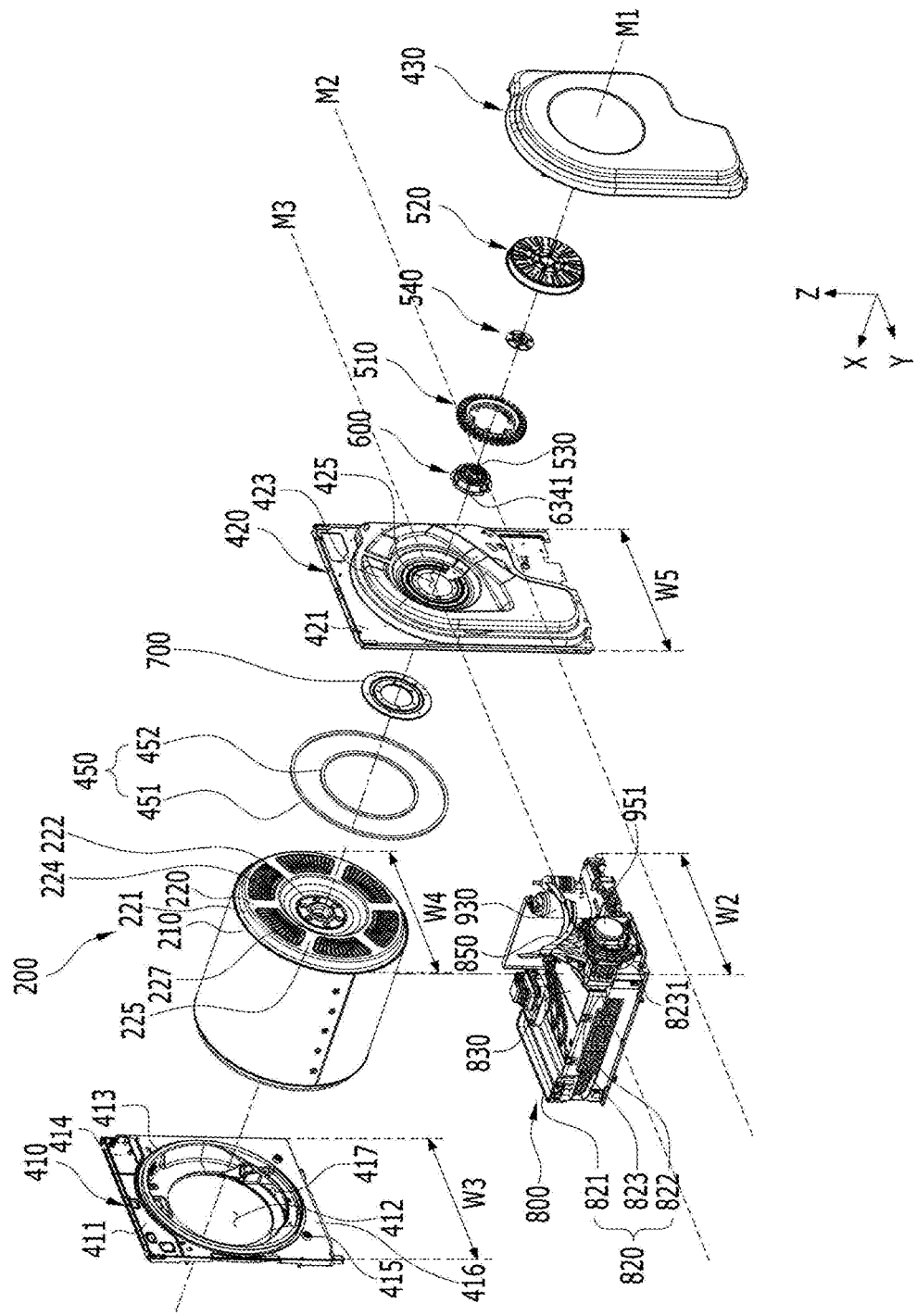
FIG. 5 is a diagram illustrating an exploded perspective view of inner elements of the exemplary laundry treating apparatus.

FIG. 5 is a diagram illustrating an exploded perspective view of the inner elements of the exemplary laundry treating apparatus.

The laundry treating apparatus can include the drum 200 configured to accommodate laundry, the front plate 410 configured to support the front surface of the drum 200, the rear plate 420 located behind the drum 200, the base 800 provided under the drum 200 and configured to provide a space in which air in the drum 200 is circulated or moisture in the air is condensed, the motor 500 located behind the drum 200 so as to provide rotational power to the drum 200, the reducer 600 configured to reduce the rotational power of the motor 500 and to transmit the reduced rotational power to the drum 200, and a rear cover 430 coupled to the rear plate 420 so as to block the exposure of the motor 500 to the outside.

The base 800 can include the circulation flow path part 820 configured to communicate with the drum 200 so as to receive air supplied from the drum 200 or to discharge air to the drum 200.

The front plate 410 can include a front panel 411 defining the front plate 410, and the inlet communication hole 412 defined through the front panel 411 so as to communicate with the drum 200. The front plate 410 can further include a front gasket 413 provided on the rear surface of the front panel 411 and configured to surround the radially outer surface of the inlet communication hole 412 so as to accommodate a part of the drum body 210.

The front gasket 413 can rotatably support the drum body 210, and can be provided to come into contact with the outer circumferential surface or the inner circumferential surface of the inlet 211. The front gasket 413 can bloc hot air in the drum 200 from leaking through a gap between the drum body 210 and the front plate 410. The front gasket 413 can be made of plastic resins or an elastomer, and a separate sealing member can be additionally coupled to the front gasket 413 so as to block laundry or hot air from being released from the drum body 210 to the front plate 410.

The front plate 410 can include the duct communication hole 417 formed through the inner circumferential surface of the inlet communication hole 412. Further, the front plate 410 can include the duct connector 416 configured to extend from the lower part of the duct communication hole 417 so as to form a flow path through which the drum body 210 and the circulation flow path part 820 communicate with each other.

The duct connector 416 can communicate with the drum body 210 through the duct communication hole 417, and air discharged from the drum body 210 can flow into the duct connector 416 through the duct communication hole 417 and be guided to the circulation flow path part 820. The air discharged from the drum body 210 can be guided to the circulation flow path part 820 by the duct connector 416, and thus, leakage of air in the drum 200 to the outside can be blocked.

A filter member configured to filter out lint or foreign substances from air discharged from the drum 200 so as to block the foreign substances from entering the circulation flow path part 820 can be installed in the duct connector 416.

The support wheels 415 rotatably installed on the rear surface of the front panel 411 so as to support the lower part of the drum 200 can be installed on the front plate 410. The support wheels 415 can support the front part of the drum 20, thereby being capable of blocking the rotating shaft connected to the drum 200 from being bent.

A water storage tank support hole 414 provided to pass through the front panel 411 such that the water storage tank 120 (with reference to FIG. 3) configured to store condensed water produced during the drying cycle can be withdrawn therefrom or be supported thereby can be provided in the front plate 410. When the water storage tank support hole 414 is provided at the upper part of the front plate 410, the user does not need to bend his/her back so as to withdraw the water storage tank 120 and thus user convenience can be increased.

The drum 200 configured to accommodate laundry can include the drum body 210 provided with the inlet 211 defined through the front surface thereof so that laundry enters or exits the drum 200 therethrough, and the drum rear surface 220 configured to form the rear surface of the drum 200.

The drum rear surface 220 can include the flange part 221 coupled to the drum body 210, the intake holes 224 defined through the drum rear surface 220 inside the flange part 221, and the mounting plate 222 provided at the center of rotation of the drum rear surface 220 so as to be coupled to the rotating shaft. Air can flow into the rear region of the inside of the drum 200 through the intake holes 224.

The drum rear surface 220 can further include reinforcing ribs 225 configured to extend from the flange part 221 to the center of rotation of the drum rear surface 220. The reinforcing ribs 225 can extend while avoiding the intake holes 224. The reinforcing ribs 225 can prevent reduction in stiffness of the drum rear surface 220 due to the intake holes 224. The reinforcing ribs 225 can be provided to radially extend from the outer circumferential surface of the mounting plate 222 towards the inner circumferential surface of the flange part 221.

In addition, the drum rear surface 220 can further include circumferential ribs 227 configured to extend in the circumferential direction of the drum rear surface 220 so as to connect the reinforcing ribs 225 to each other. The intake holes 224 can be disposed among the reinforcing ribs 225, the circumferential ribs 227 and the flange part 221. The reinforcing ribs 225 and the circumferential ribs 227 can prevent deformation of the drum rear surface 220 even when rotational power from the motor 500 is transmitted to the drum rear surface 220.

The inflow duct 821 can be provided to communicate with the duct communication hole 417 of the front plate 410 so as to communicate with the flow path provided in the front plate 410. The transfer duct 822 can be provided to extend from the end of the inflow duct 821 towards the rear part of the drum 200, and the discharge duct 823 can be provided at the end of the transfer duct 822 so as to guide air to the drum 200.

The air blowing part 8231 can be located at the downstream part of the discharge duct 823, and can provide a space in which the circulation flow path fan 950 is installed. When the circulation flow path fan 950 is operated, air flowing into the inflow duct 821 can be discharged upwards from the air blowing part 8231.

The heat exchange unit 900 configured to cool and heat air circulated from the drum 200 can be installed on the base 800. The heat exchange unit 900 can include a compressor 930 connected to the first heat exchanger 910 and the second heat exchanger 920 so as to supply a compressed refrigerant. The compressor 930 can be provided so as not to directly exchange heat with circulated heat, and can be located outside the circulation flow path part 820.

Further, the heat exchange unit 900 can include the circulation flow path fan motor 951 supported by the rear part of the air blowing part 8231 so as to rotate the circulation flow path fan 950. The circulation flow path fan motor 951 can be coupled to the rear part of the air blowing part 8231.

The laundry treating apparatus can further include the connector 850 coupled to the circulation flow path part 820 so as to guide hot air discharged from the circulation flow path part 820 to the rear part of the drum 200 or the rear plate 420.

The connector 850 is disposed above the discharge duct 823, and can thus guide hot air acquired through the second heat exchanger 920 to a region above the discharge duct 823. Further, the connector 850 can be coupled to an opening provided in the upper part of the air blowing part 8231.

The connector 850 can be provided to provide a flow path therein. The connector 850 can be provided to guide the flow of air generated by the circulation flow path fan 950 uniformly to the rear plate 420. For example, the connector 850 can be provided such that the area of the flow path in the connector 850 increases as the distance from the air blowing part 8231 increases.

The rear plate 420 can be coupled to or supported by the base 800, and can be located behind the drum 200. The rear plate 420 can include a rear panel 421 located to face the front plate 410, and a duct 423 provided to be recessed from the rear panel 421 so as to provide a flow path in which air is circulated and to guide air discharged from the circulation flow path part 820 to the drum 200.

The rear plate 420 can include a mounting part 425 configured such that the driving unit is coupled thereto or supported thereby. The mounting part 425 can be provided to pass through the rear panel 421, and can be disposed in the inner circumferential surface of the duct 423. The mounting part 425 can be provided to be spaced radially inwards apart from the inner circumferential surface of the duct 423.

Here, the driving unit can indicate an assembly of the reducer 600 and the motor 500, as described above. In some implementations, the driving unit can indicate only the motor 500. For example, an element configured to generate rotational power and to transmit the rotational power to the drum 200 can be referred to as the driving unit.

The driving unit can be mounted in the mounting part 425. The mounting part 425 can support the load of the driving unit. The driving unit can be connected to the drum 200 in the state in which the driving unit is supported by the mounting part 425.

The duct 423 can be provided to accommodate a part of the drum rear surface 220. The duct 423 can provide a flow path along which air flows, together with the drum rear surface 220.

The driving unit can be installed in the mounting part 425 so as to block interference with the duct 423. For example, the driving unit can be disposed to be spaced radially inwards apart from the inner circumferential surface of the duct 423. The driving unit can be installed in the mounting part 425 such that the rear part of the driving unit is exposed to the outside, thus being capable of being cooled by external air.

The driving unit can include the motor 500 configured to generate power to rotate the drum 200. The motor 500 can include a stator 510 configured to generate a rotating magnetic field, and the rotor 520 rotated by the stator 510.

The rotor 520 can be provided in an outer rotor type configured to accommodate the stator 510 and to be rotated along the circumference of the stator 510. For example, a drive shaft 530 can be coupled to the rotor 520 so as to pass through the stator 510 and the mounting part 425, and thus, the rotor 520 can be directly connected to the drum 200. In some implementations, the rotor 520 can directly transmit power to rotate the drum 200 to the drum 200.

The rotor 520 can be coupled to the drive shaft 530 through a washer 540. The washer 540 can perform a function of connecting the drive shaft 530 to the rotor 520. A contact area between the rotor 520 and the drive shaft 530 can be increased by the washer 540, and thus, rotation of the rotor 520 can be more effectively transmitted to the drum 200.

The reducer 600 can be provided to connect the motor 500 to the drum 200. The reducer 600 can convert power of the motor 500 so at to rotate the drum 200. The reducer 600 can be disposed between the motor 500 and the drum 200, can receive power from the motor 500, can convert the power, and can then transmit the converted power to the drum 200. The reducer 600 can be provided to increase the torque value of the rotor 520 while reducing the RPM of the rotor 520 and then to transmit the converted power to the drum 200.

For example, the reducer 600 can be coupled to the drive shaft 530 coupled to the rotor 520 and rotated together with the rotor 520. The reducer 600 can include a gear assembly engaged with the drive shaft 530 and rotated so as to increase the torque of the drive shaft 530 while converting the RPM of the drive shaft 530, and the gear assembly can be connected to the drum rotating shaft 6341 coupled to the drum 200 so as to rotate the drum 200. Therefore, when the drive shaft 530 is rotated, the drum rotating shaft 6341 can be rotated at a lower RPM than the RPM of the drive shaft 530 and a greater torque than the torque of the drive shaft 530.

The performance of the reducer 600 may depend on whether or not the drive shaft 530 and the drum rotating shaft 6341 can remain coaxial with each other. For example, when the drive shaft 530 and the drum rotating shaft 6341 are misaligned with each other, coupling of components providing the gear assembly in the reducer 600 to at least one of the drive shaft 530 or the drum rotating shaft 6341 may be loosened or released. Therefore, the power of the drive shaft 530 may not be properly transmitted to the drum rotating shaft 6341, or the drive shaft 530 may be rotated idle.

Further, when the drive shaft 530 and the drum rotating shaft 6341 are even temporarily misaligned with each other, gears in the reducers 600 may be dislocated and may thus collide with each other, and thus, unnecessary vibration or noise may be caused.

Further, when the misalignment angle between the drive shaft 530 and the drum rotating shaft 6341 is severe even temporarily, the reducer 600 may completely deviate from the original position thereof, or may be damaged.

In order to prevent such problems, laundry treating apparatuses including a reducer can be generally configured such that the reducer and a motor are coupled to a support which can maintain the original state thereof without being deformed even when external force is applied thereto.

For example, in a washer, a tub configured to accommodate a drum can be primarily coupled to a cabinet, and a motor and a reducer can be secondarily coupled to a bearing housing produced as a rigid body embedded in the tub through injection molding. Thereby, even when the tub generates considerable vibration, the reducer and the motor, i.e., a driving unit, can be tilted or vibrated together with the bearing housing or a fixed steel plate. Consequently, the coupling state between the reducer and the driving unit can always be maintained, and the coaxial state between a drive shaft and a rotating shaft can be maintained.

In some implementations, the laundry treating apparatus is provided as a dryer, and thus, a tub fixed to the cabinet 100 may be omitted. Further, the rear panel 421 of the cabinet 100 is provided as a relatively thin plate, and thus, although the stator 510 is fixed, the rear panel 421 can be easily vibrated or bent due to repulsive power when the rotor 520 is rotated. When the rear panel 421 is vibrated or bent even temporarily, the centers of rotation of the reducer 600 and the motor 500, which are coupled to the drum 200, may be misaligned with each other.

Further, the rear panel 421 is provided as a thin steel plate, and thus, it may be difficult for the rear panel 421 to support both the reducer 600 and the motor 500. For example, in the case in which the reducer 600 and the motor 500 are coupled to the rear panel 421 in parallel to each other, moment of inertia may occur due to the overall length of the reducer 600 and the motor 500 and gravity, and thus, the reducer 600 may sag. Accordingly, the drum rotating shaft 6341 of the drum 200 deviates from the original position thereof due to the reducer 600, and may thus not remain coaxial with the drive shaft 530.

The motor 500 can be supported by coupling the stator 510 to the rear plate 420. When a large amount of laundry is accommodated in the drum 200 or the laundry in the drum 200 is unbalanced, the drum rotating shaft 6341 may deviate from the original position thereof depending on the disposition of the laundry whenever the drum 200 is rotated. Here, since the stator 510 is separated from the drum 200 and is fixed to the rear plate 420, the drum rotating shaft 530 may be vibrated at a different amplitude from the stator 510 or be tilted at a different angle from the stator 510. Therefore, the drum rotating shaft 6341 and the drive shaft 530 may not remain coaxial with each other.

From another point of view, the position of the drum 200 supported by the front plate 410 and the rear plate 420 may be fixed to a certain degree. Therefore, the position of the drum rotating shaft 6341 coupled to the drum 200 may be fixed to a certain degree. Accordingly, even when the drum 200 is vibrated, vibration of the drum 200 may be attenuated by at least one of the front plate 410 or the rear plate 420.

However, in the case in which vibration of the drum 200 is transmitted to the motor 500, although the reducer 600 and the motor 500 are fixed to the rear plate 420, the vibration amplitude of the motor 500 and the rear plate 420 may be greater than the vibration amplitude of the drum rotating shaft 6341. Here, the drum rotating shaft 6341 and the drive shaft 530 may not remain coaxial with each other also.

In order to solve the above problems, in the laundry treating apparatus, the motor 500 can be coupled to the reducer 600 so as to be fixed. That is to say, the reducer 600 can serve as a control point of the entirety of the driving unit. For example, the reducer 600 can serve as a reference to determine the vibration and the tilt angle amount of the driving unit.

Since the motor 500 is fixed only to the reducer 600 without being fixed to other elements of the laundry treating apparatus, when vibration or external force is transmitted to the driving unit, the motor 500 can always be tilted or vibrated together with tilting or vibration of the reducer 600.

Accordingly, the reducer 600 and the motor 500 can form one vibration system, and the reducer 600 and the motor 500 can remain fixed to each other without moving relative to each other.

The stator 510 of the motor 500 can be directly coupled to the reducer 600 so as to be fixed. Therefore, the installed position of the drive shaft 530 may not be varied with respect to the reducer 600. The drive shaft 530 and the reducer 600 can be disposed such that the center of the drive shaft 530 and the center of the reducer 600 coincide with each other, and the drive shaft 530 can be rotated in the state in which the drum rotating shaft 6341 and the drive shaft 530 remain coaxial with each other.

A first axis M1 can indicate a virtual line extending in the forward and rearward directions along the center of rotation of the drum 200. For example, the first axis M1 can be provided parallel to the X-axis.

A second axis M2 and a third axis M3 can indicate virtual lines extending from the front part of the laundry treating apparatus to the upper region of the rear part of the laundry treating apparatus. For example, the second axis M2 and the third axis M3 can be provided orthogonal to the XZ plane, or can be provided parallel to the Y-axis.

The first axis M1 and the second axis M2 can cross each other in the reducer 600. Further, the first axis M1 and the third axis M3 can cross each other in the mounting part 425.

The reducer 600 and the motor 500 can be designed to be disposed along the first axis M1 parallel to the ground when there is no load in the drum 200 or the motor 500 is not operated.

However, when the drum 200 or the motor 500 is vibrated, vibration of the drum 200 or the motor 500 is transmitted to the reducer 600 and thus the reducer 600 is tilted, and thereby, the reducer 600 may be temporarily tilted along the second axis M2.

Here, the motor 500 is coupled to the reducer 600, and can thus be vibrated or tilted together with the reducer 600. Therefore, the motor 500 can be disposed parallel to the reducer 600 on the second axis M2. Accordingly, the drum rotating shaft 6341 and the drum rotating shaft 530 can be disposed in parallel along the second axis M2.

Consequently, even when the reducer 600 is tilted, the motor 500 can be moved integrally with the reducer 600 and the drive shaft 530 and the drum rotating shaft 6341 can remain coaxial with each other.

The reducer 600 can be coupled to the rear plate 420 so as to be fixed. Since the reducer 600 is tilted or vibrated in the state in which the reducer 600 is coupled to the rear plate 420, it may be considered that the rear plate 420 serves as the center of the vibration system including the reducer 600, the motor 500 and the drum 200. In this case, the motor 500 is not directly coupled to the rear plate 420, and may be coupled to only the reducer 600 so as to be fixed.

The reducer 600, the motor 50 and the drum 200 are disposed in parallel along the first axis M1, and then, the reducer 600 can be tilted parallel to the third axis M3 due to vibration of the drum 200 or the motor 500. The third axis M3 can pass through the reducer 600 coupled to the rear plate 420. Here, since the reducer 600 and the motor 500 are coupled to each other, the motor 500 can be tilted parallel to the third axis M3 in the same manner as the reducer 600.

Accordingly, the motor 500 and the drum 200 are coupled to the reducer 600, and thus, the motor 500 and the drum 200 can be tilted parallel to the reducer 600 or vibrated simultaneously with the reducer 600.

The above-described term "coaxial" or "coinciding" does not mean that two elements are physically perfectly coaxial with each other or coincide with each other, but conceptually means that the elements are within a mechanically allowable error range or are within a range recognized as in a coaxial state or a coinciding state by those skilled in the art. For example, the state in which the drive shaft 530 and the drum rotating shaft 6341 are misaligned within 5 degrees may be defined as the coaxial state or the coinciding state. However, such an angle value is only one example, and an error allowed by design may be changed.

Since the drive shaft 530 is rotated relative to the reducer 600 but is fixed so as not to be tilted and the stator 510 is also fixed to the reducer 600, the distance between the stator 510 and the rotor 520 can always be maintained. Accordingly, collision between the stator 510 and the rotor 520 can be prevented, and noise or vibration caused by change in the center of rotation of the rotor 520 around the stator 510 can be blocked.

The drum rotating shaft 6341 can be provided to extend towards the drum 200 within the reducer 600, and can be vibrated and tilted together with the reducer 600. For example, the drum rotating shaft 6341 can be provided to be rotated in the reducer 600, but the installed position of the drum rotating shaft 6341 can be fixed. Accordingly, the drum rotating shaft 6341 and the drive shaft 530 can always be disposed parallel to each other, and can thus form a concentric axis. That is to say, the drum rotating shaft 6341 and the drive shaft 530 can maintain the state in which the center of the drum rotating shaft 6341 and the center of the drive shaft 530 coincide with each other.

A sealing unit 450 can be provided between the drum rear surface 220 and the rear plate 420. The sealing unit 450 can seal a gap between the drum rear surface 220 and the rear plate 420 so that air flowing into the duct 423 of the rear plate 420 flows into the intake holes 224 without leaking to the outside.

The sealing unit 450 can be disposed on the outer surface and the inner surface of the duct 423. A first sealing member 451 can be provided outside the duct 423 in the radial direction, and a second sealing member 452 can be provided inside the duct 423 in the radial direction. The first sealing member 451 can block hot air between the drum rear surface 220 and the duct 423 from leaking radially outwards, and the second sealing member 452 can block hot air between the drum rear surface 220 and the duct 423 from leaking radially inwards.

For example, the sealing unit 450 can be disposed outside and inside of the intake holes 224 in the radial direction. The first sealing member 451 can be provided outside the intake holes 224 in the radial direction, and the second sealing member 452 can be provided inside the intake holes 224 in the radial direction.

In some implementations, in order to block hot air from leaking, the sealing unit 450 can be provided to come into contact with both the drum rear surface 220 and the rear plate 420. The drum 200 is rotated during the operating process of the laundry treating apparatus, and thus, the drum rear surface 220 continuously applies friction to the sealing unit 450. Therefore, the sealing unit 450 can be made of a material which can seal the gap between the drum rear surface 220 and the duct 423 without performance degradation even by frictional force or frictional heat generated due to rotation.

Since the motor 500 or the reducer 600 can be coupled to the rear surface of the rear plate 420 and the rear plate 420 can be made of a thin steel plate, the rear plate 420 can be bent or deformed by load of the reducer 600 or load transmitted to the reducer 600 by the drum 200. For example, in order to install the reducer 600 and the motor 500 on the rear plate 420, the rear plate 420 may need to secure stiffness.

For this purpose, the rear plate 420 can further include a bracket 700 configured to increase stiffness of the rear plate 420. The bracket 700 can be additionally coupled to the rear plate 420, and the reducer 600 and the motor 500 can be coupled to the rear plate 420 by the bracket 700.

The reducer 600 can be simultaneously coupled to the bracket 700 and the rear plate 420. The reducer 600, the rear plate 420, and the bracket 700 can be simultaneously coupled to each other using fastening members passing therethrough. The rear plate 420 can secure stiffness by coupling the bracket 700 thereto. The reducer 600 and the motor 500 can be coupled to the rear plate 420 having secured stiffness.

The reducer 600 can be first coupled to the bracket 700, and then, the bracket 700 can be coupled to the rear plate 420. For example, the reducer 600 is not directly coupled to the rear plate 420, and can be fixed to the rear plate 420 through the bracket 700.

When the motor 500 or the reducer 600 is coupled to the rear surface of the rear plate 420, the motor 500 and the reducer 600 may be exposed to the outside. Therefore, it is necessary to block the exposure of the motor 50 coupled to the rear surface of the rear plate 420 to the outside. Further, the duct 423 can be heated by hot air.

Therefore, it is necessary to isolate the rear surface of the duct 423 from heat. The rear cover 430 can be coupled to the rear surface of the rear plate 420 so as to block the exposure of the duct 423 and the motor 500 or the reducer 600 to the outside. The rear cover 430 can be spaced apart from the duct 423 and the driving unit.

The rear cover 430 can reduce damages on the motor 500 due to external interference or the duct 423 from generating heat loss, thereby being capable of preventing reduction in drying efficiency.

Figure 6A:
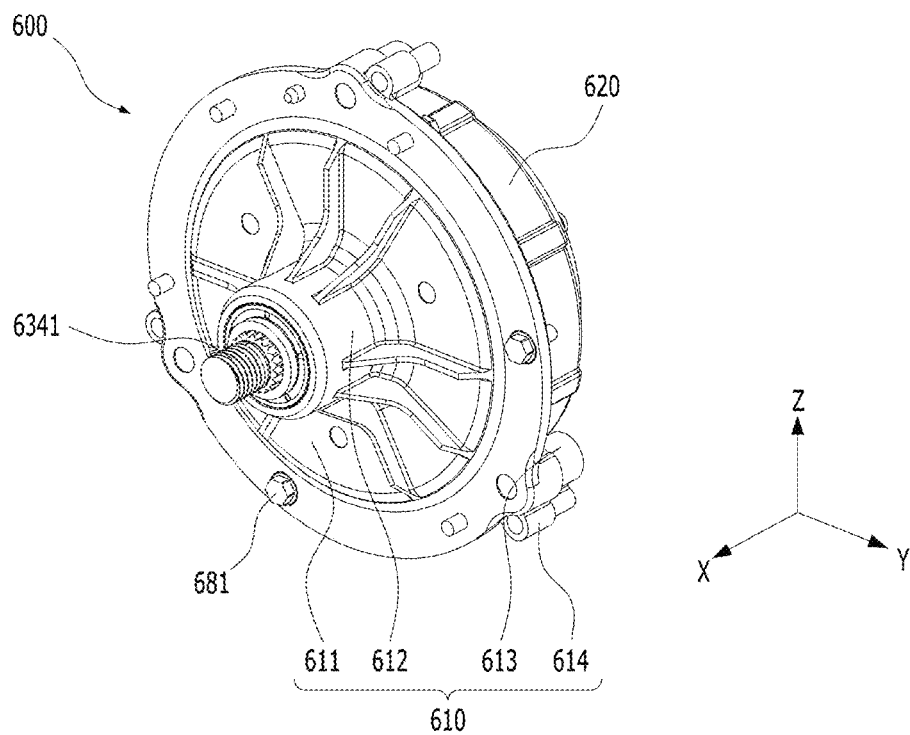
FIGS. 6A and 6B are diagrams illustrating perspective views of an external appearance of a reducer of the exemplary laundry treating apparatus.
Figure 6B:
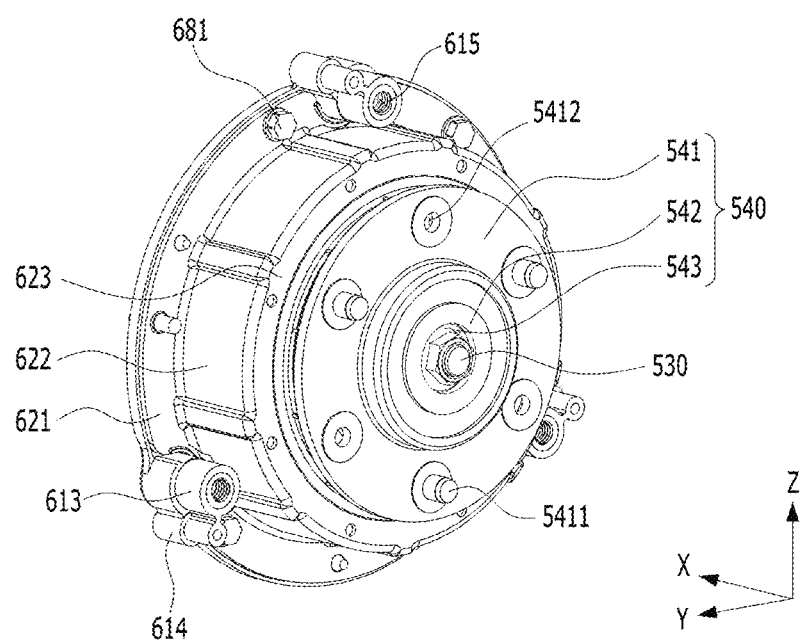

FIGS. 6A and 6B are diagrams illustrating the external appearance of the reducer.

The reducer 600 can include a reducer housing unit defining the external appearance of the reducer 600. The reducer housing unit can include a first housing 610 provided to face the drum, and a second housing 620 provided to face the motor.

The reducer 600 can include a gear box. The gear box can be provided to receive power transmitted from the motor, to increase the torque value of the motor while reducing the RPM of the motor, and then to transmit the converted power to the drum. A great part of the gear box can be accommodated in the second housing 620, and the first housing 610 can be provided to shield the inside of the reducer 600. Thereby, the total thickness of the reducer 600 can be reduced.

The first housing 610 can include a first housing shield body 611 provided to shield the second housing 620, and a first housing shaft receiver 612 configured to extend from the first housing shield body 611 in a direction away from the second housing 620. The first housing shaft receiver 612 can accommodate the drum rotating shaft 6341, and can rotatably support the drum rotating shaft 6341.

The first housing 610 can include the stator couplers 613. The stator couplers 613 can be provided to extend from the circumferential surface of the first housing shield body 611 in a direction away from the first housing shaft receiver 612.

Each of the stator couplers 613 can include a stator coupling hole 615 to which the motor is fastened. The stator coupling hole 615 can be recessed from the stator coupler 613. A separate fastening member can be inserted into the stator coupling hole 615. The stator couplers 613 can be coupled to the motor using the fastening members.

The first housing 610 can further include coupling guides 614 configured to guide coupling of the motor to the first housing 610. The coupling guides 614 can be provided to extend from the circumferential surface of the first housing shield body 611 in the direction away from the first housing shaft receiver 612. The coupling guides 614 can extend from the first housing shield body 611 so as to be connected to the stator couplers 613. The coupling guides 614 can guide the position of the stator 510 when the stator 510 is coupled to the stator couplers 613. Thereby, assemblability can be improved.

Referring to FIGS. 6A and 6B, the second housing 620 can accommodate the gear assembly therein. In general, the gear box coupled to the reducer 600 can include a sun gear, planet gears rotated around the sun gear, and a ring gear configured to accommodate the planet gears so as to guide rotation of the planet gears. The second housing 620 can include a second housing coupling body 621 coupled to the first housing 610, a second housing shield body 622 configured to extend from the second housing coupling body 621 in a direction away from the first housing 610 and to define a space for accommodating the gear box, and a second housing shaft receiver 623 configured to extend from the inner circumferential surface of the second housing shield body 622 in the direction away from the first housing 610 so as to support the drive shaft 530.

The first housing 610 and the second housing 620 can be designed such that the center of the first housing 610 and the center of the second housing 620 are coaxial with each other. Coaxial location of the drive shaft 530 and the drum rotating shaft 6341 is favorable to power transmission. Therefore, the first housing shaft receiver 612 configured to rotatably support the drum rotating shaft 6341 and the second housing shaft receiver 623 configured to rotatably support the drive shaft 530 can be coaxially coupled to each other.

The drive shaft 530 can be inserted into the second housing 620 so as to be rotatably supported in the second housing 620. The washer 540 configured to rotatably support the rotor 520 can be coupled to the drive shaft 530. The washer 540 can include an accommodation body 542 provided with a shaft support hole 543 defined through the center thereof so as to accommodate the drive shaft 530, and a washer coupling body 541 configured to extend from the outer circumferential surface of the accommodation body 542 so as to form a plane to which the rotor 520 is coupled. The shaft support hole 543 can be provided to have a recess shape corresponding to the shape of a protrusion provided on the outer circumferential surface of the drive shaft 530.

The washer 540 can include one or more washer coupling protrusions 5411 provided to protrude from the washer coupling body 541 in a direction away from the reducer 600. Further, the washer 540 can include one or more washer coupling holes 5412 defined through the washer coupling body 541.

The washer coupling protrusions 5411 can be coupled to receiving recesses provided in the rotor 520. Fastening members passing through the rotor 520 can be inserted into the washer coupling holes 5412, and can thus be used to couple the rotor 520 and the washer 540.

The washer coupling protrusions 5411 and the washer coupling holes 5412 can be provided in plural so as to be alternately arranged on the surface of the washer coupling body 541 in the circumferential direction.

Figure 7:
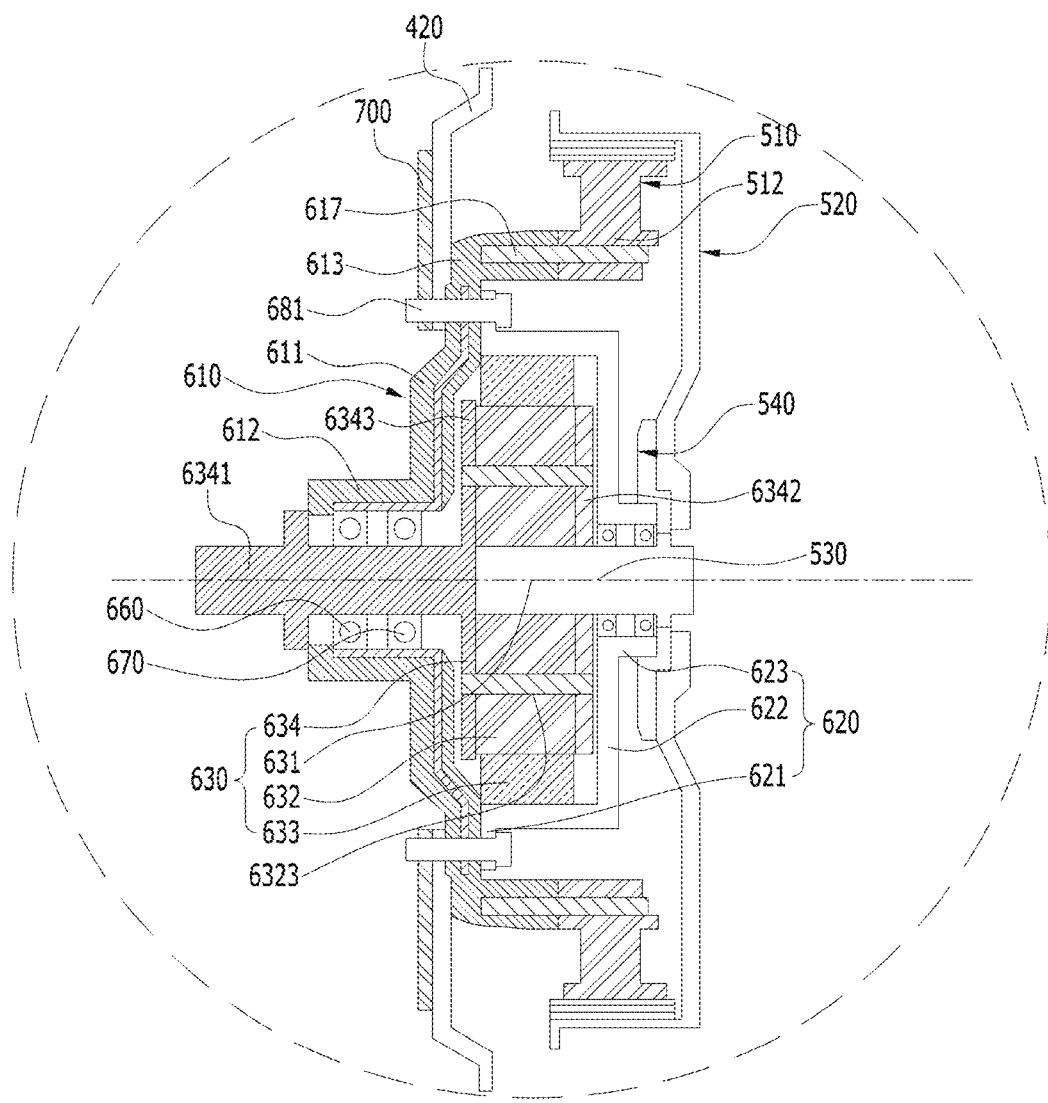
FIG. 7 is a diagram illustrating an enlarged cross-sectional view of a motor and the reducer in FIG. 4.

FIG. 7 is a diagram illustrating an enlarged cross-sectional view of the driving unit in FIG. 4.

The driving unit can include the motor 500 configured to generate rotational power and the reducer 600 configured to reduce the rotational velocity of the motor 500 and then to transmit the reduced rotational velocity to the drum 200. The reducer 600 can include the drum rotating shaft 6341 configured to rotate the drum 200.

The motor 500 can include the stator 510 configured to generate a rotating magnetic field by external power, and the rotor 520 provided to surround the outer circumferential surface of the stator 510. Permanent magnets can be arranged on the inner circumferential surface of the rotor 520.

The permanent magnets located on the inner circumferential surface of the rotor 520 can be moved in a specific direction by the rotating magnetic field generated by the stator 510, and the permanent magnets can be coupled to the inner circumferential surface of the rotor 520. Therefore, the rotor 520 can be rotated by the rotating magnetic field of the stator 510.

The drive shaft 530 rotated together with the rotor 520 so as to transmit the rotational power of the rotor 520 can be coupled to the center of rotation of the rotor 520. The drive shaft 530 can be provided to be rotated together with the rotor 520. The drive shaft 530 can be coupled to the rotor 520 through the washer 540.

Although the drive shaft 530 may be directly coupled to the rotor 520, the drive shaft 530 can be more firmly coupled to the rotor 520 through the washer 540 and thus, in some implementations, can more effectively transmit the rotational power of the rotor 520. Further, in some implementations, concentrated application of load to the drive shaft 530 can be prevented, and thus, durability of the drive shaft 530 can be increased.

The drive shaft 530 may be directly connected to the drum 200, but the drive shaft 530 is rotated at the same velocity as the rotational velocity of the rotor 520 and thus it may be necessary to reduce the rotational velocity of the drive shaft 530. Therefore, the drive shaft 530 can be connected to the reducer 600, and the reducer 600 can be connected to the drum 200. For example, the reducer 600 can reduce the rotational velocity of the drive shaft 530 so that the drum 200 is rotated at the reduced rotational velocity.

The reducer 600 can include the first housing 610 and the second housing 620 defining the external appearance of the reducer 600, and a gear box 630 configured to reduce the power of the drive shaft 530. The second housing 620 can provide a space for accommodating the gear box 630, and the first housing 610 can shield the space provided by the second housing 620.

The second housing 620 can include the second housing coupling body 621 coupled to the first housing 610, the second housing shield body 622 configured to extend rearwards from the inner circumferential surface of the second housing coupling body 621 so as to provide the space for accommodating the gear box 630, and the second housing shaft receiver 623 configured to extend rearwards from the second housing shield body 622 so as to accommodate the drive shaft 530.

The gear box 630 can include a ring gear 633 installed along the inner circumferential surface of the second housing shield body 622. One or more planet gears 632 engaged with the ring gear 633 can be provided on the inner circumferential surface of the ring gear 633, and a sun gear 631 engaged with the planet gears 632 and rotated together with the drive shaft 530 can be provided inside the ring gear 633.

The sun gear 631 can be provided to be coupled to the drive shaft 530 so as to be rotated. The sun gear 631 can be provided as a member separately from the drive shaft 530, but, in some implementations, the sun gear 631 can be formed integrally with the drive shaft 530.

The sun gear 631, the planet gears 632, and the ring gear 633 can be provided as helical gears. When the respective gears 631, 632, and 633 are provided as helical gears, noise can be reduced and power transmission efficiency can be increased. In some implementations, the sun gear 631, the planet gears 632, and the ring gear 633 can be provided as spur gears.

As one example of operation of the gear box 630, when the drive shaft 530 and the sun gear 631 coupled to the drive shaft 530 are rotated as the rotor 520 is rotated, the planet gears 632 engaged with the outer circumferential surface of the sun gear 631 can be rotated through engagement between the ring gear 633 and the sun gear 631.

Each of the planet gears 632 can include a planet gear shaft 6323 inserted into the center of rotation of the planet gear 632. The planet gear shaft 6323 can rotatably support the planet gear 632.

The reducer 600 can further include a first carrier 6342 and a second carrier 6343 configured to support the planet gear shafts 6323 of the planet gears 632. The front parts of the planet gear shafts 6323 can be supported by the second carrier 6343, and the rear parts of the planet gear shafts 6323 can be supported by the first carrier 6342.

The drum rotating shaft 6341 can be provided to extend from the center of rotation of the second carrier 6343 in a direction away from the motor 500. The drum rotating shaft 6341 can be provided as an element separately from the second carrier 6343, and can be coupled to the second carrier 6343 so as to be rotated together therewith. In some implementations, the drum rotating shaft 6341 can be formed integrally from the second carrier 6343 so as to extend from the second carrier 6343.

The drum rotating shaft 6341 can be coupled to the drum so as to rotate the drum. As described above, the drum rotating shaft 6341 can be coupled to the drum via a connector, such as the bushing, as described above, or can be directly coupled to the drum without a separate connector.

The drum rotating shaft 6341 can be supported by the first housing 610. The first housing 610 can include the first housing shield body 611 provided to shield the accommodating space of the second housing 620, and the first housing shaft receiver 612 configured to extend from the first housing shield body 611 in the direction away from the second housing 620 so as to accommodate the drum rotating shaft 6341. A first bearing 660 and a second bearing 670 can be provided on the inner circumferential surface of the first housing shaft receiver 612 by press fit, thus being capable of rotatably supporting the drum rotating shaft 6341.

The first housing 610 and the second housing 620 can be coupled to each other by reducer fastening members 681. Further, the reducer fastening members 681 can simultaneously pass through both the first housing 610 and the second housing 620 so as to couple the two housings 610 and 620 to each other. In addition, the reducer fastening members 681 can simultaneously pass through the first housing 610, the second housing 620 and the rear plate 420 so as to couple the reducer 600 to the rear plate 420 simultaneously with coupling of the first housing 610 and the second housing 620.

The rear plate 420 can be formed as a steel plate having a small thickness. Therefore, it may be difficult to secure stiffness of the rear plate 420 so as to support all of the reducer 600, the motor 500 coupled to the reducer 600, and the drum 200 connected to the reducer 600. Accordingly, in order to secure stiffness of the rear plate 420 when the reducer 600 is coupled to the rear plate 420, the bracket 700 can be used. The bracket 700 can be made of a material having higher stiffness than the rear plate 420, and can be coupled to the front or rear surface of the rear plate 420.

The bracket 700 can be coupled to the front surface of the rear plate 420 so as to secure stiffness of the rear plate 420 to couple the reducer 600 to the rear plate 420, and the reducer 600 can be simultaneously coupled both to the rear plate 420 and the bracket 700. In some implementations, in order to couple the rear plate 420, the bracket 700 and the reducer 600, fastening members, such as bolts, can be used.

In addition or alternatively, in some implementations, in order to fix the reducer 600 to the rear plate 420, the reducer fastening members 681 used to couple the first housing 610 and the second housing 620 can be used. For example, the reducer fastening members 681 can pass through the second housing 620, the first housing 610, the rear plate 420 and the bracket 700 at once, thus being capable of coupling the same. In this case, the front surface of the rear plate 420 can be supported by the bracket 700 and the rear surface of the rear plate 420 can be supported by the first housing 610, and thus, the rear plate 420 can secure stiffness even when the reducer 600 is coupled thereto. In some implementations, the first housing 610 and the second housing 620 can be first coupled using the reducer fastening members 681 and then the reducer 600 can be coupled to the rear plate 420 using separate fastening members.

Further, stator couplers 613 configured such that the motor 500 is coupled thereto can be provided at the radially outer part of the first housing 610. Each of the stator couplers 613 can include a coupling recess.

The stator 510 can be directly coupled to the rear plate 420, or can be coupled to the stator couplers 613. The stator 510 can include fixing ribs 512 provided on the inner circumferential surface of the stator 510 so as to support the stator 510. The fixing ribs 512 can be coupled to the stator couplers 613. The fixing ribs 512 and the stator couplers 613 can be coupled to each other by stator coupling pins 617.

The motor 500 is coupled to the reducer 600 while being spaced apart from the rear plate 420, and thus, the motor 500 and the reducer 600 can form one vibrator. Therefore, even when vibration is applied from the outside, the drive shaft 530 coupled to the rotor 520 and the drum rotating shaft 6341 connected to the reducer 600 can easily remain coaxial with each other.

The axial direction of the drum rotating shaft 6341 is danger of deviating from the original direction thereof due to vibration of the drum 200. However, since the motor 500 is coupled to the first housing 610 configured to support the drum rotating shaft 6341, when the axial direction of the drum rotating shaft 6341 may deviate from the original direction thereof, the axial direction of the drive shaft 530 also deviates from the original direction thereof in a similar manner to the drum rotating shaft 6341. For example, the motor 500 is moved integrally with the reducer 600, and thus, the drum rotating shaft 6341 and the drive shaft 530 can remain coaxial with each other even when external force is applied from the outside.

The above-described coupling structure can increase efficiency and reliability in transmission of power generated by the motor 500 to the drum 200, and can prevent abrasion of the gear box 630, reduction in power transmission efficiency, and reduction in durability and reliability due to misalignment between the drum rotating shaft 6341 and the drive shaft 530.

Figure 8:
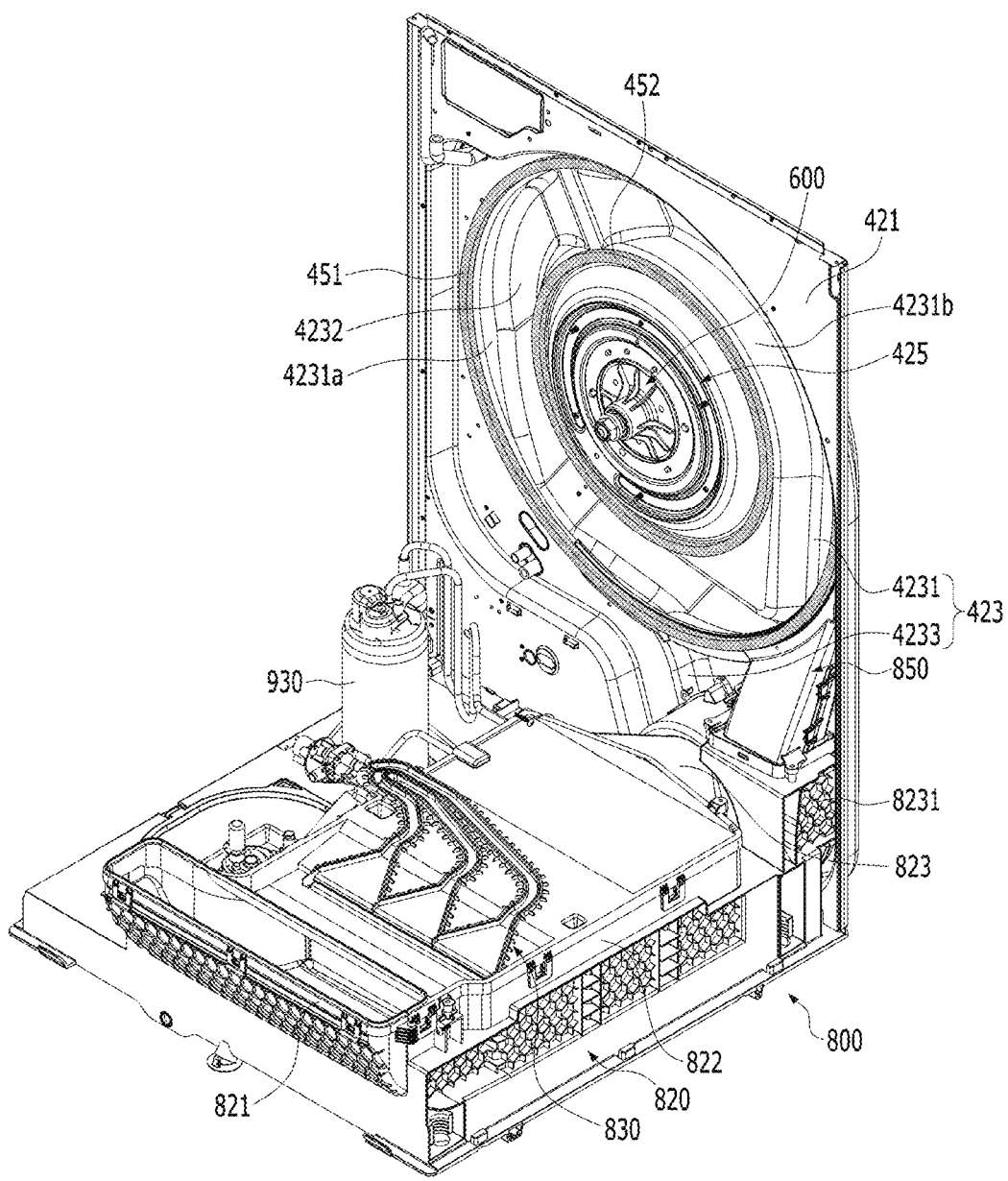
FIG. 8 is a diagram illustrating a perspective view of an exemplary base and an exemplary rear plate.

FIG. 8 is a diagram illustrating the base and the rear plate.

Referring to FIG. 8, the rear plate 420 can be located behind the drum. The rear plate 420 can guide hot air discharged from the circulation flow path part 820 to the drum. For example, the rear plate 420 can be located behind the drum, and can provide a flow path part so as to uniformly supply hot air to the entirety of the drum.

The rear plate 420 can include the rear panel 421 provided to face the drum rear surface, and the duct 423 recessed rearwards from the rear panel 421 so as to form the flow path. The duct 423 can be provided by pressurizing the rear panel 421 rearwards. The duct 423 can be provided to accommodate a part of the drum rear surface.

The duct 423 can include an inlet part 4233 located behind the circulation flow path part 820, and a flowing part 4231 located behind the drum. The flowing part 4231 can be provided to accommodate a part of the drum. The flowing part 4231 can accommodate the part of the drum, and can provide a flow path provided behind the drum.

The flowing part 4231 can be provided in a ring shape so as to face the intake holes defined in the drum rear surface. The flowing part 4231 can be recessed from the rear panel 421. For example, the flowing part 4231 can be provided with an opened front surface, and the flowing part 4231 and the rear surface of the drum can provide the flow path.

When the front surface of the flowing part 4231 is opened, hot air moved to the flowing part 4231 can be moved directly to the drum without passing through any separate elements. Therefore, heat loss caused when hot air passes through other elements can be prevented. That is, drying efficiency can be increased by reduction in heat loss of hot air.

The rear plate 420 can include the mounting part 425 provided inside the flowing part 4231 in the radial direction. The mounting part 425 can provide a space to which the reducer 600 or the motor 500 is coupled. For example, the rear plate 420 can include the mounting part 425 provided at the inner part thereof, and the flowing part 4231 provided in a ring shape outside the mounting part 425 in the radial direction.

Specifically, the flowing part 4231 can include an outer circumferential surface 4231a configured to surround an inner space in which hot air flows. Further, the flowing part 4231 can include an inner circumferential surface 4231b configured to surround the inner space in which hot air flows. For example, the outer circumferential surface 4231a can provide the outer circumference of the flowing part 4231, and the inner circumferential surface 4231b can provide the inner circumference of the flowing part 431.

Further, the flowing part 4231 can include a recessed surface 4232 defining the rear surface of the flow path along which hot air moves. The recessed surface 4232 can be provided to connect the outer circumferential surface 4231a and the inner circumferential surface 4231b. For example, the outer circumferential surface 4231a, the inner circumferential surface 4231b and the recessed surface 4232 can provide the space in which hot air discharged from the circulation flow path part flows.

Further, the recessed surface 4232 can block hot air from leaking rearwards, and can thus guide the hot air towards the drum. For example, the recessed surface 4232 can indicate the recessed surface of the flowing part 4231.

The inlet part 4233 can be located to face the circulation flow path part 820. The inlet part 4233 can be located to face the air blowing part 8231. The inlet part 4233 can be recessed rearwards from the rear panel 421 so as to block interference with the air blowing part 8231. The upper portion of the inlet part 4233 can be connected to the flowing part 4231.

The laundry treating apparatus can include the connector 850 connected to the air blowing part 8231. The connector 850 can guide hot air discharged from the air blowing part 8231 to the flowing part 4231. The connector 850 can provide a flow path therein, and thereby, can guide hot air discharged from the air blowing part 8231 to the flowing part 4231. For example, the connector 850 can provide the flow path for connecting the air blowing part 8231 to the flowing part 4231. The connector 850 can be provided such that the cross-sectional area of the flow path in the connector 850 increases as the distance from the air blowing part 8231 increases.

The connector 850 can be located to face the inlet part 4233. The inlet part 4233 can be recessed rearwards so as to block interference with the connector 850. Further, the upper end of the connector 850 can divide the flowing part 4231 and the inlet part 4233 from each other. For example, hot air discharged from the connector 850 can flow into the flowing part 4231, and inflow of the hot air into the inlet part 4233 can be blocked.

The connector 850 can be provided to uniformly supply hot air to the flowing part 4231. The connector 850 can be provided such that the width thereof increases as the distance from the air blowing part 8231 increases. The upper end of the connector 850 can be located along the extension line of the outer circumferential surface 4231a in the circumferential direction.

Therefore, hot air discharged from the connector 850 does not flow towards the inlet part 4233, and can be uniformly supplied to the flowing part 4231. The connector 850 can prevent the hot air from being concentrated on one side of the flowing part 4231, thus being capable of uniformly supplying the hot air to the inside of the drum. Therefore, laundry drying efficiency can be increased.

The connector 850 can be provided such that the width thereof increases in the upstream direction, and thus, the velocity of hot air moving along the connector 850 can be decreased in the flow direction of the hot air. For example, the connector 850 can function as a diffuser configured to control the velocity of the hot air. The connector 850 can decrease the velocity of the hot air so as to prevent the hot air from being concentratedly supplied to a specific region.

Due to the above-described shape of the connector 850, the inlet part 4233 provided to face the connector 850 and to block interference with the connector 850 can be provided such that the width thereof increases as the distance from the air blowing part 8231 increases. The duct 423 can be generally shaped like the number 9, as seen from the front, due to the shape of the inlet part 4233.

Since the drum is provided to be rotated during the drying cycle, the drum can be spaced apart from the flowing part 4231 by a designated distance. Hot air may leak through such a space.

Therefore, the laundry treating apparatus can further include the sealing unit 450 configured to prevent hot air from leaking through the space between the drum and the flowing part 4231. The sealing unit 450 can be located along the circumference of the flowing part 4231.

The sealing unit 450 can include the first sealing member 451 provided along the outer circumference of the flowing part 4231. The first sealing member 451 can be provided between the drum and the outer circumference of the flowing part 4231. Further, the first sealing member 451 can be provided to come into contact with both the drum rear surface 220 and the rear plate 420 so as to more effectively block leakage of hot air.

The first sealing member 451 can be provided to come into contact with the front surface of the connector 850. Further, the first sealing member 451 can be provided to come into contact with the upper end of the connector 850. The connector 850 together with the flowing part 4231 can provide the flow path in which hot air flows. Therefore, the first sealing member 451 can be provided to come into contact with the connector 850 so as to block hot air from leaking through a gap between the drum and the connector 850.

The sealing unit 450 can include the second sealing member 452 provided along the inner circumference of the flowing part 4231. The second sealing member 452 can be provided between the drum and the inner circumference of the flowing part 4231. Further, the second sealing member 452 can be provided to come into contact with both the drum rear surface 220 and the rear plate 420. The second sealing member 452 can block hot air flowing along the flowing part 4231 from leaking towards the mounting part 425.

The drum 200 is rotated during the operating process of the laundry treating apparatus, and thus, friction is continuously applied to the sealing unit 450 by the drum rear surface 220. Therefore, the sealing unit 450 can be made of a material which can seal a gap between the drum rear surface 220 and the flowing part 4231 without performance degradation even by frictional force or frictional heat generated due to rotation.

Figure 9:
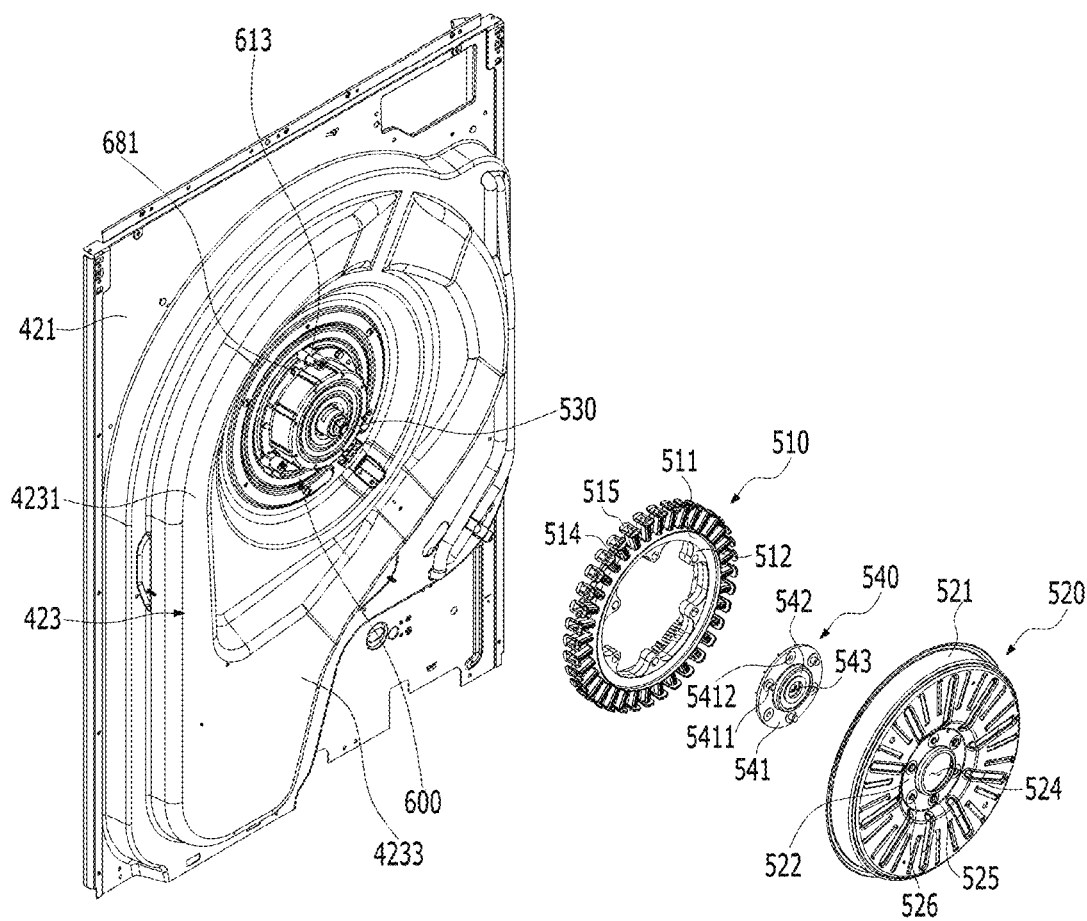
FIG. 9 is a diagram illustrating an exploded perspective view of an exemplary coupling structure among the rear plate, the reducer, and the motor.

FIG. 9 is a diagram illustrating a coupling structure between the rear plate, the reducer, and the motor.

Referring to FIG. 9, the reducer 600 can be supported by the rear plate 420, and the motor 500 can be coupled to the reducer 600. For example, the rear plate 420 can be provided to support both the reducer 600 and the motor 500.

The motor 500 configured to provide rotational power and the reducer 600 configured to reduce the power of the motor 500 and then to transmit the reduced power to the drum can be located behind the rear plate 420.

The reducer 600 can be installed on the rear plate 420 so as to be located inside the duct 423. The reducer 600 can be located inside the flowing part 4231 in the radial direction so as to block interference with the flowing part 4231.

The gear assembly in the reducer 600 may be damaged by heat of hot air moving along the flowing part 4231. Therefore, the flowing part 4231 and the reducer 600 can be provided to be spaced apart from each other by a designated distance.

The reducer 600 can be coupled to the rear plate 420 so as to pass through the rear plate 420. Therefore, the reducer 600 can be connected to the drum located in front of the rear plate 420.

The stator 510 can be coupled to the reducer 600. The stator 510 can be coupled to the reducer 600 so as to be spaced apart from the rear plate 420. Here, the reducer 600 can be located between the drum and the motor 500, and can support the drum and the motor 500 so as to be spaced apart from the rear plate 420. For example, the reducer 600 can become a center of support of the drum and the motor 500.

The stator 510 can include a main body 511 provided in a ring shape, the fixing ribs 512 configured to extend from the inner circumferential surface of the main body 511 and coupled to the stator couplers 613 of the reducer 600, teeth 514 configured to extend from the outer circumferential surface of the main body 511 along the circumference thereof and provided such that coils are wound on the teeth 514, and pole shoes 515 provided at the free ends of the teeth 514 so as to block the coils from being released from the teeth 514.

The rotor 520 can include a rotor body 521 provided in a hollow cylindrical shape. The rotor 520 can include an installation body 522 recessed forwards from the rear surface of the rotor body 521. The permanent magnets can be arranged along the inner circumferential surface of the rotor body 521.

The rotor 520 can be coupled to the drive shaft 530 so as to transmit the rotational power of the rotor 520 to the outside through the drive shaft 530. The drive shaft 530 can be connected to the rotor 520 through the washer 540.

Further, the motor 500 can include the washer 540 configured to support the drive shaft 530. The washer 540 can include the washer coupling body 541 coupled to the rotor 520. The washer coupling body 541 can be provided in a disk shape.

The washer 540 can include the accommodation body 542 accommodated in the rotor 520. The accommodation body 542 can be provided to protrude rearwards from the washer coupling body 541. The washer 540 can include the shaft support hole 543 defined through the center of the accommodation body 542. The drive shaft 530 can be inserted into the shaft support hole 543 so as to be supported by the washer 540.

Further, the washer 540 can include the washer coupling holes 5412 defined through the washer coupling body 541. Further, the installation body 522 can include rotor coupling holes 526 provided at positions thereof corresponding to the washer coupling holes 5412. For example, the washer 540 and the rotor 520 can be coupled to each other by coupling members simultaneously passing through both the washer coupling holes 5412 and the rotor coupling holes 526. The washer 540 and the rotor 520 can be coupled to each other to be rotated together therewith.

Further, the washer 540 can include the washer coupling protrusions 5411 protruding rearwards from the washer coupling body 541. Further, the installation body 522 can include washer protrusion accommodation holes 525 provided to correspond to the washer coupling protrusions 5411. The washer coupling protrusions 5411 can be inserted into the washer protrusion accommodation holes 525 so as to support coupling between the washer 540 and the rotor 520.

Further, the rotor 520 can include a rotor installation hole 524 defined through the center of the installation body 522. The rotor installation hole 524 can accommodate the accommodation body 542. Thereby, the washer 540 can be rotated together with the drive shaft 530 by the rotor 520, and can firmly support coupling between the drive shaft 530 and the rotor 520. Therefore, durability and reliability of the entirety of the motor 500 can be secured.

Figure 10:
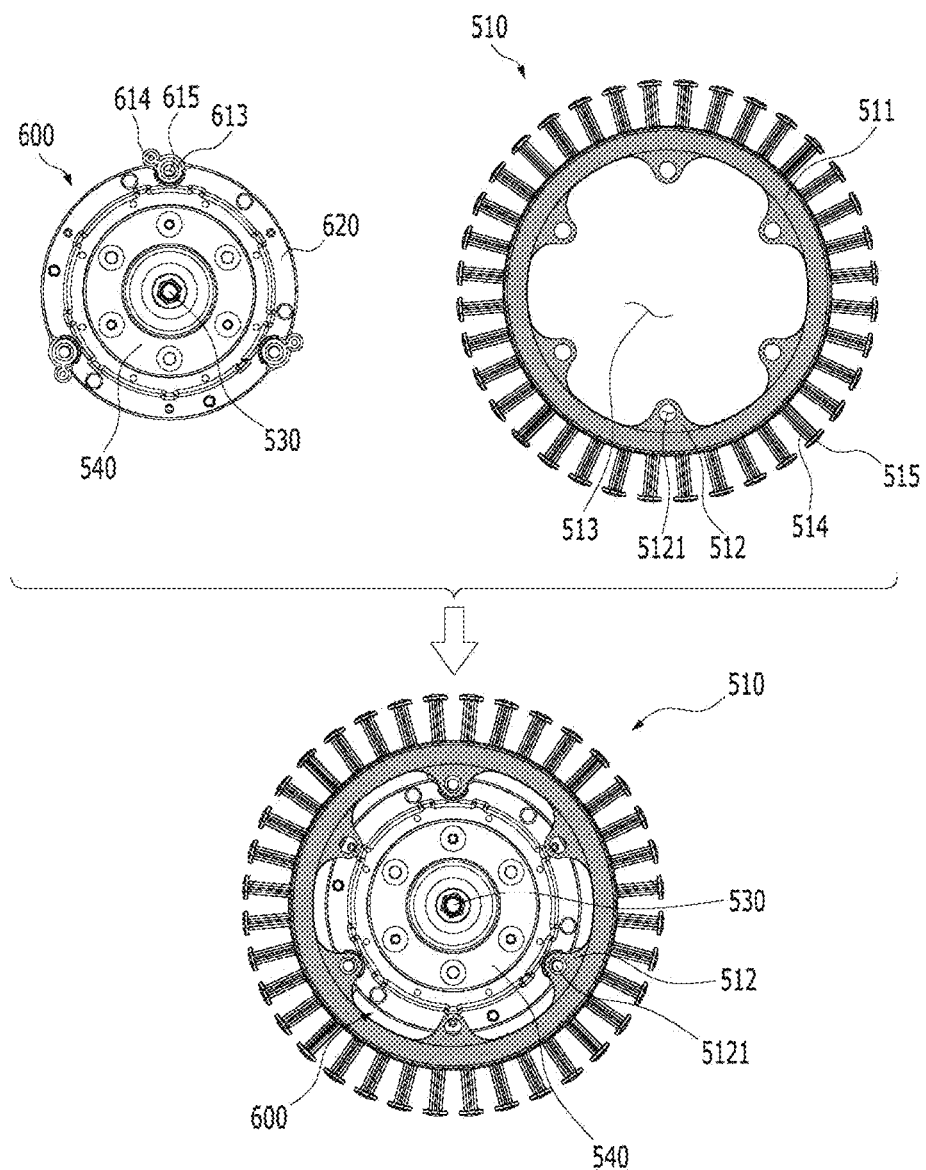
FIG. 10 is a diagram illustrating a view of an exemplary coupling structure between the reducer and a stator.

FIG. 10 is a diagram illustrating a rear view of a coupling structure between the reducer and the stator.

The stator 510 can include the main body 511 coupled to the reducer 600 and provided in a ring shape, the fixing ribs 512 configured to extend from the inner circumferential surface of the main body 511 and coupled to the stator coupling holes 615 of the reducer 600, the teeth 514 configured to extend from the outer circumferential surface of the main body 511 along the circumference thereof and provided such that the coils are wound on the teeth 514, the pole shoes 515 provided at the free ends of the teeth 514 so as to block the coils from being released from the teeth 514, and a terminal controlled to supply current to the coils.

The stator 510 can include an accommodation space 513 provided through the main body 511 and provided inside the main body 511. A plurality of fixing ribs 512 can be provided inside the main body 511 to be spaced apart from each other by a designated angle in the accommodation space 513, fixing rib holes 5121 can be provided in the fixing ribs 512 so that fixing members are installed in the fixing rib holes 5121, and thus, the fixing rib holes 5121 and the stator coupling holes 615 of the reducer 600 can be coupled using the fixing members, such as pins.

When the stator 510 is directly coupled to the reducer 600, a part of the reducer 600 can be accommodated in the stator 510. For example, when the reducer 600 is accommodated in the stator 510, the total thickness of the driving unit including the reducer 600 and the motor 500 can be reduced and thus the volume of the drum can be expanded.

For this purpose, the reducer 600 can have a smaller diameter than the diameter of the main body 511. For example, the maximum diameter out of the diameters of the first housing 610 and the second housing 620 can be smaller than the diameter of the main body 511. Thereby, at least a part of the reducer 600 can be accommodated in the main body 511. However, the stator couplers 613 can extend to overlap the fixing ribs 512 in the housing unit of the reducer 600. Thereby, the stator couplers 613 can be coupled to the fixing ribs 512, and a portion of the first housing 610 and the second housing 620 can be located in the main body 511.

Figure 11:
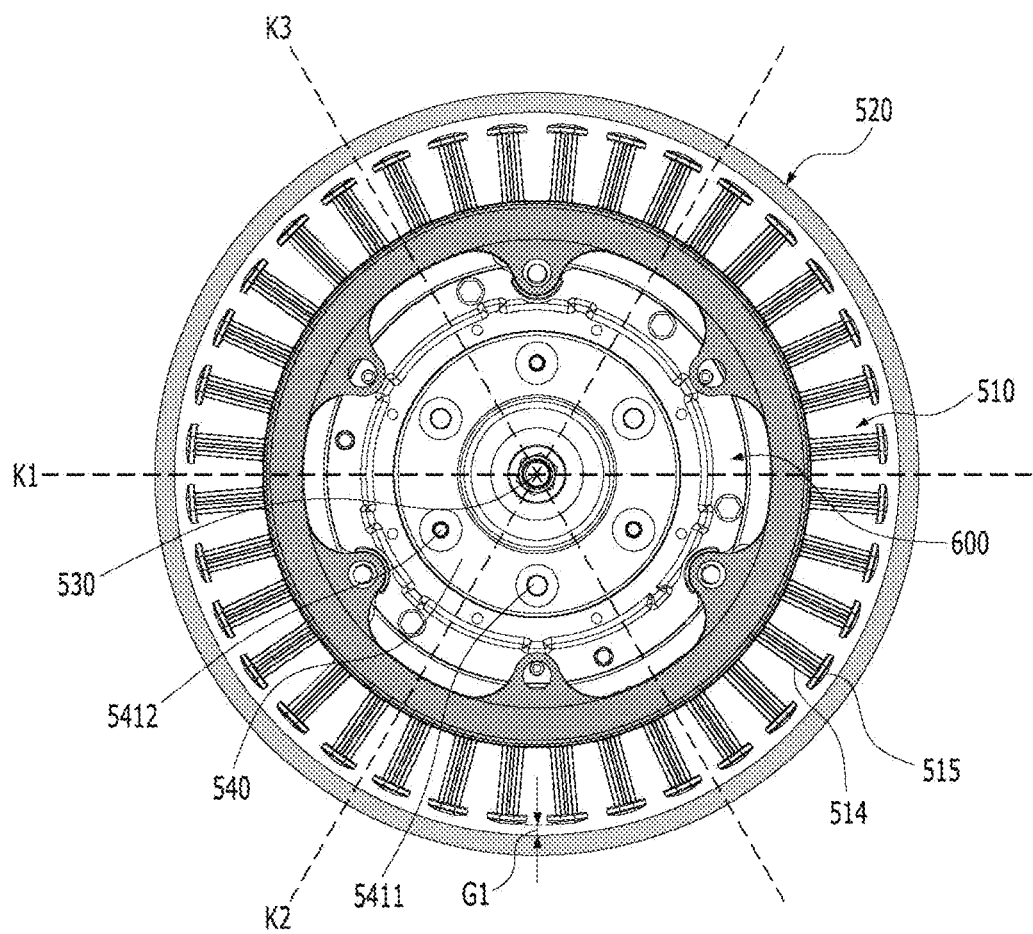
FIG. 11 is a diagram illustrating a plan view of the exemplary coupling between the reducer and the motor.

FIG. 11 is a diagram illustrating coupling between the reducer and the motor.

The stator 510 can be coupled to the reducer 600. At least a portion of the reducer 600 can be accommodated in the main body 511 by coupling the stator 510 to the stator couplers 613 protruding outwards from the housing unit of the reducer 600. Thereby, the center of the main body 511, the drive shaft 530 and the center of the reducer 600 can always remain coaxial with one another.

The rotor 520 can be disposed so as to accommodate the stator 510 in the state in which the rotor 520 is spaced apart from the pole shoes 515 by a designated distance. Since the rotor 520 is coupled to the reducer 600 in which the drive shaft 530 is accommodated in the main body 511, a distance G1 between the rotor 520 and the stator 510 can always be maintained.

Therefore, collision between the rotor 520 and the stator 510 or temporary torsional rotation of the rotor 520 on the stator 510 can be prevented, and thus, noise or unnecessary vibration can be blocked.

A first virtual diameter line K1 passing through the center of the reducer 600 and the center of the drive shaft 530, a second virtual diameter line K2 passing through the center of the main body 511, and a third virtual diameter line K3 passing through the center of the rotor 520 can all be defined at the center of rotation of the reducer 600.

Thereby, since the reducer 600 becomes the center of rotation of the drive shaft 530 and the stator 510 is directly coupled to the reducer 600, misalignment of the drive shaft 530 with the reducer 600 can be prevented. Accordingly, reliability of the reducer 600 can be secured.

Figure 12:
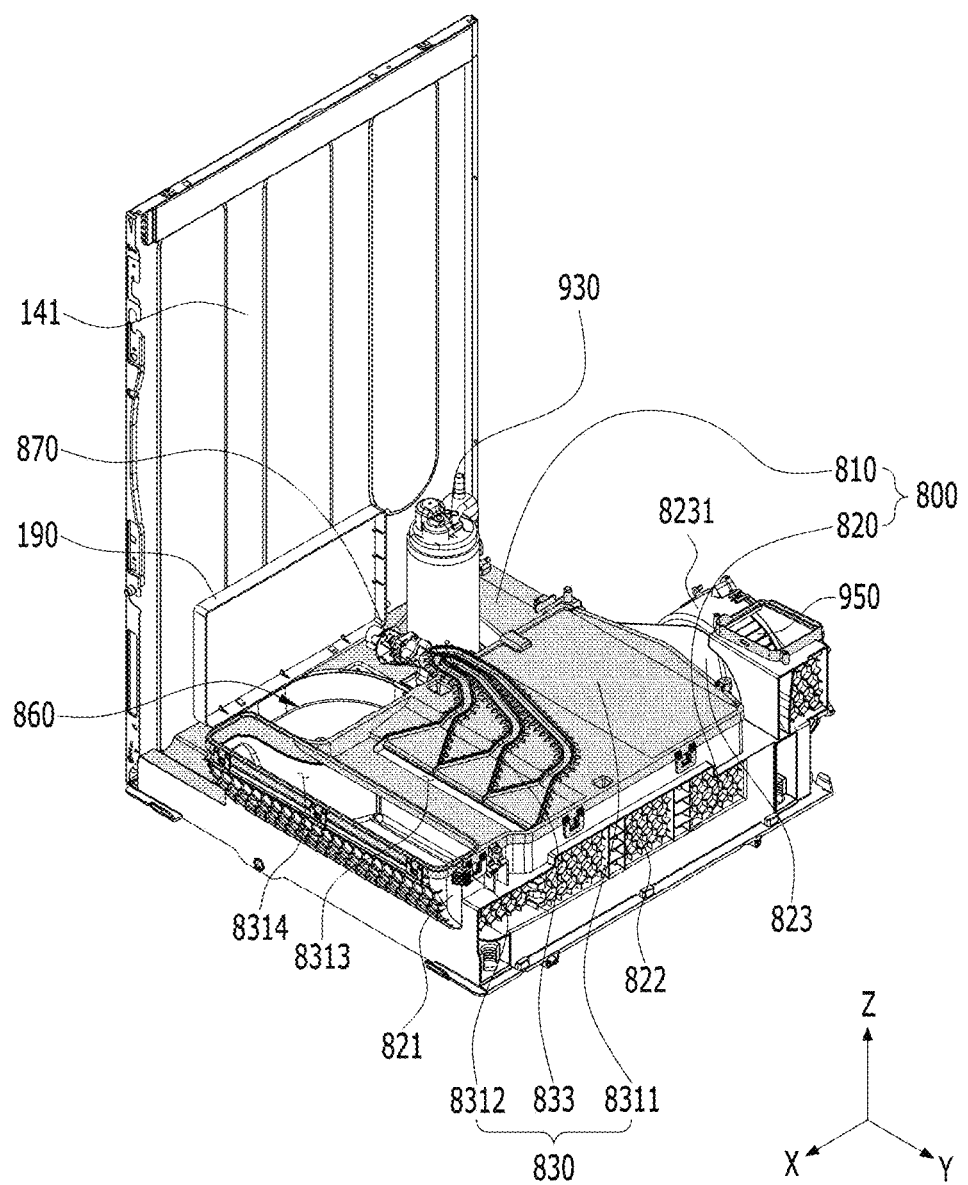
FIG. 12 is a diagram illustrating a perspective view of a base of the exemplary laundry treating apparatus.

FIG. 12 is a diagram illustrating a perspective view of the base of the laundry treating apparatus.

Referring to FIG. 12, the base 800 can include the circulation flow path part 820 provided on one side of the base 800 so as to circulate air in the drum. Further, a device installation part 810 configured to provide a space in which elements necessary to operate the dryer are installed can be provided on the other side of the base 800. The device installation part 810 can be provided outside the circulation flow path part 820.

In the case of the conventional dryer, the circulation flow path part 820 is provided on the base 800, and the driving unit configured to drive the drum 200 is also installed on the base 800. Since the driving unit occupies a majority part of the installation space on the base 800, the device installation part 810 formed in the space on the base 800 rather than the circulation flow path part 820 has a narrow space, and thus, it is not easy to install other elements of the laundry treating apparatus at the device installation part 810.

However, in the laundry treating apparatus, the motor 500 configured to rotate the drum 200 can be spaced apart from the base 800 and disposed behind the drum 200, and thus, the space on the base 800 in which the driving unit was conventionally installed can be used in various ways.

The compressor 930 configured to compress a refrigerant necessary for heat exchange can be installed at the device installation part 810. Further, the base 800 can include a water collection part 860 provided to be spaced apart from the compressor 930 and configured to collect condensed water generated by the circulation flow path part 820. A control box 190 configured to control the compressor 930, the motor, etc. can be installed at the device installation part 810.

The control box 190 can be installed on the base 800 so as to be firmly supported. Further, connection wires for connecting the control box 190 to the elements controlled by the control box 190 can also be firmly supported by the base 800.

As another example, the water collection part 860 may not be disposed between the compressor 930 and the circulation flow path part 820, and can be disposed to overlap the compressor 930 in the forward and rearward directions. The water collection part 860 can be located in the space in which the motor was conventionally disposed, and thus, the volume of the water collection part 860 can be expanded. When the volume of the water collection part 860 is increased, the frequency of drainage of collected condensed water can be reduced and thus user convenience can be improved.

The side panels defining the side surfaces of the cabinet can be coupled to the side surfaces of the base 800. The side panels can include the left side panel 141 and the right side panel. The control box 190 can be installed at the device installation part 810 close to any one of the side panels.

The control box 190 can control the overall operation of the laundry treating apparatus. Therefore, the control box 190 can often be checked or repaired.

When the control box 190 is provided close to the left side panel 141, a user can approach the control box 190 only by removing the left side panel 141. Therefore, ease of maintenance can be increased.

When the left side panel 141 is removed, easy access to various elements, such as the compressor 930 and the control box 190, is possible, and thus, the left side panel 141 may be referred to as a service panel.

FIG. 12 is a diagram illustrating the state in which the device installation part 810 is located at the left side of the base 800 and thus, when the left side panel 141 is removed, the user can approach the control box 190. In some implementations, in the case in which the circulation flow path part 820 is provided at the left side of the base 800 and the device installation part 810 is provided at the right side of the base 800, the control box 190 or compressor 930 can be repaired or checked by removing the right side panel.

The circulation flow path part 820 can further include the duct cover 830 located above the circulation flow path part 820 so as to provide the flow path in which air discharged from the drum flows. The duct cover 830 can be coupled to the open upper surface of the circulation flow path part 820.

The upper surfaces of the inflow duct 821 and the transfer duct 822 are open, and thus, air can enter and exit the inflow duct 821 and the transfer duct 822 through the open upper surfaces thereof. The duct cover 830 can shield the open upper surface of the transfer duct 822. Therefore, the duct cover 830 can allow air of the drum to enter the inflow duct 821, and can block the air having entered the inflow duct 821 from leaking through the open upper surface of the transfer duct 822. For example, the duct cover 830 can define one surface of the flow path guiding the air having entered the inflow duct 821 to the discharge duct 823.

The discharge duct 823 can include the air blowing part 8231 configured to discharge air to the outside of the discharge duct 823. The air blowing part 8231 can discharge air having passed through the inflow duct 821 and the transfer duct 822 to the outside of the discharge duct 823.

The air blowing part 8231 can provide a space in which the circulation flow path fan 950 configured to circulate air in the drum is installed. The circulation flow path fan 950 can forcibly circulate air to increase the circulation rate of air, and can thus increase the drying rate of laundry and shorten a time taken to dry the laundry.

When the circulation flow path fan 950 is rotated, air can be discharged through the opening defined at the upper part of the air blowing part 8231. The air discharged from the air blowing part 8231 can again enter the drum so as to be used to dry laundry in the drum.

Various types of fans can be applied as the circulation flow path fan 950. For example, a sirocco fan can be applied so as to enable air to enter in the direction of a rotating shaft and then to discharge air in the radial direction. In some implementations, various fans can be used to generate air flow depending on the purposes of design.

The duct cover 830 can include a communication cover body 8312 coupled to the upper portion of the inflow duct 821, and a shield cover body 8311 coupled to the upper portion of the transfer duct 822. The shield cover body 8311 can extend from the communication cover body 8312, and the shield cover body 8311 can be provided integrally with the communication cover body 8312.

The communication cover body 8312 can include an inflow communication hole 8314 configured such that the drum and the inflow duct 821 communicate with each other therethrough. The inflow communication hole 8314 can guide air discharged from the drum to the inflow duct 821 even when the communication cover body 8312 is coupled to the inflow duct 821.

Further, the shield cover body 8311 can shield the upper surface of the transfer duct 822, and thus, air having entered the inflow duct 821 can be guided to the discharge duct 823 without leaking to the outside of the circulation flow path part 820 through the transfer duct 822.

The shield cover body 8311 can include washing flow path parts 833 provided on the upper surface thereof such that water can flow along the washing flow path parts 833. The washing flow path parts 833 can receive water, and can spray water towards the first heat exchanger located under the duct cover 830.

A cover through hole 8313 vertically defined through the shield cover body 8311 can be provided at the downstream region of the washing flow path part 833. Water moving along the washing flow path part 833 can be sprayed under the shield cover body 8311 through the cover through hole 8313.

The first heat exchanger configured to dehumidify air discharged from the drum can be provided under the cover through hole 8313. Therefore, water having passed through the cover through hole 8313 can be sprayed towards the first heat exchanger so as to wash the first heat exchanger.

A nozzle cover can be coupled to the upper part of the washing flow path part 833. The nozzle cover can shield the open upper surface of the washing flow path part 833. The nozzle cover can block air moving along the transfer duct 822 from leaking through the cover through hole 8313. Further, the nozzle cover can shield the upper surface of the washing flow path part 833 so as to block water moving along the washing flow path part 833 from scattering to the outside.

In some implementations, the circulation flow path part 820 can further include a duct filter provided in front of the first heat exchanger and configured to filter out foreign substances from air having passed through the inflow duct 821. The duct filter can be disposed between the inflow duct 821 and the first heat exchanger so as to block foreign substances from being accumulated on the front surface of the first heat exchanger, and can thus improve drying efficiency and heat exchange efficiency of the first heat exchanger.

When foreign substances are accumulated on the duct filter, circulation of air passing through the inflow duct 821 and the transfer duct 822 may be disturbed. In order to solve such a problem, the washing flow path part 833 can spray water towards the duct filter so as to remove the foreign substances accumulated on the duct filter due to water pressure.

However, for convenience of description, the laundry treating apparatus in which the duct filter is omitted will be described below.

A flow path switch valve 870 coupled to the washing flow path part 833 so as to supply water necessary for washing to the washing flow path part 833 can be further provided. The flow path switch valve 870 can be connected to a water supply source, and can thus selectively supply water to the washing flow path part 833. The water supply source can include the water collection part 860.

The flow path switch valve 870 can be connected to the water collection part 860 by a hose, and can guide water collected in the water collection part 860 to the washing flow path part 833. The flow path switch valve 870 can guide water collected in the water collection part 860 to the water storage tank 120 (with reference to FIG. 3).

Figure 13:
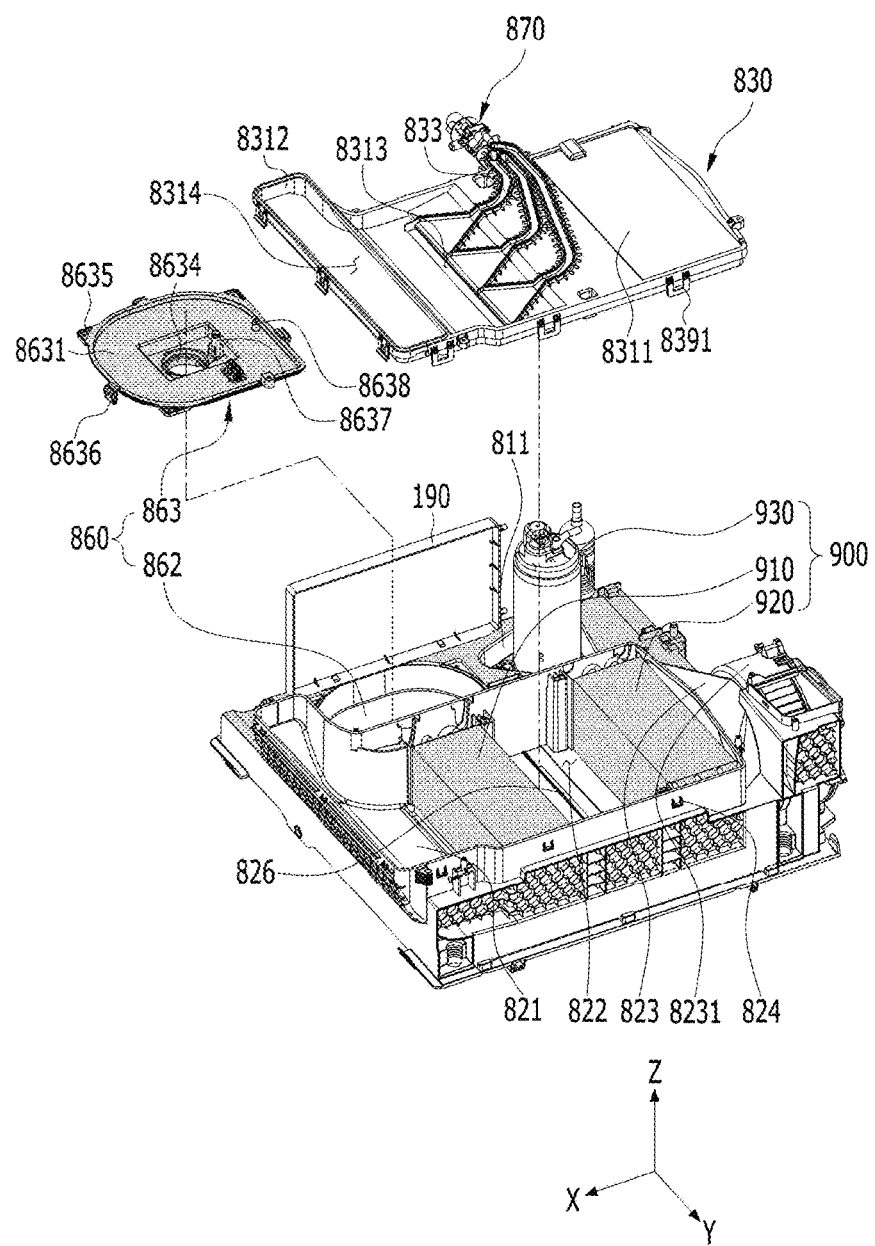
FIG. 13 is a diagram illustrating an exploded perspective view of a duct cover and a water collection cover coupled to an open upper surface of a water collection body, which are separated from the base of FIG. 12.

FIG. 13 is a diagram illustrating an exploded perspective view of the duct cover and a water collection cover separated from the base of FIG. 12.

Referring to FIG. 13, the first heat exchanger 910 and the second heat exchanger 920 configured to sequentially exchange heat with air in the drum 200 can be installed under the duct cover 830 so as to be spaced apart from each other in the forward and rearward directions. Air in the drum 200 having entered into the inflow duct 821 can be dehumidified through heat exchange by the first heat exchanger 910, and the dehumidified air can be heated through heat exchange by the second heat exchanger 920. The heated air can pass through the discharge duct 823, and can be supplied again to the inside of the drum 200.

The circulation flow path part 820 can further include a water cover 826 provided between the first heat exchanger 910 and the bottom surface of the transfer duct 822. The water cover 826 can be provided to be supported by the transfer duct 822.

The water cover 826 can be located under the first heat exchanger 910, and can be provided to support the lower surface of the first heat exchanger 910. The water cover 826 can support the first heat exchanger 910 so that the first heat exchanger 910 is spaced apart from the bottom surface of the transfer duct 822.

The first heat exchanger 910 can produce condensed water through condensation of wet steam discharged from the drum 200. When the condensed water remains in the laundry treating apparatus without being discharged to the outside, odor may be generated or drying efficiency may be reduced. For this purpose, it is necessary to collect the condensed water so as to be spaced apart from the first heat exchanger 910 or the second heat exchanger 920 and to discharge the collected condensed water.

The water cover 826 can support the first heat exchanger 910 so that the first heat exchanger 910 is spaced apart from the bottom surface of the transfer duct 822, and can thus form a space between the bottom surface of the transfer duct 822 and the water cover 826. Condensed water can flow into the water collection part 860 along the space formed by the water cover 826.

The air dehumidified by the first heat exchanger 910 is heated by the second heat exchanger 920, air having passing through the second heat exchanger 920 has a small moisture content and has an increased amount of saturated water vapor depending on heating, and thus, it is difficult to produce condensed water. Therefore, the water cover 826 can be located on the bottom surface of the transfer duct 822 adjacent to the first heat exchanger 910, and can be spaced apart from the second heat exchanger 920.

FIG. 13 is a diagram illustrating a part of the upper surface of the water cover 826, and thus, a description of the shape of the flow path provided by the water cover 826 and the detailed structure of the water cover 826 will be described later.

The base 800 can include the water collection part 860 provided to be spaced apart from the circulation flow path part 820 so as to collect condensed water generated in the circulation flow path part 820. The water collection part 860 can include a water collection body 862 configured to form a space in which the condensed water is collected.

The water collection part 860 can further include a water collection cover 863 configured to shield the open upper surface of the water collection body 862. Elements vulnerable to moisture can be installed around the water collection part 860. Therefore, it is necessary to block the condensed water collected in the water collection body 862 from scattering to the outside. The water collection cover 863 can be coupled to the water collection body 862, and can thus block the condensed water from leaking through the upper surface of the water collection body 862.

Further, the water collection part 860 can include a pump configured to move the condensed water collected in the water collection body 862 to the outside. In order to enable the pump to function properly, the inside of the water collection body 862 should be sufficiently sealed. The water collection cover 863 can seal the inside of the water collection body 862 so as to increase reliability of the pump.

The water collection cover 863 can include a water collection cover body 8631 configured to form the shield surface of the water collection body 862. Further, the water collection cover 863 can include at least one of support bodies 8635 provided to support the water collection cover body 8631, and fastening hooks 8636 provided to couple the water collection cover body 8631 to the water collection body 862.

The support bodies 8635 can protrude from the circumference of the water collection cover body 8631, and can be seated on the base. The fastening hooks 8636 can protrude from the water collection cover body 8631. The fastening hooks 8636 can firmly fix the water collection cover body 8631 to the water collection body 862. The fastening hooks 8636 can be inserted into hook holes which will be described later, so as to be fixed.

The condensed water generated in the circulation flow path part 820 is collected in the water collection body 862. The upper surface of the water collection body 862 is open, and thus, the condensed water may scatter to the outside. However, since the water collection body 862 is located adjacent to the control box 190, the compressor 930, etc., the condensed water scattering to the outside of the water collection body 862 may cause failure of these devices.

The water collection cover 863 can shield the open upper surface of the water collection body 862 using the water collection cover body 8631 so as to block the condensed water from scattering, and the support bodies 8635 and the fastening hooks 8636 can firmly fix the water collection cover body 8631 to the water collection body 862. Therefore, failure of the devices due to scattering of the condensed water can be prevented.

Further, the water collection cover 863 can include a pump installation part 8634 provided through the water collection cover body 8631 and provided such that the pump is inserted into the pump installation part 8634. Further, the water collection cover 863 can include a drain flow path 8637 configured to protrude upwards from the water collection cover body 8631 and provided in a pipe shape configured to enable the inside and the outside of the water collection body 862 to communicate with each other therethrough.

The pump provided to move the condensed water collected in the water collection body 862 to the outside of the water collection body 862 can be installed at the pump installation part 8634. When the pump is operated, the condensed water collected in the water collection body 862 can be discharged through the drain flow path 8637.

A hose can be connected to the drain flow path 8637 so as to guide the condensed water discharged therefrom to the outside of the water collection body 862. One end of the hose can be coupled to the drain flow path 8637, and the other end of the hose can be connected to the flow path switch valve 870. In some implementations, the other end of the hose can be located at an outside of the cabinet so as to directly discharge the condensed water to the outside of the cabinet. The other end of the hose can be connected to the water storage tank 120 (with reference to FIG. 3) located in the upper part of the cabinet so as to guide the condensed water collected in the water collection body 862 to the water storage tank 120.

The water collection cover 863 can further include a return flow path 8638 spaced apart from the drain flow path 8637 and configured to enable the inside and the outside of the water collection body 862 to communicate with each other therethrough. The return flow path 8638 can be provided such that the water collection body 862 and the water storage tank communicate with each other therethrough. The return flow path 8638 can guide water in the water storage tank again to the water collection body 862.

The return flow path 8638 can be connected to the water storage tank 120 (with reference to FIG. 3) provided in the upper part of the cabinet through a hose. In some implementations, in order to prevent the water storage tank 120 from overflowing with water, when the water storage tank 120 is completely filled with water, the water stored in the water storage tank 120 may be moved to the water collection body 862 through the hose configured to connect the return flow path 8638 to the water storage tank 120. Therefore, the frequency of direct drainage of water stored in the water storage tank 120 by the user can be reduced and thus user convenience can be improved.

The flow path switch valve 870 configured to switch the flow path along which the condensed water collected in the water collection part 860 moves can be further provided. The pump can be connected to the flow path switch valve 870 through the hose. Water stored in the water collection body 862 can be moved to the flow path switch valve 870 by the pump. The flow path switch valve 870 can guide the moved water along various paths.

The flow path switch valve 870 can be connected to the washing flow path part 833 so as to guide the water to the washing flow path part 833. The water guided to the washing flow path part 833 can be used to wash the first heat exchanger.

Further, the flow path switch valve 870 can be connected to the water storage tank 120 by the hose so as to guide condensed water moved from the water collection body 862 to the water storage tank 120. The user can directly drain the water storage tank 120 by withdrawing the storage tank 120 in which the condensed water is stored.

The flow path switch valve 870 can be controlled by the control box 190, can be variably operated depending on a point in time of operation of the laundry treating apparatus. For example, when operation of the first heat exchanger 910 is finished during the drying cycle, the control box 190 can control the flow path switch valve 870 so as to guide the condensed water to the washing flow path part 833. Further, at a point in time when washing of the first heat exchanger 910 is terminated, the control box 190 can control the flow path switch valve 870 so as to guide the condensed water to the water storage tank 120.

As described above, in order to normally operate the pump, the inside of the space from which water is drained by the pump can be sealed. The water collection cover 863 can be firmly coupled to the water collection body 862 using the support bodies 8635 and the fastening hooks 8636, and can thus easily seal the space in which the condensed water is stored. Thereby, reliability in operation of the pump can be improved. A sealing member can be additionally provided on the contact surface between the water collection cover 863 and the water collection body 862 so as to improve space sealability.

The water collection cover 863 provided to seal the inside of the water collection body 862 can be detachably provided on the water collection body 862. Foreign substances, such as lint included in the condensed water generated by the first heat exchanger 910, may enter the water collection body 862. When foreign substances having a large particle size enter the water collection body 862, the foreign substances may disturb operation of the pump.

Therefore, in order to remove foreign substances having entered the water collection body 862 as needed, it is necessary to release the water collection cover 863 from the water collection body 862. Therefore, the water collection cover 863 can be detachably provided on the water collection body 862. For example, the water collection cover 863 can be easily released from the water collection body 862 using the fastening hooks 8636.

That is, in the general service environment, the water collection cover 863 may firmly shield the open upper surface of the water collection body 862 using the support bodies 8635 and the fastening hooks 8636, thus being capable of blocking the condensed water from scattering to the outside.

On the other hand, when it is necessary to release the water collection cover 863 from the water collection body 862 so as to remove foreign substances accumulated in the water collection body 862, the water collection cover 863 can be easily released from the water collection body 862 using the fastening hooks 8636.

The duct cover 830 can include cover mounting hooks 8391 provided along the circumference of the duct cover 830, and the circulation flow path part 820 can include duct protrusions 824 protruding along the circumferential of the circulation flow path part 820 and provided to be fastened to the cover mounting hooks 8391.

The duct cover 830 can be coupled to the circulation flow path part 820 by fastening the duct protrusions 824 to the cover mounting hooks 8391. For example, the duct cover 830 can be firmly coupled to the circulation flow path part 820 by fastening the duct protrusions 824 to the cover mounting hooks 8391 in the state in which the duct cover 830 is placed along the circumferences of the inflow duct 821 and the transfer duct 822.

A sealing member can be additionally provided on the contact surface between the duct cover 830 and the circulation flow path part 820 so as to block air in the circulation flow path part 820 from leaking to the outside.

Figure 14:
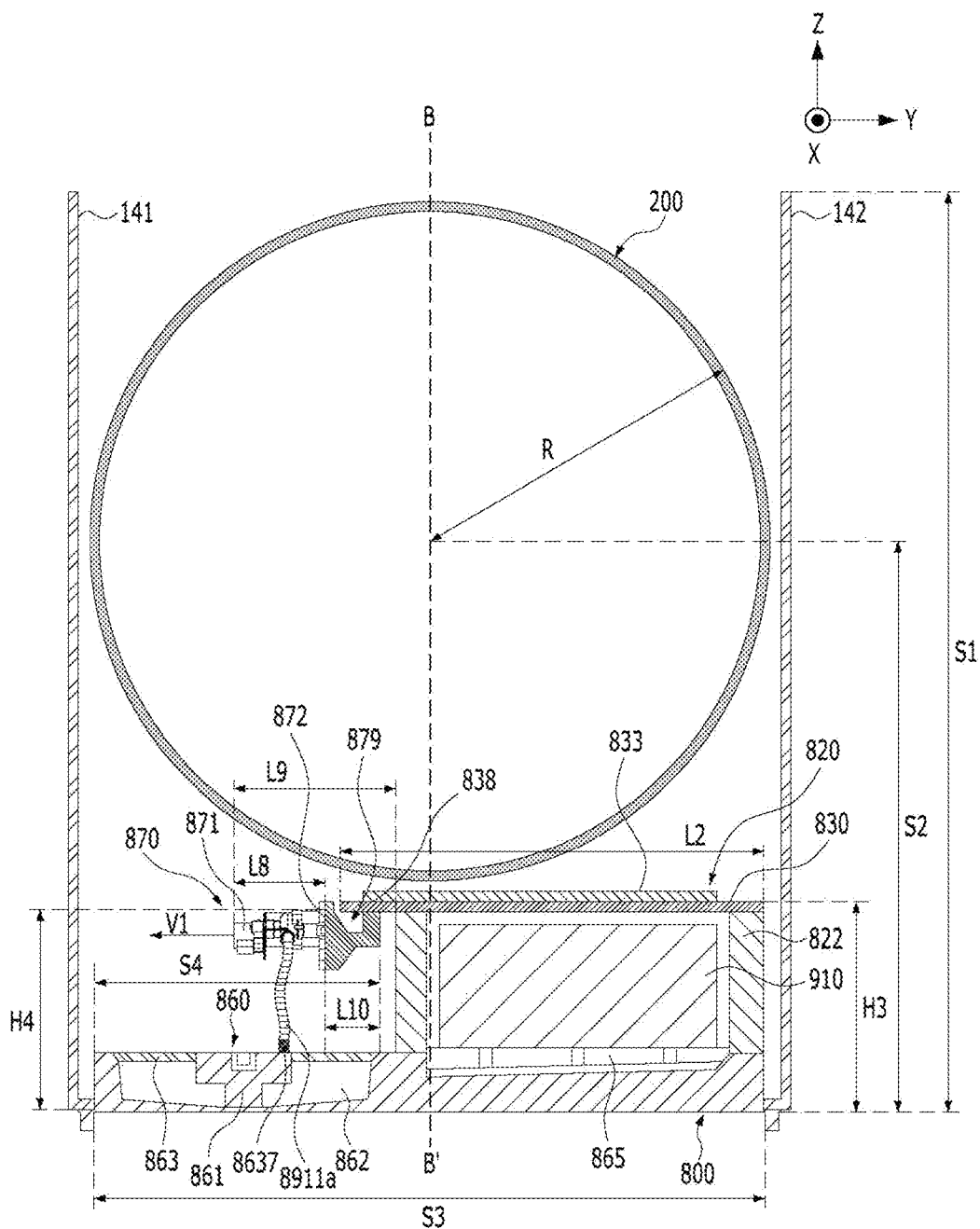
FIG. 14 is a diagram illustrating a cross-sectional view of disposition relations between a drum and a circulation flow path part of the exemplary laundry treating apparatus.

FIG. 14 is a diagram illustrating a cross-sectional view of disposition relations between the drum and the circulation flow path part of the laundry treating apparatus. A description of the parts which have been described above with reference to FIG. 13 will be omitted.

The cabinet 100 can include a first side panel 141 located at one side of the drum 200 so as to define one side surface of the cabinet 100, and a second side panel 142 located at the other side of the drum 200 so as to define the other side surface of the cabinet 100.

In this case, the circulation flow path part 820 can be disposed closer to any one of the first side panel 141 or the second side panel 142. The water collection part 860 can be disposed closer to the other of the first side panel 141 and the second side panel 142.

For example, the circulation flow path part 820 can be disposed closer to the second side panel 142 than the first side panel 141, and the transfer duct 822 and the duct cover 830 can be disposed closer to the second side panel 142 than the first side panel 141. The first side panel 141 can define the left side surface of the cabinet 100 based on the drum 200, and the second side panel 142 can define the right side surface of the cabinet 100 based on the drum 200.

Thereby, the water collection part 860 can be disposed outside the circulation flow path part 820 so as to be spaced apart from the circulation flow path part 820, and the water collection part 860 can be installed between the first side panel 141 and the circulation flow path part 820.

The flow path switch valve 870 can be coupled to the circulation flow path part 820 so as to communicate with the washing flow path part 833, and be provided to transmit the condensed water to the washing flow path part 833. Here, the flow path switch valve 870 is coupled to the circulation flow path part 820 and extends to a designated length L9, and thus, there is a possibility that the flow path switch valve 870 interferes with the drum 200 depending on the disposition of the flow path switch valve 870.

In order to solve such a problem, the flow path switch valve 870 can be disposed to be lower than the upper surface of the duct cover 830 so as to face the side surface of the transfer duct 822. For example, the flow path switch valve 870 can be disposed between the circulation flow path part 820 and the first side panel 141 so as to face the water collection part 860. The upper end of the flow path switch valve 870 can be disposed to be lower than the upper surface of the duct cover 830.

Thereby, the flow path switch valve 870 can avoid interference with the drum 200, and the user can easily repair the flow path switch valve 870 by removing the first side panel 141 without removing the drum 200.

Further, the duct cover 830 can include a valve connection part 838 configured to extend towards the water collection part 860 so as to face the water collection part 860. The valve connection part 838 can be provided to be disposed above the water collection part 860, and can be provided to be disposed parallel to the water collection part 860.

The flow path switch valve 870 can be coupled to the lower surface of the valve connection part 838, and can extend towards the water collection part 860. The washing flow path parts 833 can be provided such that one end of each thereof is provided on the upper surface of the valve connection part 838 to communicate with the flow path switch valve 870.

The flow path switch valve 870 is coupled to the lower surface of the valve connection part 838, thereby being capable of further blocking interference with the drum 200. Further, the radius R of the drum 200 in the laundry treating apparatus can be more extended within the range of prevention of interference with the flow path switch valve 870, and the flow path switch valve 870 can be freely disposed depending on the position of the valve connection part 838.

The structure of the flow path switch valve 870 will be described in detail. The flow path switch valve 870 can include a supply switch unit 871 configured to communicate with the pump 861 so as to receive water supplied from the pump 861, and a switch connector 879 configured to communicate with the supply switch unit 871 and coupled to the duct cover 830 so as to transmit the water to the washing flow path parts 833.

Further, the flow path switch valve 870 can further include a transmission unit 872 disposed between the supply switch unit 871 and the switch connector 879. The transmission unit 872 can be connected to the supply switch unit 871 and the switch connector 879, and can thus guide water supplied from the supply switch unit 871 to the switch connector 879. For example, the supply switch unit 871, the transmission unit 872, and the switch connector 879 can be sequentially coupled in the transfer direction of the condensed water.

Here, the switch connector 879 can be coupled to the valve connection part 838 and extend towards the water collection part 860, and the switch connector 879 can be disposed to face the water collection body 862. Further, the switch connector 879 can be connected to the lower surface of the valve connection part 838, can communicate the washing flow path parts 833, and can thus transmit the condensed water to the washing flow path parts 833.

The water collection part 860 can include the drain flow path 8637 configured to protrude upwards from the water collection cover 863 so as to enable the outside of the water collection cover 863 and the inside of the water collection body 862 to communicate with each other therethrough, and a first water collection drain pipe 8911a configured to connect the drain flow path 8637 to the flow path switch valve 870 so that the condensed water is transferred from the pump 861 to the flow path switch valve 870. The first water collection drain pipe 8911a can correspond to a passage along which the condensed water is transferred from the pump 861 to the flow path switch valve 870.

For example, the supply switch unit 871 can be connected to the first water collection drain pipe 8911a and thus receive the condensed water supplied from the pump 861 through the first water collection drain pipe 8911a, and the condensed water supplied to the supply switch unit 871 can be transmitted to the transmission unit 872 and the switch connector 879.

As the flow path switch valve 870 extends from the valve connection part 838 towards the water collection part 860, the supply switch unit 871 can be disposed above the water collection part 860 so as to face the water collection part 860.

Thereby, the distance between the supply switch unit 871 and the pump 861 can be shortened, and the length of extension of the first water collection drain pipe 8911a connecting the pump 861 to the supply switch unit 871 can be shortened so as to prevent the condensed water from remaining in the first water collection drain pipe 8911a.

Figure 15:
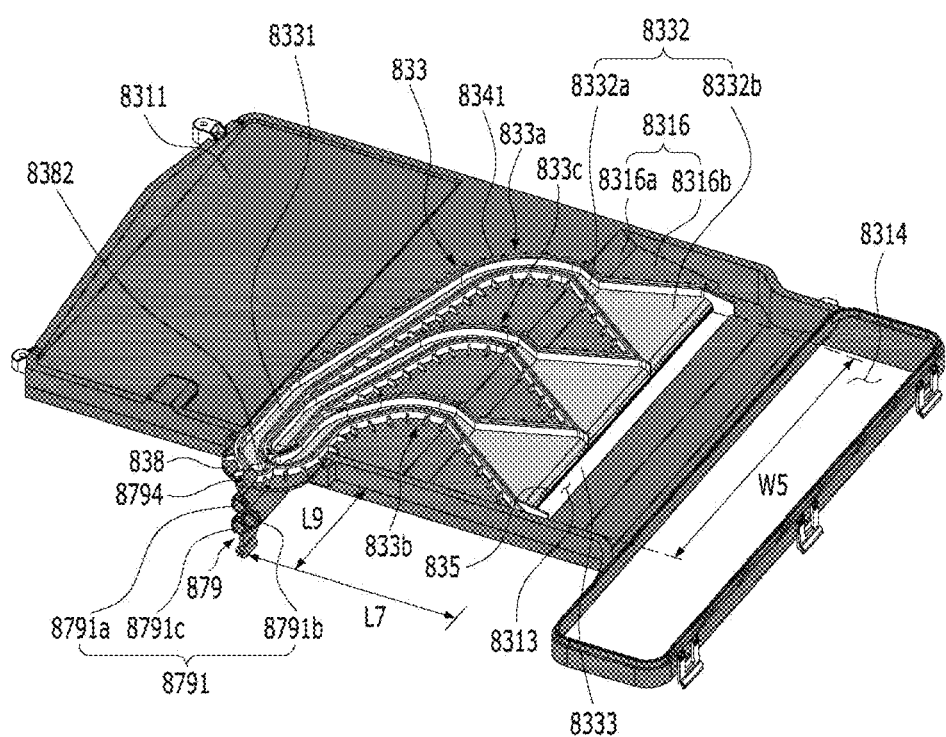
FIG. 15 is a diagram illustrating a perspective view of washing flow path parts provided on the upper surface of the duct cover of the exemplary laundry treating apparatus.

FIG. 15 is a diagram illustrating a perspective view of the washing flow path parts provided on the upper surface of the duct cover of the laundry treating apparatus.

The duct cover 830 can include the shield cover body 8311 coupled to the upper portion of the transfer duct 822 so as to shield the first heat exchanger 910 and the second heat exchanger 920, and the communication cover body 8312 extending forwards from the shield cover body 8311 and coupled to the upper portion of the inflow duct 821.

The shield cover body 8311 can be provided to shield the open upper surface of the transfer duct 822, and the communication cover body 8312 can be placed on the upper surface of the inflow duct 821.

Here, the shield cover body 8311 and the communication cover body 8312 can be integrally formed into one body. Thereby, the assembly process of the duct cover 830 can be simplified, and leakage of air in the transfer duct 822 and the inflow duct 821 through a gap between the shield cover body 8311 and the communication cover body 8312 can be blocked.

The communication cover body 8312 can include the inflow communication hole 8314 define through one surface thereof such that the drum 200 and the inflow duct 821 communicate with each other therethrough. The inflow communication hole 8314 can communicate with the duct communication hole 417 shown in FIG. 4, and thereby, air discharged from the drum 200 can flow into the inflow communication hole 8314.

The inflow duct 821 can be provided to have a greater width than the width of the transfer duct 822, and thus, the communication cover body 8312 placed on the upper surface of the inflow duct 821 can be provided to have a greater width than the width of the shield cover body 8311.

Further, the inflow communication hole 8314 defined through the communication cover body 8312 can have a greater width than the width of the shield cover body 8311, thereby allowing air in the drum 200 to smoothly enter the inflow communication hole 8314 communicating with the drum 200.

The inflow communication hole 8314 can have a greater width than the width of the shield cover body 8311, and thus, one end of the inflow communication hole 8314 can be provided parallel to the shield cover body 8311 and the other end of the inflow communication hole 8314 can protrude towards the switch connector 879.

Water supplied to the washing flow path parts 833 through the switch connector 879 is transferred along the upper surface of the shield cover body 8311 and is discharged to the first heat exchanger 910, thereby being capable of removing foreign substances from the front surface of the first heat exchanger 910.

For this purpose, the shield cover body 8311 can include the cover through hole 8313 provided through the upper surface thereof so as to face at least a part of the first heat exchanger 910. The cover through hole 8313 can be disposed at ends of the washing flow path parts 833 so as to enable the washing flow path parts 833 and the first heat exchanger 910 to communicate with each other therethrough.

The cover through hole 8313 can serve as an outlet of the washing flow path parts 833, and water transferred along the washing flow path parts 833 can be sprayed to the first heat exchanger 910 through the cover through hole 8313.

Therefore, the user does not have to remove the first heat exchanger 910 so as to wash the first heat exchanger 910, and foreign substances can be removed from the first heat exchanger 910 by water discharged from the washing flow path parts 833 through the cover through hole 8313.

The cover through hole 8313 can be provided in the width direction of the shield cover body 8311, and can be provided parallel to the direction of extension of the valve connection part 838. The width W5 of the cover through hole 8313 can be less than the width of the shield cover body 8311, and can correspond to the width of the first heat exchanger 910 shown in FIG. 14.

The switch connector 879 can be connected to the transmission unit 872 shown in FIG. 14 so as to transmit water to the washing flow path parts 833. For this purpose, the switch connector 879 can include connection supply flow paths 8791*a*, 8791*b*, and 8791*c* which communicate with the transmission unit 872 so as to receive water supplied from the transmission unit 872. The connection supply flow paths 8791*a*, 8791*b*, and 8791*c* can pass through the valve connection part 838, can communicate with the washing flow path parts 833, and can transmit the condensed water supplied from the transmission unit 872 to the washing flow path parts 833.

Further, each of the washing flow path parts 833 can include a valve communication hole 8382 defined through the bottom surface thereof so as to communicate with the connection supply flow paths 8791*a*, 8791*b*, and 8791*c*. The condensed water supplied from the connection supply flow paths 8791*a*, 8791*b*, and 8791*c* can flow into the washing flow path parts 833 through the corresponding valve communication holes 8382. The valve communication holes 8382 can be disposed in the upper surface of the valve connection part 838, and can be disposed in the upper surface of the shield cover body 8311 in the direction of extension of the connection supply flow paths 8791*a*, 8791*b*, and 8791*c*.

The washing flow path parts 833 can be disposed on the upper surface of the shield cover body 8311, and can guide water flowing from the valve communication hole 8382 to the cover through hole 8313. For example, the washing flow path parts 833 can be provided to extend from the valve communication holes 8382 to the cover through hole 8313. The valve communication holes 8382 can correspond to the start points of the washing flow path parts 833, and the cover through hole 8313 can correspond to the end points of the washing flow path parts 833.

For example, one end of each of the washing flow path parts 833 can be provided on the upper surface of the valve connection part 838, and the other end can be connected to the cover through hole 8313. Further, one end of each of the washing flow path parts 833 can extend towards the valve connection part 838, and the other end can extend towards the cover through hole 8313.

The condensed water supplied to the washing flow path parts 833 through the valve communication holes 8382 is transferred along the washing flow path parts 833, and thus, friction with the inner surfaces of the washing flow path parts 833 may be caused and the flow velocity of the condensed water may gradually decrease. Thereby, the condensed water in the washing flow path parts 833 may not be discharged to the outside, and may remain in the washing flow path parts 833.

For this purpose, the shield cover body 8311 can include an inclined surface 8316 defined on a part of the upper surface thereof so as to be inclined forwards. At least a portion of each of the washing flow path parts 833 can be disposed on the inclined surface 8316.

Thereby, the amount of the condensed water remaining in the washing flow path parts 833 can be minimized. Further, while water transferred along the washing flow path parts 833 is transferred along the inclined surface 8316, the flow velocity of the water is naturally increased and can thus remove foreign substance formed on the first heat exchanger 910.

For example, the inclined surface 8316 can include a first inclined surface 8316*a* inclined forwards from the upper surface of the shield cover body 8311, and a second inclined surface 8316*b* inclined from the first inclined surface 8316*a* towards the communication cover body 8312. The first inclined surface 8316*a* can be more steeply inclined than the second inclined surface 8316*b*.

Each of the washing flow path parts 833 can include a guide flow path 8331 configured to communicate with the corresponding valve communication hole 8382 so that water from the valve communication hole 8382 is supplied to the guide flow path 8331, and a discharge flow path 8332 connected to the guide flow path 8331 and configured to extend towards the cover through hole 8313.

The guide flow path 8331 can be disposed on the upper surface of the shield cover body 8311 located at a higher position than that of the inclined surface 8316, and the discharge flow path 8332 can be disposed on the inclined surface 8316.

Further, the discharge flow path 8332 can include a first discharge flow path 8332*a* connected to the guide flow path 8331 and disposed on the first inclined surface 8316*a*, and a second discharge flow path 8322*b* connected to the first discharge flow path 8332*a* and disposed on the second inclined surface 8316*b*.

The guide flow path 8331 can have one end provided on the upper surface of the valve connection part 838, and can extend towards the first inclined surface 8316*a*, and the first discharge flow path 8332*a* can have one end communicating with the guide flow path 8331 and the other end communicating with the second discharge flow path 8332*b*, and can guide water transferred along the guide flow path 8331 to the second discharge flow path 8332*b*.

The second discharge flow path 8332*b* can have one end communicating with the first discharge flow path 8332*a* and the other end connected to the cover through hole 8313, and can thus guide the water transferred from the first discharge flow path 8332*a* to the cover through hole 8313.

Therefore, the flow velocity of water supplied to the guide flow path 8331 from the valve communication hole 8382 can be naturally increased while passing through the first discharge flow path 8332*a* and the second discharge flow path 8332*b*. For example, as the first discharge flow path 8332*a* and the second discharge flow path 8332*b* extend to be inclined, the flow velocity of water transferred from the guide flow path 8331 to the cover through hole 8313 can be increased.

Further, since water in the washing flow path part 833 is transferred to the cover through hole 8313 along the first discharge flow path 8332*a* and the second discharge flow path 8332*b*, retention of the water in the washing flow path part 833 without being discharged to the cover through hole 8313 can be prevented.

A fluid has a property in which, when the fluid flows, the cross-sectional area thereof decreases as the flow velocity thereof increases, and thus, water in the washing flow path part 833 may not be uniformly dispersed at the distal end of the washing flow path part 833. This may cause concentration of the water on a specific region of the cover through hole 8313, and may thus cause difficulty in uniformly supplying the water to the surface of the first heat exchanger 910.

Therefore, a plurality of washing flow path parts 833 can be provided on the upper surface of the shield cover body 8311. The distal ends of the washing flow path parts 833 can be respectively connected to the cover through hole 8313. Thereby, the width of each of the plurality of washing flow path parts 833 can be less than the width of one washing flow path part 311 in the case in which the single washing flow path part 311 is provided.

The washing flow path parts 833 can include a first washing flow path 833a provided closest to one end of the shield cover body 8311, a second washing flow path 833b provided closest to the other end of the shield cover body 8311, and a third washing flow path 833c provided between the first washing flow path 833a and the second washing flow path 833b.

The distal end of the first washing flow path 833a can be connected to one side of the cover through hole 8313, and the distal end of the second washing flow path 833b can be connected to the other side of the cover through hole 8313.

The cover through hole 8313 can be provided to be connected to the distal ends of the first washing flow path 833a, the second washing flow path 833b, and the third washing flow path 833c.

Although the first washing flow path 833a, the second washing flow path 833b, and the third washing flow path 833c may have the same width, when it is difficult to disperse water in a specific region due to the structure of the washing flow path parts 833, the first washing flow path 833a, the second washing flow path 833b, and the third washing flow path 833c may have different widths.

Further, designated ends, i.e., the start points, of the first washing flow path 833a, the second washing flow path 833b, and the third washing flow path 833c can be provided on the upper surface of the valve connection part 838 so as to come into contact with one another, and then, the first washing flow path 833a, the second washing flow path 833b, and the third washing flow path 833c can extend to be separated from one another in the transfer direction of the condensed water. The other ends of the first washing flow path 833a, the second washing flow path 833b, and the third washing flow path 833c can extend up to the cover through hole 8313.

Further, the flow path switch valve 870 shown in FIG. 14 can be provided to communicate with the first washing flow path 833a, the second washing flow path 833b, and the third washing flow path 833c so as to selectively supply water to the first washing flow path 833a, the second washing flow path 833b and the third washing flow path 833c.

Concretely, a plurality of valve communication holes 8382 can be provided in number corresponding to the number of the washing flow path parts 833, and the connection supply flow paths 8791a, 8791b, and 8791c can be provided in number corresponding to the number of the washing flow path parts 833.

The connection supply flow paths 8791 can include the first connection supply flow path 8791a communicating with the first washing flow path 833a, the second connection supply flow path 8791b communicating with the second washing flow path 833b, and the third connection supply flow path 8791c communicating with the third washing flow path 833c.

The condensed water can be selectively supplied to the first connection supply flow path 8791a, the second connection supply flow path 8791b, and the third connection supply flow path 8791c through the supply switch unit 871 shown in FIG. 14 depending on operation of the supply switch unit 871. Thereby, water can be selectively supplied to any one of the first connection supply flow path 8791a, the second connection supply flow path 8791b, or the third connection supply flow path 8791c, can be sequentially supplied to any one of the washing flow path parts 833, and can then be discharged to the cover through hole 8313.

Therefore, the pressure of water discharged from any one of the washing flow path parts 833 can be increased compared to the pressure of water in the case in which the condensed water is supplied from the flow path switch valve 870 to all of the washing flow path parts 833. As the pressure of water discharged from the washing flow path part 833 is increased, foreign substances can be completely removed from the surface of the first heat exchanger 910.

Each of the washing flow path parts 833 can include a flow path formation part 834 configured to form a flow path along which water introduced into the valve communication hole 8382 is transferred to the cover though hole 8313. The flow path formation part 834 can be provided integrally with the shield cover body 8311 so as to protrude from the upper surface of the shield cover body 8311.

Thereby, it is not necessary to separately couple the washing flow path parts 833 to the shield cover body 8311, and thus, the manufacturing cost of the duct cover 830 can be reduced, and the assembly process thereof can be simplified.

The flow path formation part 834 can extend from the valve communication hole 8382 towards the cover communication hole 8313.

For example, the flow path formation part 834 can form the inner circumferential surface of the washing flow path part 833. Concretely, the flow path formation part 834 can form the inner circumferential surface of the guide flow path 8331 and the inner circumferential surface of the discharge flow path 8332. Further, the flow path formation part 834 can form the inner circumferential surfaces of the first discharge flow path 8332a and the second discharge flow path 8332b.

Each of the washing flow path parts 833 can include a flow path discharge rib 835 provided to guide water discharged from the washing flow path part 833 to the first heat exchanger 910.

The flow path discharge rib 835 can extend forwards from the end of the second discharge flow path 8332b. The flow path discharge rib 835 can extend downwards so that the distal end thereof can be located in the cover through hole 8313, and can further extend towards the first heat exchanger 910. Thereby, water discharged from the washing flow path part 833 can be uniformly transferred towards the first heat exchanger 910 along the flow path discharge rib 835.

Figure 16:
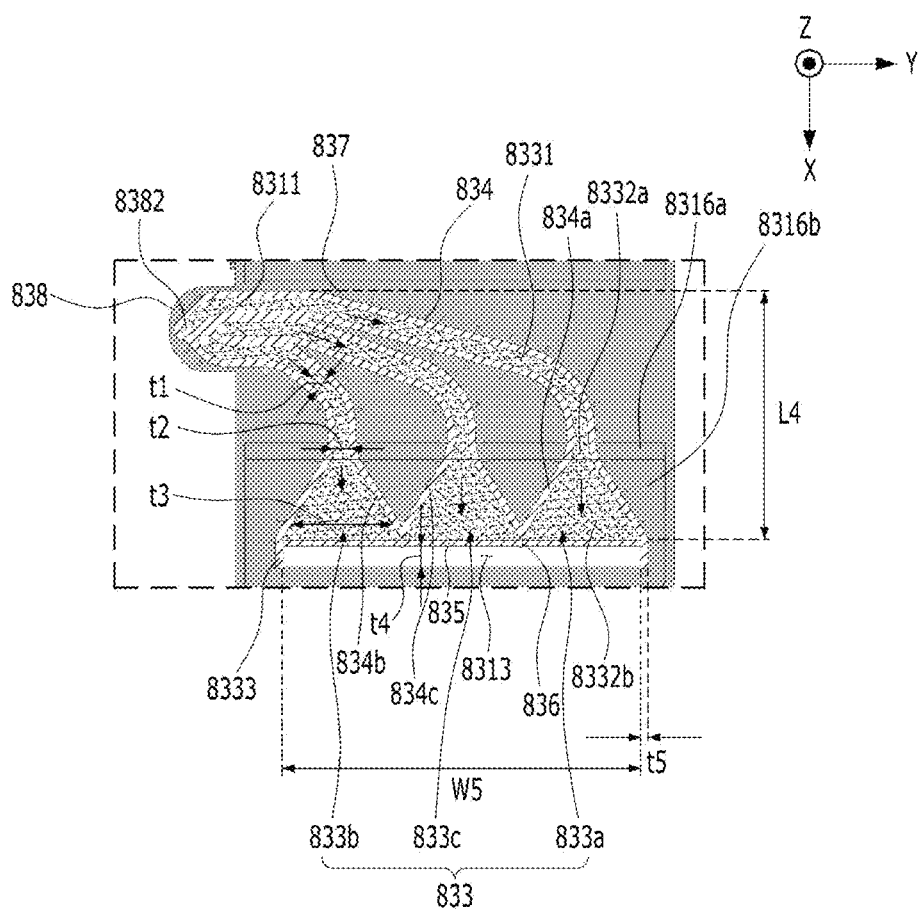
FIG. 16 is a diagram illustrating a top view of the duct cover provided with the washing flow path parts in the exemplary laundry treating apparatus.

FIG. 16 is a diagram illustrating a top view of the duct cover provided with the washing flow path parts in the laundry treating apparatus.

The flow velocity of the condensed water introduced into the guide flow path 8331 through the valve communication hole 8382 can be increased while the condensed water passes through the first discharge flow path 8332a and the second discharge flow path 8332b. Since a fluid has a property in which, when the fluid flows, the cross-sectional area thereof decreases as the flow velocity thereof increases, the washing flow path part 833 can be provided to have a width increased in the flow direction of the condensed water, and can thus induce the condensed water to be widely dispersed at the distal end of the washing flow path part 833.

Specifically, the guide flow path 8331 can be provided such that the width t1 thereof is increased in a direction from the valve communication hole 8382 to the first discharge flow path 8332a.

Further, the first discharge flow path 8332a can have a greater width t2 than the width t1 of the guide flow path 8331, and can thus induce water introduced into the first discharge flow path 8332a from the guide flow path 8331 to be uniformly discharged. The width t2 of the first discharge flow path 8332a can be greater than the width t1 of the guide flow path 8331.

Further, the second discharge flow path 8332b can have a greater width t3 than the width t2 of the first discharge flow path 8332a, and can thus induce water introduced into the second discharge flow path 8332b from the first discharge flow path 8332a to be uniformly discharged. The width t3 of the second discharge flow path 8332b can be greater than the width t2 of the first discharge flow path 8332a.

Further, the width t2 of the first discharge flow path 8332a and the width t3 of the second discharge flow path 8332b can be increased in the flow direction of the condensed water.

Thereby, the washing flow path parts 833 can uniformly spray water to the entire surface of the first heat exchanger 910, and can consequently supply the water to the entirety of the first heat exchanger 910.

The pressure of water discharged from the valve communication hole 8382 can be decreased as the water is transferred towards the cover through hole 8313, and the thickness t5 of the flow path formation part 834 can be decreased in the flow direction of water. For example, the thickness t5 of the flow path formation part 834 can be decreased as the distance from the valve communication hole 8382 decreases. In some implementations, in order to facilitate formation of the entirety of the duct cover 830, the flow path formation part 834 can have a uniform thickness t5.

The flow path formation parts 834 can include a first flow path formation part 834a configured to form the inner circumferential surface of the first washing flow path 833a, a second flow path formation part 834b configured to form the inner circumferential surface of the second washing flow path 833b, and a third flow path formation part 834c configured to form the inner circumferential surface of the third washing flow path 833c.

The end of the first flow path formation part 834a and the end of the third flow path formation part 834c can come into contact with each other, and the end of the first flow path formation part 834a and the end of the second flow path formation part 834b can come into contact with each other.

Further, the washing flow path parts 833 can include flow path partition ribs 836 provided to divide the first washing flow path 833a, the second washing flow path 833b, and the third washing flow path 833c from each other.

The flow path partition rib 836 can extend from the distal ends of the first flow path formation part 834a and the third flow path formation part 834c towards the cover through hole 8313. For example, the flow path partition rib 836 can extend from a point, at which the distal end of the first flow path formation part 834a and the distal end of the third flow path formation part 834c come into contact with each other, towards the cover through hole 8313.

Thereby, water discharged from the second discharge flow paths 8332b can be uniformly discharged to the cover through hole 8313 along the flow path partition ribs 836. The flow path partition ribs 836 can extend from the flow path formation parts 834 towards the flow path discharge ribs 835, and can be disposed on the upper surfaces of the flow path discharge ribs 835.

Further, each of the washing flow path parts 833 can include a communication flow path 8333 configured such that the discharge flow path 8332 and the cover through hole 8313 communicate with each other therethrough.

The communication flow path 8333 can be provided at the upper end of the cover through hole 8313 so as to face the cover through hole 8313. The communication flow path 8333 provided to guide water discharged from the discharge flow path 8332 to the cover through hole 8313.

Further, the flow path formation part 834 can be provided to form the inner circumferential surface of the communication flow path 8333, and can thus block water discharged from the discharge flow path 8332 from leaking to the outside of the cover through hole 8313.

Each of the washing flow path parts 833 can include a flow path support part 837 configured to support the flow path formation part 834.

The flow path support part 837 can extend outwards from the outer circumferential surface of the flow path formation part 834. The flow path support part 837 can be provided to protrude from the upper surface of the shield cover body 8311, and can be coupled to the outer circumferential surface of the flow path formation part 834 so as to support the flow path formation part 834. A plurality of flow path support parts 837 can be provided along the circumferences of the outer circumferential surfaces of the flow path formation parts 834.

The flow path support parts 837 support the flow path formation parts 834, and thereby, the flow path formation parts 834 can withstand the pressure of water transferred therein, and can have improved durability and reliability.

Figure 17:
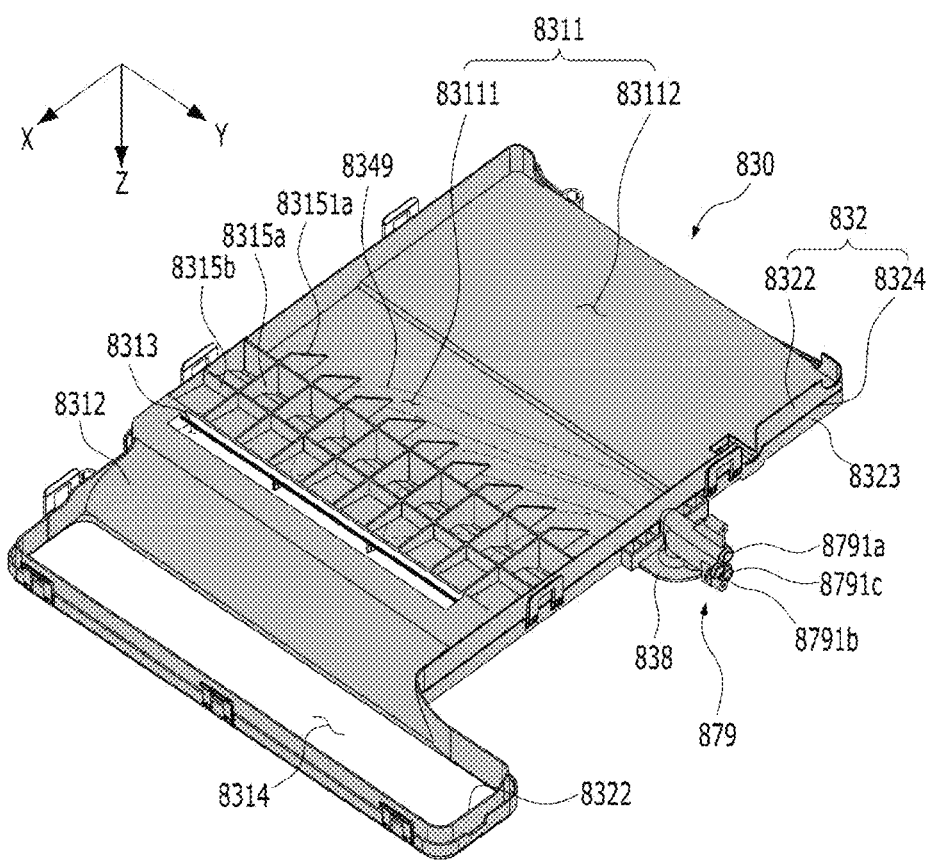
FIG. 17 is a diagram illustrating a perspective view of the lower surface of the duct cover of the exemplary laundry treating apparatus.

FIG. 17 is a diagram illustrating a perspective view of the lower surface of the duct cover of the laundry treating apparatus.

The duct cover 830 can include first radiation ribs 8315a and second radiation ribs 8315b configured to cut off heat transmitted from the first heat exchanger 910 to the washing flow path parts 833.

The first radiation ribs 8315a can protrude from the lower surface of the shield cover body 8311, and can extend in a direction away from the cover through hole 8313. The second radiation ribs 8315b can protrude from the lower surface of the shield cover body 8311, and can extend parallel to the cover through hole 8313.

A plurality of first radiation ribs 8315a and a plurality of second radiation ribs 8315b can be provided, and the second radiation ribs 8315b can be provided perpendicular to the first radiation ribs 8315a so as to connect the first radiation ribs 8315a.

The first radiation ribs 8315a and the second radiation ribs 8315b can be provided to face the first heat exchanger 910, and transfer of heat from the first heat exchanger 910 to the washing flow path parts 833 can be reduced by the first radiation ribs 8315a and the second radiation ribs 8315b.

Further, the shield cover body 8311 can include an evaporator cover body 83111 configured to face the first heat exchanger 910, and a condenser cover body 83112 configured to extend rearwards from the evaporator cover body 83111 and to face the second heat exchanger 920. The first radiation ribs 8315a and the second radiation ribs 8315b can be provided on the lower surface of the evaporator cover body 83111, and the cover through hole 8313 can be defined through the evaporator cover body 83111.

The duct cover 830 can include flow path incoming grooves 8349 recessed from the lower surface thereof so as to provide the flow path formation parts 834. The flow path incoming grooves 8349 can be recessed from the lower surface of the shield cover body 8311 and extend towards the flow path formation parts 834.

The flow path incoming grooves 8349 can extend in the direction of extension of the flow path formation parts 834. The flow path incoming grooves 8349 can be generated during the injection molding process of the flow path formation parts 834, and can distribute load applied to the flow path formation parts 834 so as to increase structural rigidity of the flow path formation parts 834.

The duct cover 830 can include a duct cover extension 832 configured to extend in the thickness direction from the outer surfaces of the shield cover body 8311 and the communication cover body 8312 along the circumferences of the shield cover body 8311 and the communication cover body 8312. The transfer duct 822 and the inflow duct 821 shown in FIG. 13 can be coupled to the duct cover extension 832.

The duct cover extension 832 can protrude in the thickness direction from at least one of both side surfaces, the front surfaces or the rear surfaces of the shield cover body 8311 and the communication cover body 8312, and can thus improve durability of the shield cover body 8311 and the communication cover body 8312 and provide a space in which a separate element is placed, on the shield cover body 8311 and the communication cover body 8312.

The duct cover extension 832 can include a cover insert part 8322 configured to extend in the thickness direction so as to be inserted into the inner surfaces of the inflow duct 821 and the transfer duct 822, and a cover stepped part 8323 spaced outwards apart from the outer circumferential surface of the cover insert part 8322 and configured to extend in the thickness direction (i.e., in the direction Z) so as to be coupled to the outer surfaces of the transfer duct 822 and the inflow duct 821.

A sealing mount part 8324 into which the upper ends of the transfer duct 822 and the inflow duct 821 are inserted can be provided between the inner circumferential surface of the cover stepped part 8323 and the outer circumferential surface of the cover insert part 8322. The transfer duct 822 and the inflow duct 821 of the circulation flow path part 820 can be inserted into the sealing mount part 8324, and can thus be coupled to the duct cover 830 between the cover stepped part 8323 and the cover insert part 8322. Thereby, the open upper surfaces of the transfer duct 822 and the inflow duct 821 can be shielded by coupling the transfer duct 822 and the inflow duct 821 to the shield cover body 8311 and the communication cover body 8312.

Figure 18:
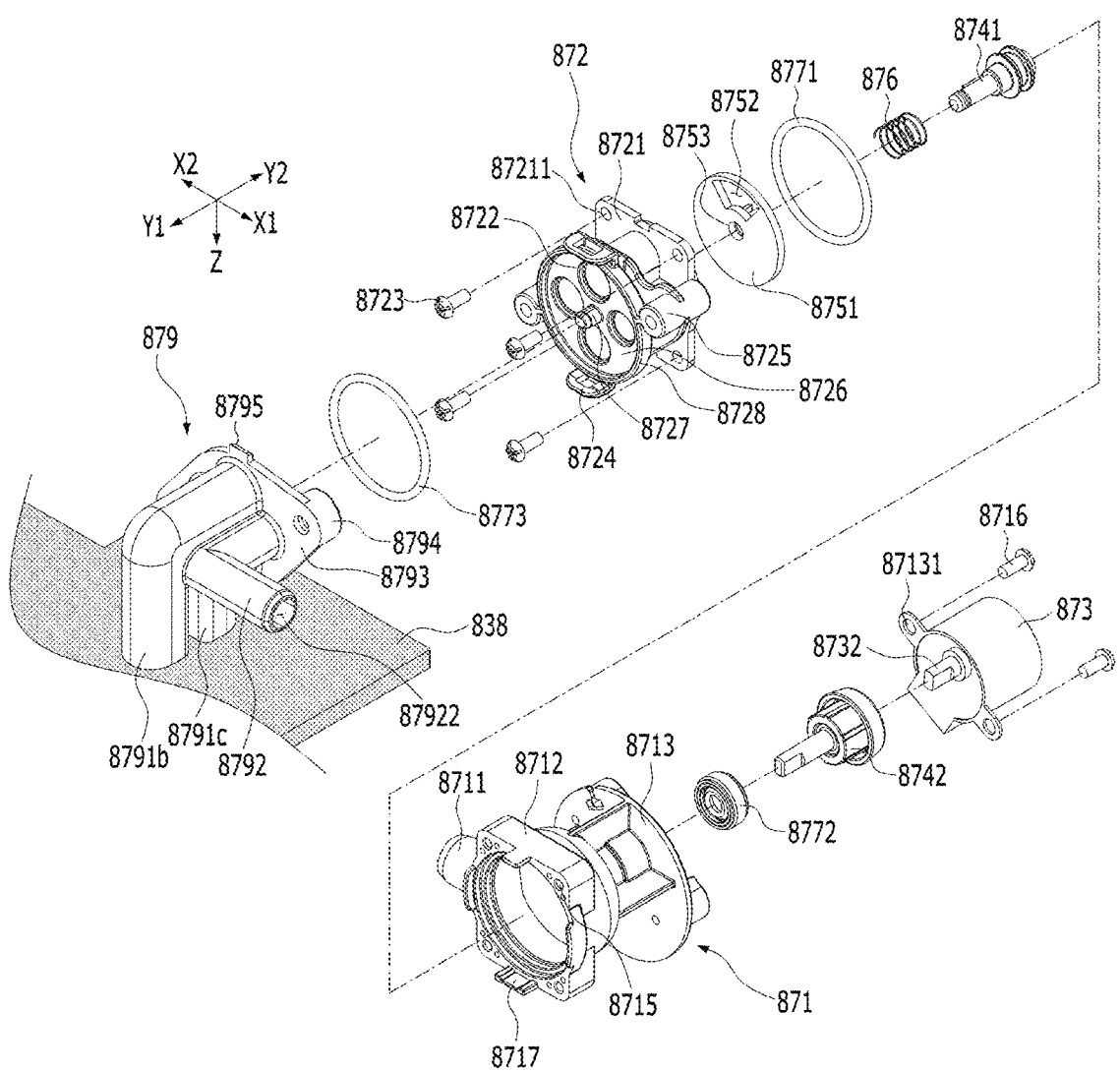
FIG. 18 is a diagram illustrating an exploded perspective view of a flow path switch valve of the exemplary laundry treating apparatus.

FIG. 18 is a diagram illustrating an exploded perspective view of the flow path switch valve of the laundry treating apparatus.

FIG. 18 shows the detailed structure of the flow path switch valve 870 which selectively supplies water to the plurality of washing flow path parts 833. FIG. 18 is an exploded perspective view of the flow path switch valve 870, as seen from the bottom (in the direction Z).

The flow path switch valve 870 can include the supply switch unit 871 configured to communicate with the pump 861 so as to receive water supplied from the pump 861, the switch connector 879 configured to communicate with the supply switch unit 871 and connected to the valve connection part 838 so as to transmit the water to the washing flow path parts 833, and the transmission unit 872 disposed between the supply switch unit 871 and the switch connector 879 and coupled to the supply switch unit 871 and the switch connector 879.

The switch connector 879 can include a connection transmission flow path 8792 configured to communicate with the transmission unit 872 so as to receive water supplied from the transmission unit 872. The connection transmission flow path 8792 can serve as a passage which communicates with the water storage tank 120 and can transfer the water supplied from the transmission unit 872 to the water storage tank 120.

Thereby, the water storage tank 120 can receive water, transferred from the pump 861 to the flow path switch valve 870, through the connection transmission flow path 8792, and can then temporarily store the water.

In this case, the connection transmission flow path 8792 can be provided such that one end thereof is directed to the transmission unit 872 and the other end thereof is directed to the water storage tank 120.

Further, the connection transmission flow path 8792 can be provided such that one end and the other end thereof, i.e., both ends thereof, are spaced apart from each other so as not to face each other. The connection transmission flow path 8792 can be provided such that both ends thereof are not disposed on one straight line.

The supply switch unit 871 can include a scroll accommodator 8712 coupled to the transmission unit 872, and a switch inflow part 8711 configured to extend from the scroll accommodator 8712 towards the water collection part 860 and connected to the first water collection drain pipe 8911*a* (with reference of FIG. 14).

The switch inflow part 8711 can communicate with the inside of the scroll accommodator 8712, and can transfer water supplied from the first water collection drain pipe 8911*a* to the inside of the scroll accommodator 8712.

Further, the supply switch unit 871 can include a driving unit installation part 8713 configured to extend from the scroll accommodator 8712 so as to become away from the transmission unit 872, a valve driving unit 873 installed on the driving unit installation part 8713 and configured to provide rotational power, and a valve rotation unit 874 disposed in the scroll accommodator 8712 and coupled to the valve driving unit 873 so as to be rotated. The supply switch unit 871 can include driving unit fixing members 8716 configured to fix the valve driving unit 873 to the driving unit installation part 8713.

Further, the supply switch unit 871 can include a switch scroll 875 accommodated in the scroll accommodator 8712 and coupled to the valve rotating unit 874 so as to be rotated.

The valve rotating unit 874 can include a second valve rotating shaft 8742 coupled to the valve driving unit 873 so as to be rotated, and a first valve rotating shaft 8741 coupled to the second valve rotating shaft 8742 and the switch scroll 875 so as to be rotated.

The transmission unit 872 can include a transmission body 8721 coupled to the scroll accommodator 8712, and a transmission contact part 8726 configured to extend from the transmission body 8721 towards the switch connector 879 and coupled to the switch connector 879.

Further, the transmission unit 872 can include transmission supply flow paths 8722 provided through the transmission body 8721 and the transmission contact part 8726 so as to communicate with the connection transmission flow path 8792 and the connection supply flow paths 8791*a*, 8791*b*, and 8791*c*.

A plurality of transmission supply flow paths 8722 can be provided along the circumference of the transmission contact part 8726, and can communicate with the connection transmission flow path 8792 and the connection supply flow paths 8791*a*, 8791*b*, and 8791*c*.

The switch scroll 875 can include a switch scroll plate 8751 accommodated in the scroll accommodator 8712 and rotated, a scroll communication hole 8752 defined through the switch scroll plate 8751 so as to selectively communicate with the plurality of transmission supply flow paths 8722, and a scroll coupling hole 8753 defined through the switch scroll plate 8751 such that the first valve rotating shaft 8741 is coupled to the scroll coupling hole 8753.

The switch scroll plate 8751 can be rotated in the state in which the switch scroll plate 8751 comes into contact with one end each of the transmission supply flow paths 8722, and the scroll communication hole 8752 can be provided to communicate with any one of the transmission supply flow paths 8722 depending on rotation of the switch scroll plate 8751.

Therefore, water introduced into the switch inflow part 8711 can be selectively guided to the connection transmission flow path 8792 and the connection supply flow paths 8791a, 8791b, and 8791c depending on rotation of the switch scroll plate 8751.

When water is supplied to the connection transmission flow path 8792, water stored in the water collection part 860 can be transferred to the water storage tank 120. Further, when water is supplied to any one of the connection supply flow paths 8791a, 8791b, and 8791c, the water can be supplied to any one of the plurality of washing flow path parts 833.

Therefore, water can be selectively supplied to the storage tank 120 or one of the plurality of washing flow path parts 833 depending on operation of the flow path switch valve 870. Further, when water is supplied to one of the plurality of washing flow path parts 833, the pressure of water discharged to the first heat exchanger 910 can be increased compared to in the case in which water is continuously supplied to all of the plurality of the washing flow path parts 833.

When water supplied to the flow path switch valve 70 leaks through a gap between the switch connector 879 and the valve connection part 838, various devices necessary to operate the laundry treating apparatus can come into contact with water.

In order to solve such a problem, the connection supply flow paths 8791a, 8791b, and 8791c can be provided integrally with the valve connection part 838. Thereby, leakage of water through the gap between the switch connector 879 and the valve connection part 838 can be blocked.

The connection supply flow paths 8791a, 8791b, and 8791c can be provided through the lower surface of the valve connection part 838, and can thus communicate with the washing flow path part 833. The connection supply flow paths 8791a, 8791b, and 8791c can primarily extend downwards from the valve connection part 838, and can then secondarily extend in a direction away from the valve connection part 838.

The connection supply flow paths 8791a, 8791b, and 8791c can be provided to be lower than the upper surface of the valve connection part 838. The connection supply flow paths 8791a, 8791b, and 8791c can pass through the valve connection part 838 so that one end of each of the connection supply flow paths 8791a, 8791b, and 8791c is inserted into a corresponding one of the washing flow path parts 833.

The switch connector 879 can include a switch extension 8793 configured to extend from the outer circumferential surface of the connection transmission flow path 8792 and the outer circumferential surfaces of the connection supply flow paths 8791a, 8791b, and 8791c.

The switch extension 8793 can be coupled to the connection transmission flow path 8792 and the connection supply flow paths 8791a, 8791b, and 8791c. The switch extension 8793 can be provided integrally with the connection transmission flow path 8792 and the connection supply flow paths 8791a, 8791b, and 8791c, and can function to couple the connection transmission flow path 8792 and the connection supply flow paths 8791a, 8791b, and 8791c.

The transmission unit 872 can include transmission coupling parts 8725 configured to extend from the outer circumferential surface of the transmission contact part 8726 and to be coupled to the switch extension 8793. The switch connector 879 can include switch fixing parts 8794 configured to extend from the switch extension 8793 towards the transmission coupling parts 8725 and to be coupled to the transmission coupling parts 8725.

The switch fixing parts 8794 and the transmission coupling parts 8725 can be provided to face each other, and one end of each of the transmission coupling parts 8725 can be accommodated in a corresponding one of the switch fixing parts 8794 so as to be coupled thereto. In some implementations, the switch fixing parts 8794 can be disposed on one side and the other side of the switch extension 8793, and the transmission coupling parts 8725 can be disposed at one side and the other side of the transmission contact part 8726 so as to face the switch fixing parts 8794.

Further, the switch connector 879 can include connection protrusions 8795 protruding from the outer circumferential surface of the switch extension 8793 so as to be spaced apart from the switch fixing parts 8794. Further, the transmission unit 872 can include transmission mounting hooks 8724 extending from the outer circumferential surface of the transmission contact part 8726 such that the connection protrusions 8795 are inserted into the transmission mounting hooks 8724.

The transmission mounting hooks 8724 can be provided at positions corresponding to the connection protrusions 8795, and can be coupled to the connection protrusions 8795. For example, the connection protrusions 8795 can be provided to protrude from one side and the other side of the switch extension 8793 in the height direction (i.e., the direction Z), and the transmission mounting hooks 8724 can be disposed on one side and the other side of the transmission contact part 8726 in the height direction (i.e., the direction Z).

Therefore, the transmission unit 872 can be coupled to the switch extension 8793 through the connection protrusions 8795 and the transmission mounting hooks 8724, and thereby, the transmission unit 872 can be blocked from being spaced apart from the switch extension 8793.

Further, the transmission unit 872 can include a transmission protrusion 8727 configured to protrude from the center of the transmission contact part 8726 towards the switch extension 8793 and to be inserted into the switch extension 8793. The transmission protrusion 8727 is inserted into the switch extension 8793, thereby being capable of blocking the transmission unit 872 from being separated from the switch connector 879.

The transmission unit 872 can include transmission body fixing members 8723 configured to fix the scroll accommodator 8712 to the transmission body 8721, and the scroll accommodator 8712 can include supply switch fixing recesses 8715 into which the transmission body fixing members 8723 are inserted. Further, the supply switch unit 871 can include supply switch hooks 8717 configured to extend from the outer circumferential surface of the scroll accommodator 8712 and coupled to the transmission body 8721.

The flow path switch valve 870 can include a connection sealing member 8773 disposed between the switch connector 879 and the transmission unit 872. The connection sealing member 8773 can be provided between the switch extension 8793 and the transmission contact part 8726, and can block water from leaking through a gap between the connection supply flow paths 8791a, 8791b, and 8791c and the transmission supply flow path 8722.

The connection sealing member 8773 can be accommodated in any one of the transmission contact part 8726 or the switch extension 8793. The connection sealing member 8773 can be provided to surround the connection supply flow paths 8791*a*, 8791*b*, and 8791*c*.

A switch sealing unit 877 can include a shaft sealing member 8772 provided between the second valve rotating shaft 8742 and the first valve rotating shaft 8741 so as to block water from leaking to the valve driving unit 873, and a scroll sealing member 8771 provided to surround the outer circumferential surface of the switch scroll plate 8751 so as to block water from leaking through a gap between the scroll accommodator 8712 and the transmission body 8721.

A flow path switch elastic member 876 configured to pressurize the switch scroll 875 in a direction away from the first valve rotating shaft 8741 can be provided between the switch scroll 875 and the first valve rotating shaft 8741.

Figure 19:
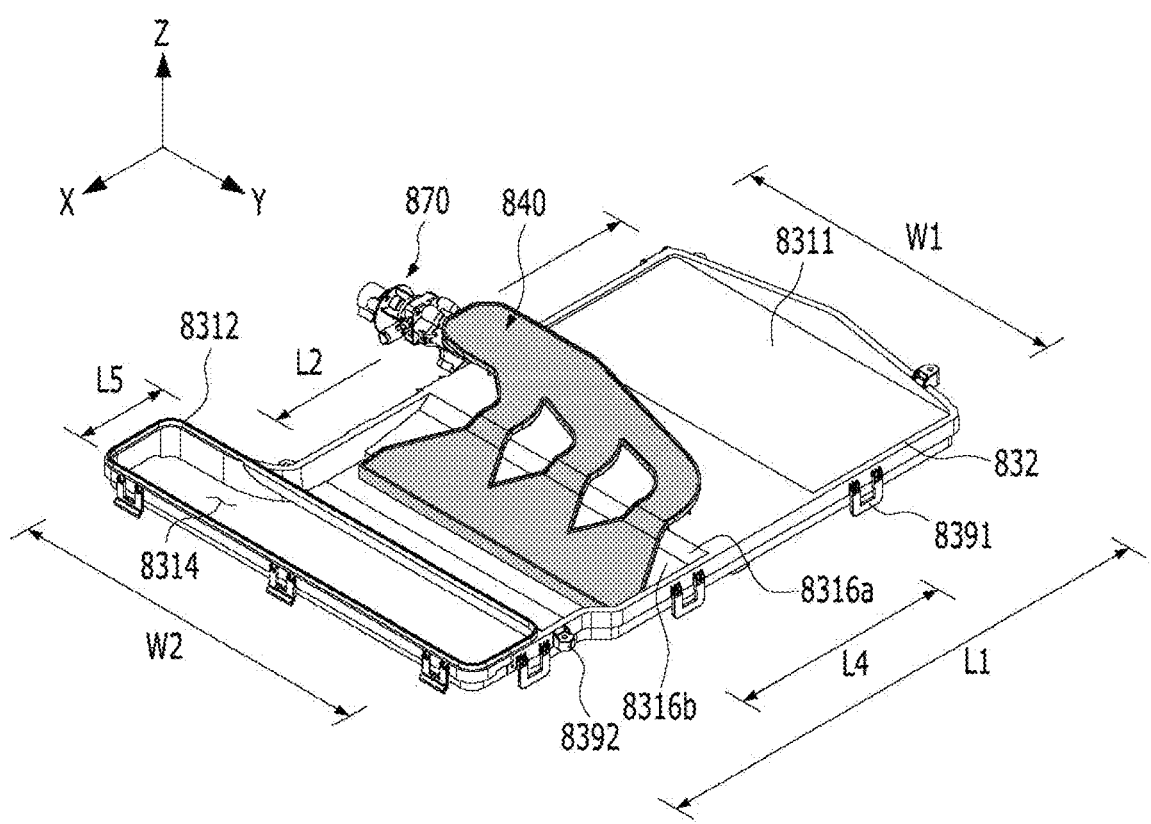
FIG. 19 is a diagram illustrating a perspective view of the duct cover to which a nozzle cover is coupled in the exemplary laundry treating apparatus.

FIG. 19 is a diagram illustrating a perspective view of the duct cover to which a nozzle cover is coupled in the laundry treating apparatus.

The circulation flow path part 820 can further include a nozzle cover 840 configured to shield the washing flow path parts 833 so as to block water transferred along the washing flow path parts 833 from scattering to the outside.

The nozzle cover 840 on the shield cover body 8311 can be coupled to the upper ends of the washing flow path parts 833. When the shield cover body 8311 is seen from above the nozzle cover 840, the nozzle cover 840 is coupled to the upper ends of the washing flow path parts 833 so as to accommodate the washing flow path parts 833, and thus, the washing flow path parts 833 can be shielded by the nozzle cover 840.

The nozzle cover 840 can extend in the direction of extension of the washing flow path parts 833. That is, the nozzle cover 840 can extend from one side at which the flow path switch valve 870 is disposed to the other side at which the inflow communication hole 8314 is disposed. For example, the one side can be a side to which the flow path switch valve 870 extends from the valve connection part 838, and the other side can be a front side (in the direction X) at which the inflow communication hole 8314 is disposed.

Further, the length L4 of extension of the nozzle cover 840 in the forward and rearward directions can be equal to or less than the length L2 of extension of the shield cover body 8311. The length L4 of extension of the nozzle cover 840 in the forward and rearward directions can be equal to or greater than the length of extension of the washing flow path parts 833, and can be properly designed depending on the amount of water required to wash the first heat exchanger 910.

The nozzle cover 840 can be coupled to the upper ends of the flow path formation parts 834 shown in FIG. 15 so as to shield the washing flow path parts 833. In some implementations, the nozzle cover 840 can be coupled to the upper ends of the first washing flow path 833*a*, the second washing flow path 833*b*, and the third washing flow path 833*c* so as to shield the first washing flow path 833*a*, the second washing flow path 833*b*, and the third washing flow path 833*c*.

Thereby, the nozzle cover 840 can block water transferring along the washing flow path parts 833 from scattering to the outside.

Figure 20A:
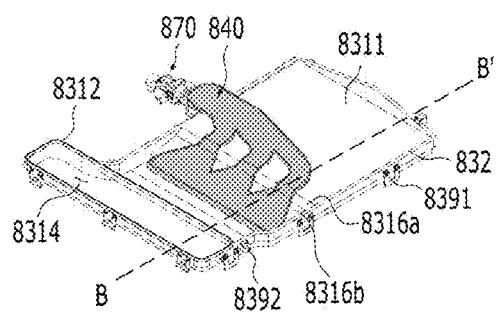
FIGS. 20A and 20B are diagrams illustrating perspective and cross-sectional views of an example of a nozzle cover of the laundry treating apparatus.
Figure 20B:
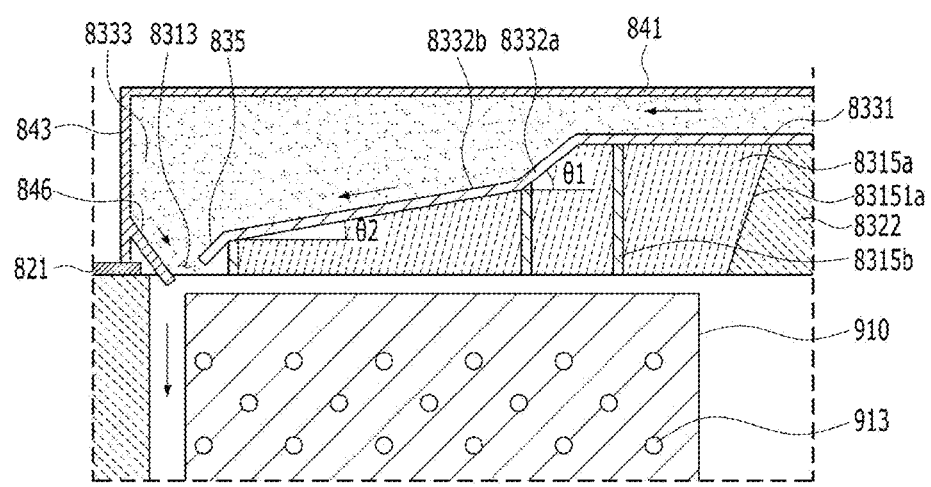

FIGS. 20A and 20B are diagram illustrating perspective and cross-sectional views of one example of the nozzle cover of the laundry treating apparatus, respectively. FIG. 20B is a diagram illustrating a cross-sectional view taken along line B-B' of FIG. 20A, illustrating the inside of the duct cover 830 and the side of the nozzle cover 840.

The nozzle cover 840 can include a nozzle cover body 841 configured to shield the washing flow path parts 833.

The nozzle cover body 841 can be coupled to upper ends 8341 of the flow path formation parts 834 shown in FIG. 15, and can extend in the direction of extension of the washing flow path parts 833. The nozzle cover body 841 extends parallel to the guide flow paths 8331, and thus, the distance between the nozzle cover body 841 and the washing flow path parts 833 can be gradually increased in the transfer direction of the water.

For example, the distance between the bottom surfaces of the first discharge flow paths 8332*a* or the second discharge flow paths 8332*b* and the nozzle cover body 841 can be gradually increased in the transfer direction of water.

Further, the nozzle cover 840 can further include a nozzle shield rib 843 configured to guide water transferring along the washing flow path parts 833 to the cover through hole 8313.

The nozzle shield rib 843 can extend from the distal end of the nozzle cover body 841 towards the shield cover body 8311. The nozzle shield rib 843 and the nozzle cover body 841 can serve to shield the cover through hole 8313, and the nozzle shield rib 843 can be provided at the distal end of the cover through hole 8313.

For example, one end of the cover through hole 8313 can be connected to nozzle shield rib 843, and the other end of the cover through hole 8313 can be connected to the second discharge flow paths 8322*b*. In some implementations, the nozzle shield rib 843 can be located in front of the cover through hole 8313 so as to be spaced apart from the cover through hole 8313.

The nozzle shield rib 843 can serve to temporarily store water, discharged from the washing flow path part 833, inside the washing flow path part 833, and can guide water transferred along the washing flow path part 833 to the cover through hole 8313 through collision with the nozzle shield rib 843.

Condensed water discharged from the second discharge flow path 8332*b* can be discharged through the cover through hole 8313 along the flow path discharge rib 835. Here, the condensed water is not discharged towards the first heat exchanger 910 and may be discharged towards a region in front of the first heat exchanger 910 depending on the direction of extension of the flow path discharge rib 835. Particularly, as the velocity of the condensed water having passed through the flow path discharge rib 835 increases, the number of contact of the condensed water with the inflow surface of the first heat exchanger 910 may decrease.

For this purpose, the nozzle cover 840 can further include a nozzle switch rib 846 configured to guide water having passed through the flow path discharge rib 835 to the first heat exchanger 910.

The nozzle switch rib 846 can extend from the nozzle shield rib 843 towards the cover through hole 8313 so as to face the flow path discharge rib 835. The nozzle switch rib 846 can extend towards the first heat exchanger 910, and the distal end of the nozzle switch rib 846 can protrude farther downwards than the cover through hole 8313. The nozzle switch rib 846 can extend so as to be inclined at a designated angle with the flow path discharge rib 835, and the distal end of the nozzle switch rib 846 and the distal end of the flow path discharge rib 835 can be spaced apart from each other.

The distal end of the nozzle switch rib 846 can be disposed in front of the front surface of the first heat exchanger 910, and the distal end of the flow path discharge rib 835 can be disposed behind the front surface of the first heat exchanger 910. Thereby, water having passed through the flow path discharge rib 835 can collide with the nozzle switch rib 846, and can thus be discharged to a space between the distal end of the nozzle switch rib 846 and the distal end of the flow path discharge rib 835.

The inclination angle θ1 of the first discharge flow path 8332a, i.e., the inclination angle θ1 of the first inclined surface 8316a, can be equal to or greater than the inclination angle θ2 of the second discharge flow path 8332b, i.e., the inclination angle θ2 of the second inclined surface 8316b.

Thereby, all of water introduced into the washing flow path part 833 can be transferred and discharged to the cover through hole 8313 by gravity while passing through the first discharge flow path 8332a and the second discharge flow path 8332b. Further, the first inclined surface 8316a and the second inclined surface 8316b can have a uniform thickness.

Figure 21:
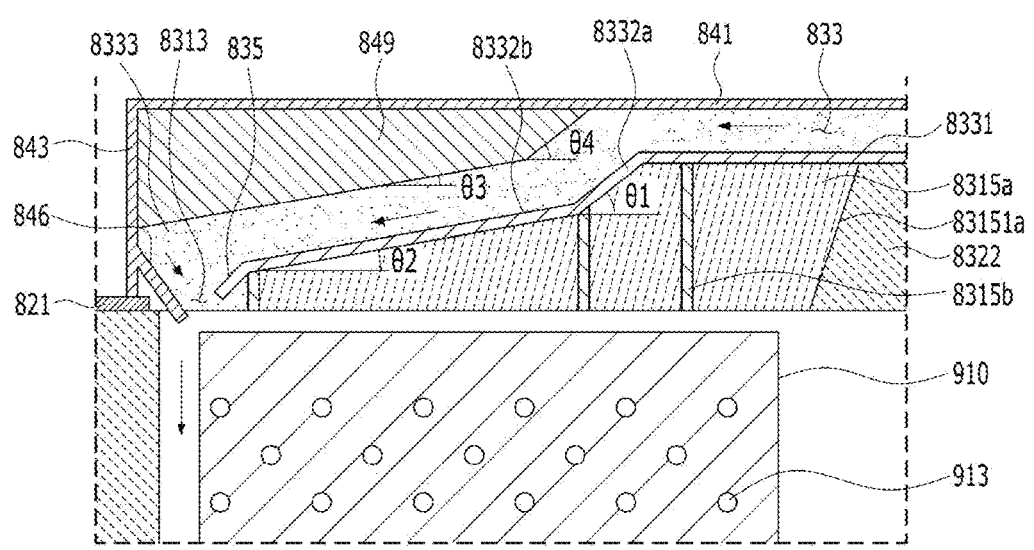
FIG. 21 is a diagram illustrating a cross-sectional view of another example of the nozzle cover of the laundry treating apparatus.

FIG. 21 is a diagram illustrating a cross-sectional view of another exemplary nozzle cover of the laundry treating apparatus. Hereinafter, elements of the nozzle cover 840 which are different from those of the nozzle cover 840 shown in FIGS. 20A and 20B will be mainly described.

The nozzle cover 840 can further include a nozzle incoming part 849 configured to reduce the distance between the washing flow path parts 833 and the nozzle cover body 841.

The nozzle incoming part 849 can protrude from the nozzle cover body 841 towards the inside of the washing flow path parts 833. The nozzle incoming part 849 can protrude from the lower surface of the nozzle cover body 841 towards the first discharge flow paths 8332a and the second discharge flow paths 8332b.

Since the nozzle incoming part 849 protrudes from the nozzle cover body 841 towards the washing flow path parts 833, the thickness of the nozzle cover body 841 can be increased. The nozzle incoming part 849 can be provided such that the length of the nozzle incoming part 849 protruding from the nozzle cover body 841 gradually increases in the transfer direction of the condensed water.

The nozzle incoming part 849 can be provided such that one surface thereof forms inclination angles corresponding to those of the inclined surface 8316.

For example, a portion of one surface of the nozzle incoming part 849 facing the first inclined surface 8316a can have an inclination angle θ4 corresponding to the inclination angle θ1 of the first inclined surface 8316a, and another portion of the surface of the nozzle incoming part 849 facing the second inclined surface 8316b can have an inclination angle θ3 corresponding to the inclination angle θ2 of the second inclined surface 8316b.

The distance between portions of one surface of the nozzle incoming part 849 facing the first discharge flow paths 8332a and the first inclined surface 8316a can correspond to the distance between the bottom surfaces of the guide flow paths 8331 and the lower surface of the nozzle cover body 841.

Further, the distance between the portion of the surface of the nozzle incoming part 849 facing the second inclined surface 8316b and the second inclined surface 8316b can correspond to the distance between the bottom surfaces of the guide flow paths 8331 and the lower surface of the nozzle cover body 841.

The nozzle incoming part 849 can serve to reduce the inner spaces of the washing flow path parts 833, and thereby, the height of the washing flow path parts 833 can be reduced, the flow velocity of water reaching the nozzle shield rib 843 can be increased, and thus, the water can be rapidly transferred to the cover through hole 8313.

Further, as the nozzle incoming part 849 is provided, the washing flow path parts 833 can be provided to have a uniform height. Thereby, when water is transferred along the washing flow path part 833, the inner volume of the washing flow path part 833, occupied by air, can be reduced. Further, noise and vibration generated due to collision of water in the washing flow path part 833 with the inner circumferential surface of the washing flow path part 833 can be reduced.

Further, even when water reaches a specific region of the nozzle incoming part 849 earlier than other regions, the water can be uniformly discharged through the cover through hole 8313 along the entirety of the nozzle incoming part 849.

Figure 22A:
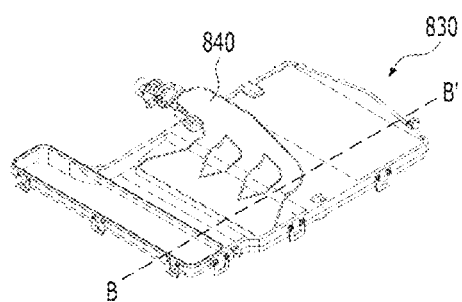
FIGS. 22A and 22B are diagrams illustrating perspective and cross-sectional views of another exemplary nozzle cover of the laundry treating apparatus.
Figure 22B:
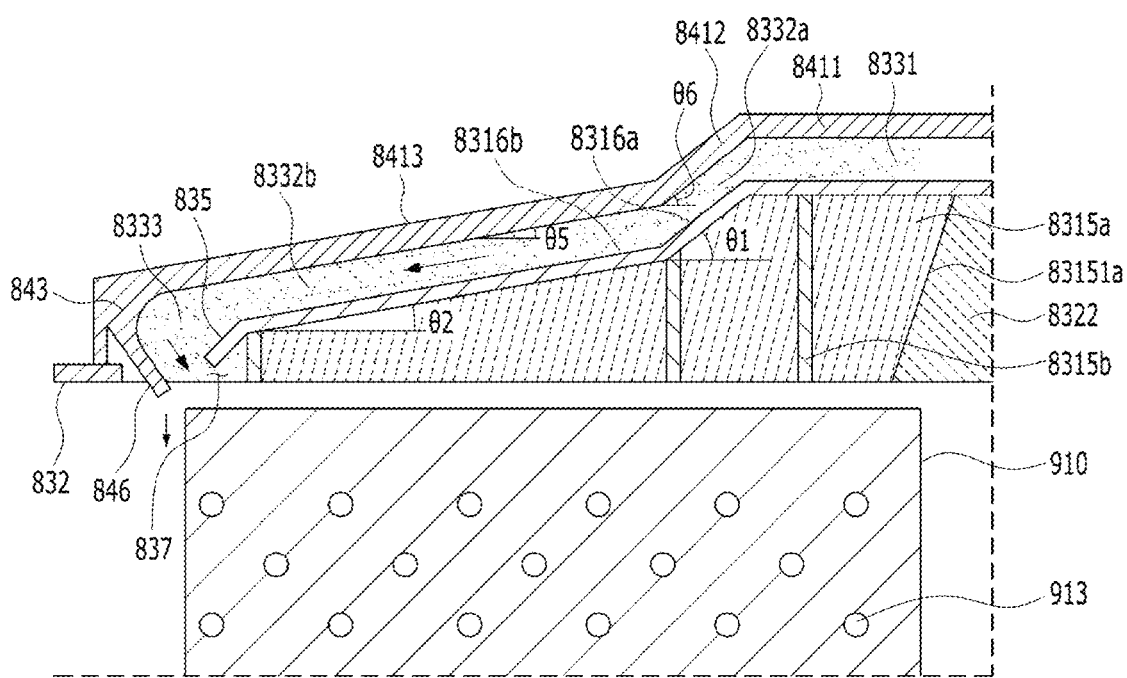

FIGS. 22A and 22B are diagram illustrating perspective and cross-sectional views of another exemplary nozzle cover of the laundry treating apparatus. FIG. 22B is a diagram illustrating a cross-sectional view taken along line B-B' of FIG. 22(a), illustrating the inside of the duct cover 830 and the side of the nozzle cover 840.

The nozzle cover body 841 can include a nozzle fusion plate 8411 coupled to the flow path formation parts 834 so as to shield the guide flow paths 8331, a first nozzle inclined plate 8412 configured to extend from the nozzle fusion plate 8411 and coupled to the flow path formation parts 834 so as to shield the first discharge flow paths 8332a, and a second nozzle inclined plate 8413 configured to extend from the first nozzle inclined plate 8412 and coupled to the flow path formation parts 834 so as to shield the second discharge flow paths 8332b.

The nozzle shield rib 843 can extend downwards from the distal end of the second nozzle inclined plate 8413, and can be coupled to the upper surface of the duct cover body 831. The nozzle switch rib 846 can extend from the second nozzle inclined plate 8413 or the nozzle shield rib 843 towards the cover through hole 8313.

The first nozzle inclined plate 8412 can be inclined from the nozzle fusion plate 8411 in the transfer direction of water, and the second nozzle inclined plate 8413 can be inclined from the first nozzle inclined plate 8412 in the transfer direction of water.

The first nozzle inclined plate 8412 can be inclined from the nozzle fusion plate 8411 at an inclination angle θ6 corresponding to the inclination angle θ1 of the first inclined surface 8316a, and the second nozzle inclined plate 8413 can be inclined from the first nozzle inclined plate 8412 at an inclination angle θ5 corresponding to the inclination angle θ2 of the second inclined surface 8316b. Thereby, the washing flow path parts 833 can extend so as to have a uniform inner height.

The nozzle fusion plate 8411, the first nozzle inclined plate 8412 and the second nozzle inclined plate 8413 can have a uniform thickness, thereby being capable of reducing the manufacturing cost of the nozzle cover 840.

Figure 23A:
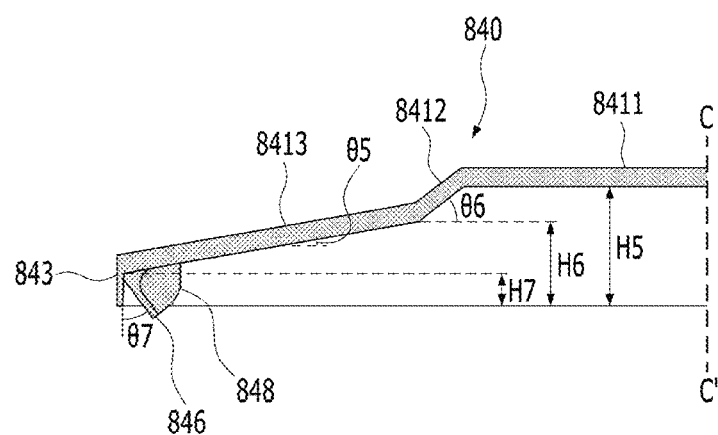
FIGS. 23A and 23B are diagrams illustrating side and bottom views of the nozzle cover shown in FIGS. 22A and 22B.
Figure 23B:
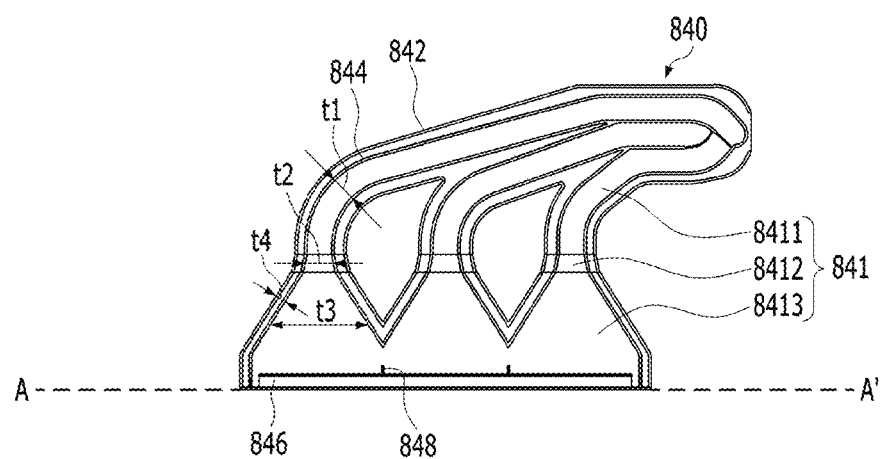

FIGS. 23A and 23B are diagrams illustrating side and bottom views of the nozzle cover shown in FIGS. 22A and 22B. In more detail, FIG. 23A is a diagram illustrating a side view of the nozzle cover 840, and FIG. 23B is a diagram illustrating a bottom view of the nozzle cover 840.

The nozzle switch rib 846 can extend from the second nozzle inclined plate 8413 or the nozzle shield rib 843 towards the cover through hole 8313. The angle θ7 between the nozzle switch rib 846 and the nozzle shield rib 843 can be within the range of 10 degrees to 80 degrees, and the angle θ7 between the nozzle switch rib 846 and the nozzle shield rib 843 can be variously designed depending on the disposition relations between the nozzle shield rib 843 and the first heat exchanger 910 or the disposition relations between the nozzle shield rib 843 and the cover though hole 8313.

The height H7 of the nozzle shield rib 843 can be less than the height of the second inclined surface 8316b, and the height H6 of the second nozzle inclined plate 8413 can be less than the height of the first inclined surface 8316a and can be greater than the height of the second inclined surface 8316b.

Thereby, the flow path formation parts 834 can protrude to a designated height and be coupled to the nozzle cover 840, the nozzle cover 840 can face the first inclined surface 8316a and the second inclined surface 8316b, and the washing flow path part 833 can be provided to have a designated height.

The nozzle cover 840 can include nozzle partition ribs 848 configured to divide water discharged from the plurality of washing flow path parts 833 together with the flow path partition ribs 836.

The nozzle partition ribs 848 can extend from the nozzle switch rib 846 towards the flow path partition ribs 836. The nozzle partition ribs 848 can be provided to overlap the flow path partition ribs 836, and for example, the nozzle partition ribs 848 can be provided to be coupled to the flow path partition ribs 836.

The nozzle partition ribs 848 and the flow path partition ribs 836 can divide water discharged from the plurality of washing flow path parts 833, and thereby, the nozzle partition ribs 848 can block water discharged from any one of the washing flow path parts 833 from being transferred to other washing flow path parts 833, and can thus enable water to be uniformly sprayed to the first heat exchanger 910.

As shown in FIG. 23B, the nozzle cover 840 can include nozzle coupling parts 844 coupled to the flow path formation parts 834.

The nozzle coupling parts 844 can be provided to extend from the nozzle cover body 841 towards the flow path formation parts 834, and can be coupled to the upper ends of the flow path formation parts 834.

The nozzle coupling parts 844 can be fused to the upper ends of the flow path formation parts 834 so as to be provided integrally with the flow path formation parts 834, and the nozzle fusion plate 8411 can come into contact with the upper ends of the flow path formation parts 834. The nozzle coupling parts 844 can face the flow path formation parts 834, and can extend in the direction of extension of the flow path formation parts 834.

Further, the nozzle cover 840 can include a nozzle extension rib 842 configured to block the nozzle cover body 841 from being separated from the washing flow path parts 833.

The nozzle extension rib 842 can extend in the thickness direction from the outer circumferential surface of the nozzle cover body 841 so as to accommodate the flow path formation parts 834. The nozzle extension rib 842 can be provided to have a greater width than the width of the flow path formation parts 834 so as to accommodate the outer circumferential surfaces of the flow path formation parts 834.

In some implementations, when the flow path support parts 837 are provided around the outer circumferences of the flow path formation parts 834, the nozzle extension rib 842 can accommodate the upper ends of the flow path support parts 837.

The distance t1 between the inner circumferential surfaces of the nozzle coupling parts 844 extending from the nozzle fusion plate 8411 can correspond to the width t1 of the guide flow path 8331.

The distance t2 between the inner circumferential surfaces of the nozzle coupling parts 844 extending from the first nozzle inclined plate 8412 can correspond to the width t2 of the first discharge flow path 8332a, and the distance t3 between the inner circumferential surfaces of the nozzle coupling parts 844 extending from the second nozzle inclined plate 8413 can correspond to the width t3 of the second discharge flow path 8332b.

Thereby, the nozzle fusion plate 8411 can shield the washing flow path parts 833, and can thus block water in the washing flow path parts 833 from leaking to the outside.

Figure 24A:
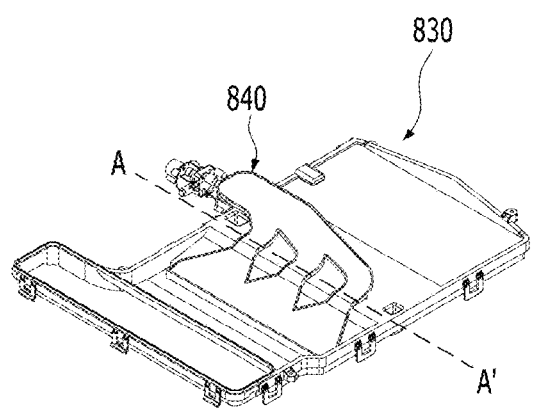
FIGS. 24A and 24B are diagrams illustrating perspective and cross-sectional views of an exemplary coupling between the nozzle cover and flow path formation parts in the laundry treating apparatus.
Figure 24B:
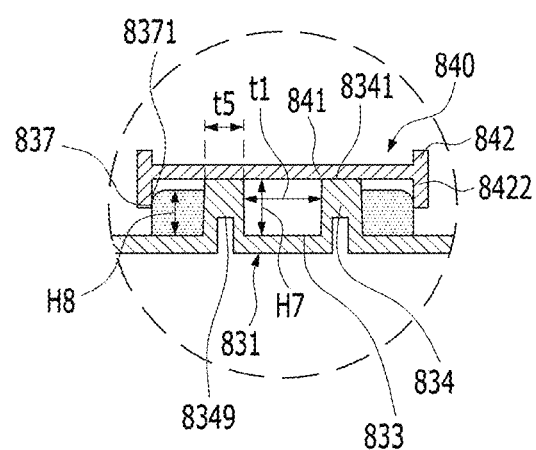

FIGS. 24A and 24B are diagrams illustrating perspective and cross-sectional views of one example of coupling between the nozzle cover and flow path formation parts in the laundry treating apparatus.

The flow path support part 837 can include a flow path support bend 8371 so that the nozzle extension rib 842 is easily coupled thereto.

The flow path support bend 8371 can be spaced apart from at least a portion of the nozzle extension rib 842. The flow path support bend 8371 can be provided at the distal end of the flow path support part 837 coupled to the nozzle extension rib 842.

The nozzle extension rib 842 can extend in the thickness direction from the outer circumferential surface of the nozzle cover body 841, and can be coupled to the flow path support parts 837 along the flow path support bend 8371. Thereby, generation of a burr during a process of coupling a lower end 8422 of the nozzle extension rib 842 to the flow path support parts 837 can be limited.

Further, the height H7 of the flow path formation parts 834 protruding from the upper surface of the duct cover body 831 can be equal to or greater than the height H8 of the protruding flow path support parts 837, and thereby, the nozzle cover body 841 can be spaced apart from the flow path support parts 837.

The thickness t5 of the flow path formation parts 834 can be equal to or less than the width t1 of the washing flow path parts 833, and the height of the washing flow path parts 833 can correspond to the height H7 of the flow path formation parts 834.

Further, the nozzle cover body 841 can be coupled to the upper ends 8341 of the flow path formation parts 834, and the flow path formation parts 834 can be coupled integrally to the nozzle cover body 841 through a thermal fusion process, for example, by welding.

Here, the thermal fusion process may indicate a process in which two thermoplastic members are coupled to each other by applying heat and pressure to the surfaces of the thermoplastic members. That is, the thermal fusion process may indicate a process in which the nozzle coupling parts 844 are coupled integrally to the flow path formation parts 834 through contact between the nozzle coupling parts 844 and the flow path formation parts 834 by applying heat to the nozzle coupling parts 844.

In some implementations, the flow path formation parts 834 can be coupled to the nozzle cover body 841 through a vibration fusion process.

Here, the vibration fusion process is a process in which two thermoplastic members are melted using frictional heat generated from a contact region therebetween through vertical or lateral vibration while being pressurized against each other, and then the two hardened members are coupled to each other.

For example, the vibration fusion process may indicate a process in which the nozzle coupling parts 844 and the flow path formation parts 834 are coupled to each other through frictional heat generated between the nozzle coupling parts 844 and the flow path formation parts 834 by vibrating the nozzle cover body 841 or the flow path formation parts 834.

Thereby, the nozzle cover body 841 can effectively shield the washing flow path parts 833 compared to the case in which the nozzle cover body 841 is coupled to the flow path formation parts 834 using hooks or using bolts and nuts, and a time taken to remodel or repair the nozzle cover body 841 can be increased and thus the life span of the entirety of a duct cover product can be increased.

Further, the nozzle cover body 841 can be coupled integrally to the flow path formation parts 834, and thus, the material cost of the duct cover 830 can be reduced and the assembly process thereof can be simplified.

Further, even when a separate washing flow path pipe is not provided, the washing flow path parts 833 are formed through coupling between the nozzle cover 840 and the duct cover 830, and thus, the manufacturing process of the washing flow path parts 833 can be simplified.

Figure 25:
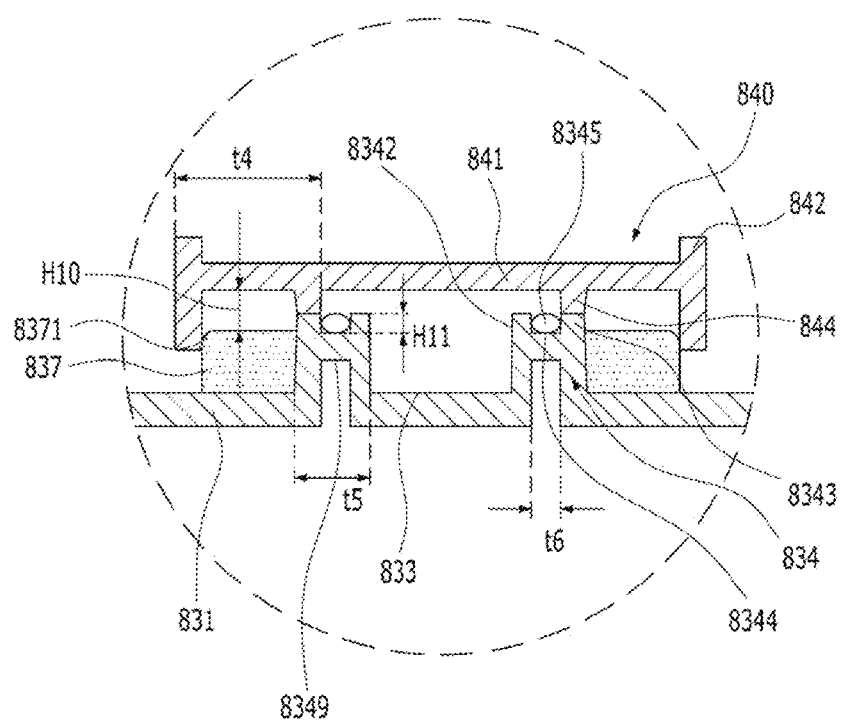
FIG. 25 is a diagram illustrating a cross-sectional view of another exemplary coupling between the nozzle cover and the flow path formation parts in the laundry treating apparatus.

FIG. 25 is a diagram illustrating a cross-sectional view of another exemplary coupling between the nozzle cover and the flow path formation parts in the laundry treating apparatus.

While FIGS. 24A and 24B illustrate the state in which the nozzle cover 840 is coupled to the flow path formation parts 834, FIG. 25 illustrates the state in which the nozzle cover 840 is spaced apart from the flow path formation parts 834 before coupling.

The flow path formation part 834 can further include a first coupling rib 8342 configured to form the inner surface of the washing flow path part 833, and a second coupling rib 8343 configured to form the outer surface of the washing flow path part 833.

The first coupling rib 8342 can protrude from the flow path formation part 834 and can be coupled to the nozzle cover body 841, and the second coupling rib 8343 can protrude from the flow path formation part 834 so as to be spaced apart from the first coupling rib 8342 and can be coupled to the nozzle coupling part 844. The height H11 of the second coupling rib 8343 protruding from the flow path formation part 834 can correspond to the height of the first coupling rib 8342 protruding from the flow path formation part 834.

The lower end of the nozzle coupling part 844 can come into contact with the upper end of the second coupling rib 8343, and the nozzle fusion plate 8411 can come into contact with the first coupling rib 8342.

The second coupling rib 8343 can be coupled to the nozzle coupling part 844 through the thermal fusion process or through the vibration fusion process. During this process, the nozzle coupling part 844 can be melted, and can thus be coupled to the second coupling rib 8343. The flow path formation part 834 can further include a flow path sealing groove 8344 provided between the first coupling rib 8342 and the second coupling rib 8343 and extending in the direction of extension of the washing flow path part 833, and a flow path sealing member 8345 placed in the flow path sealing groove 8344 so as to shield a gap between the nozzle cover body 841 and the washing flow path part 833.

The height H11 of the protruding second coupling rib 8343 and first coupling rib 8342 can correspond to the diameter of the flow path sealing member 8345.

The flow path sealing member 8345 can be provided to come into contact with the nozzle cover body 841, and can thus shield a gap between the nozzle cover body 841 and the flow path sealing groove 8344 and block water in the washing flow path part 833 from leaking through the nozzle cover body 841. For example, the flow path sealing member 8345 can block water from leaking from the inside of the washing flow path parts 833 to the outside of the washing flow path parts 833.

Further, a plurality of flow path sealing grooves 8344 and a plurality of flow path sealing members 8345 can be provided between the flow path forming parts 834 so as to overlap with each other in the width direction.

When the plurality of flow path sealing grooves 8344 and the plurality of flow path sealing members 8345 are provided, the shielding power of the nozzle cover body 841 can be increased as compared to the case in which one flow path sealing groove 8344 and one flow path sealing member 8345 are provided.

The distance t6 between the inner circumferential surfaces of the flow path incoming groove 8349 can be less than the thickness t5 of the flow path formation part 834, and thus, the flow path incoming groove 8349 can be accommodated in the flow path formation part 834.

Figure 26:
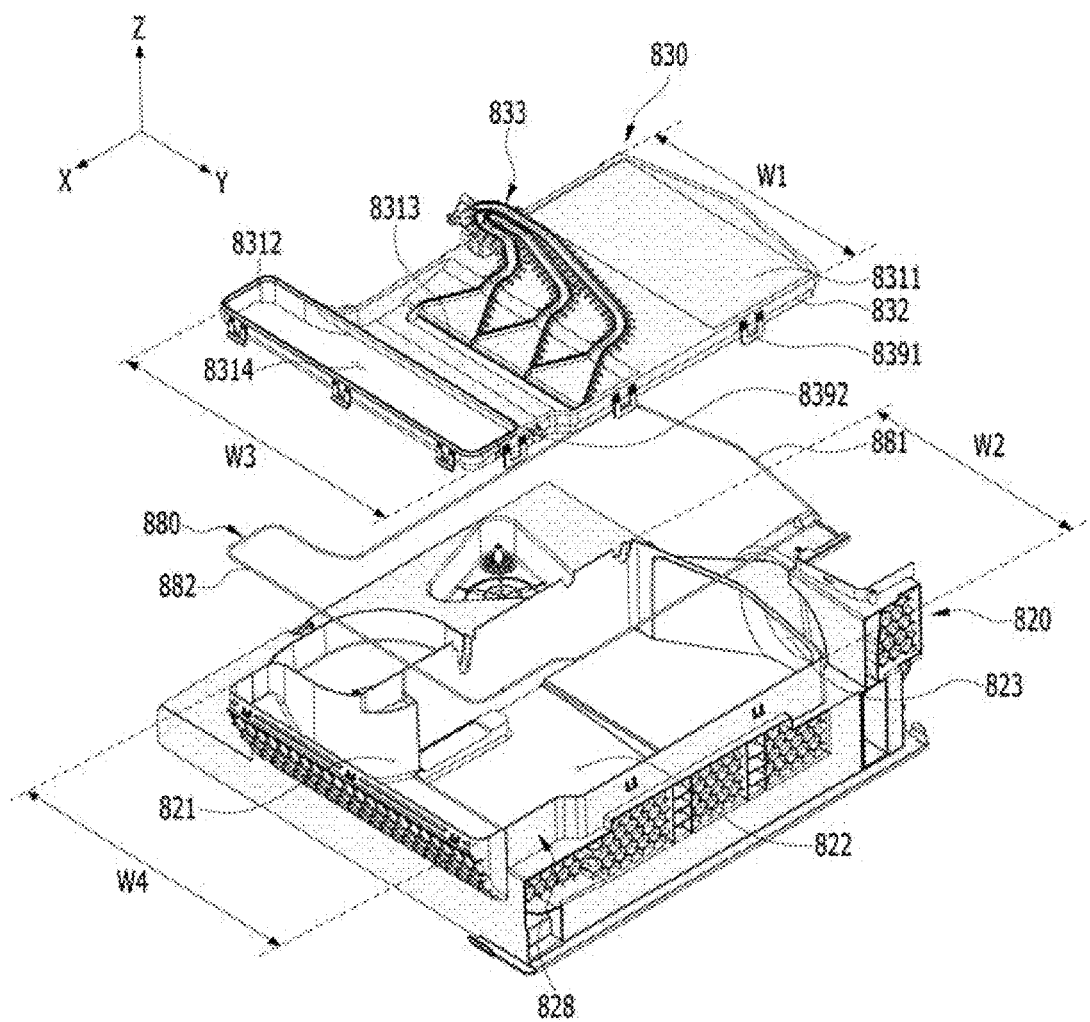
FIG. 26 is a diagram illustrating a perspective view of the duct cover, a duct sealing unit, and a supply duct of the exemplary laundry treating apparatus.

FIG. 26 is a diagram illustrating a perspective view of the duct cover 830 and a duct sealing unit 880 of the laundry treating apparatus.

The circulation flow path part 820 can be provided in a duct shape disposed outside the drum 200. The circulation flow path part 820 can include a supply duct 828 configured to communicate with the duct communication hole 417 so that air in the drum 200 is supplied to the supply duct 828 and to accommodate the first heat exchanger 910 and the second heat exchanger 920, and the discharge duct 823 configured to discharge air having passed through the supply duct 828.

The supply duct 828 can include the above-described inflow duct 821 and transfer duct 822. The supply duct 828 can receive air supplied from the drum 200 through the inflow communication hole 8314, and the discharge duct 823 can be provided at the distal end of the supply duct 828 so as to guide the air to the drum 200.

Air discharged from the drum 200 and introduced into the supply duct 828 can include a large amount of moisture discharged from laundry. For example, the air introduced into the supply duct 828 can maintain a high-temperature and high-humidity state until the air is resupplied to the drum 200 through the discharge duct 823.

Here, since various devices configured to control operation of the laundry treating apparatus are provided outside the circulation flow path part 820, it is undesirable that air discharged from the drum 200 leaks to the outside of the circulation flow path part 820.

For this purpose, the circulation flow path part 820 can include the duct sealing unit 880 provided to block air in the supply duct 828 from leaking through the duct cover 830.

The duct sealing unit 880 can be disposed between the supply duct 828 and the duct cover 830 so as to block air in the supply duct 828 from leaking through the duct cover 830. The duct sealing unit 880 can isolate the inside and the outside of the circulation flow path part 820 from each other by shielding a contact region between the duct cover 830 and the supply duct 828.

In some implementations, the duct sealing unit 880 can include a first duct sealing part 881 configured to block air in the transfer duct 822 from leaking through the shield cover body 8311, and a second duct sealing part 882 configured to block air in the inflow duct 821 from leaking through the communication cover body 8312.

The first duct sealing part 881 can be disposed between the shield cover body 8311 and the transfer duct 822, and the second duct sealing part 882 can be disposed between the communication cover body 8312 and the inflow duct 821.

Further, the duct cover 830 can be integrally formed, and can be placed on the open upper surfaces of the inflow duct 821 and the transfer duct 822. Thereby, the manufacturing cost of the duct cover 830 can be reduced, and the duct cover 830 can be easily coupled to the supply duct 828.

Here, the duct sealing unit 880 can be integrally formed along the circumference of the duct cover 830, and specifically, the first duct sealing part 881 and the second duct sealing part 882 can be formed integrally with each other, and can be placed on the duct cover 830.

The duct sealing unit 880 can be provided in a closed curve along the contact region between the duct cover 830 and the supply duct 828.

The duct sealing unit 880 can be integrally formed as an O-ring, and can be formed in various shapes which can shield a gap between the duct cover 830 and the supply duct 828.

Figure 27:
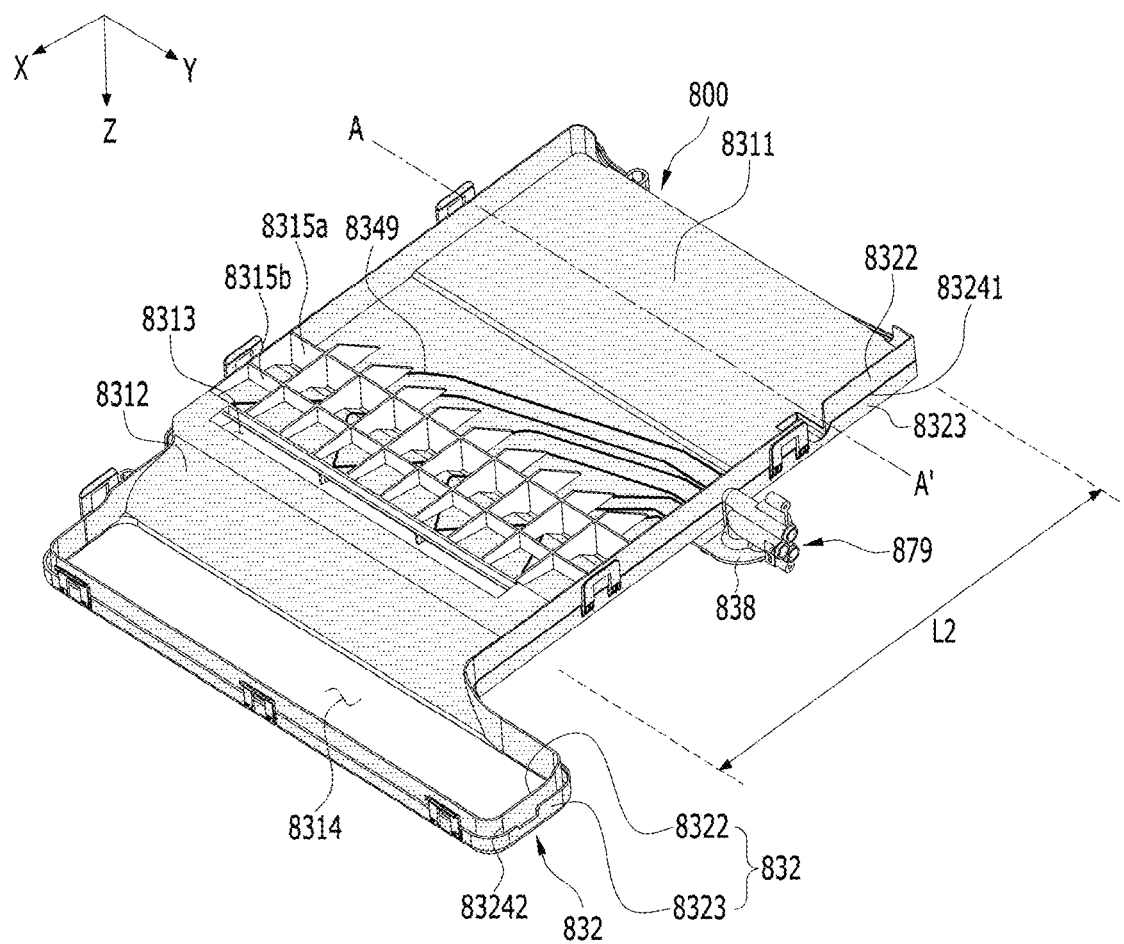
FIG. 27 is a diagram illustrating a perspective view of the lower surface of the duct cover of the exemplary laundry treating apparatus.

FIG. 27 is a diagram illustrating a perspective view of the lower surface of the duct cover 830 of the laundry treating apparatus.

The duct cover 830 can include the duct cover extension 832 to which the supply duct 828 is coupled. The duct cover extension 832 can be coupled to the transfer duct 822 and the inflow duct 821.

The duct cover extension 832 can extend in the thickness direction from the outer circumferential surfaces of the communication cover body 8312 and the shield cover body 8311, and can be coupled to the transfer duct 822 and the inflow duct 821.

The duct cover extension 832 can protrude in the thickness direction (in the direction Z) from at least one of both side surfaces or the rear surface of the shield cover body 8311 or the communication cover body 8312.

The duct cover extension 832 can improve durability of the shield cover body 8311 and the communication cover body 8312, and the upper ends of the transfer duct 822 and the inflow duct 821 can be inserted into the duct cover extension 832.

The duct cover extension 832 can include the sealing mount part 8324 configured to provide a space in which the duct sealing unit 880 is placed.

The sealing mount part 8324 can be recessed upwards from the lower end of the duct cover extension 832 along the circumference of the duct cover extension 832.

The sealing mount part 8324 can be disposed at the lower end of the duct cover extension 832 so that the upper end of the supply duct 828 is inserted into the sealing mount part 8324, and can accommodate the duct sealing unit 880. Thereby, the duct sealing unit 880 can be accommodated in the sealing mount part 8324, and can be disposed between the upper end of the supply duct 828 and the inner circumferential surface of the sealing mount part 8324.

The diameter of the duct sealing unit 880 can be less than the diameter of the sealing mount part 8324 so that the duct sealing unit 880 is accommodated in the sealing mount part 8324.

For example, the sealing mount part 8324 can include a first sealing mount part 83241 into which the upper end of the transfer duct 822 is inserted, and a second sealing mount part 83242 into which the upper end of the inflow duct 821 is inserted.

The first sealing mount part 83241 can be disposed on the duct cover extension 832 extending from the outer circumferential surface of the shield cover body 8311, and can extend along the circumference of the transfer duct 822. The first sealing mount part 83241 can be provided on one surface of the duct cover extension 832 facing the upper end of the transfer duct 822.

Further, the distance between the inner circumferential surfaces of the first sealing mount part 83241 can correspond to the thickness of the upper end of the transfer duct 822, and thus, the upper end of the transfer duct 822 can be inserted into the first sealing mount part 83241.

The first duct sealing part 881 can be accommodated in the first sealing mount part 83241, and can be disposed between the inner circumferential surface of the first sealing mount part 83241 and the upper end of the transfer duct 822. Thereby, the first duct sealing part 881 can shield a gap between the transfer duct 822 and the first sealing mount part 83241, and can block air in the transfer duct 822 from leaking through the shield cover body 8311.

The diameter of the first duct sealing part 881 can correspond to the diameter of the transfer duct 822, and the first duct sealing part 881 can be provided to face the upper end of the transfer duct 822.

Further, the second sealing mount part 83242 can be disposed on the duct cover extension 832 extending from the outer circumferential surface of the communication cover body 8312, and can extend along the circumference of the inflow duct 821. The second sealing mount part 83242 can be provided on one surface of the duct cover extension 832 facing the upper end of the inflow duct 821.

The second sealing mount part 83242 can have a greater diameter than the diameter of the inflow communication hole 8314 so as to accommodate at least a portion of the inflow communication hole 8314.

The distance between the inner circumferential surfaces of the second sealing mount part 83242 can correspond to the thickness of the upper end of the inflow duct 821, and thus, the upper end of the inflow duct 821 can be inserted into the second sealing mount part 83242.

The second duct sealing part 882 can be accommodated in the second sealing mount part 83242, and can be disposed between the inner circumferential surface of the second sealing mount part 83242 and the upper end of the inflow duct 821. Thereby, the second duct sealing part 882 can shield a gap between the inflow duct 821 and the second sealing mount part 83242, and can block air in the inflow duct 821 from leaking through the communication cover body 8312.

The diameter of the second duct sealing part 882 can correspond to the diameter of the inflow duct 821, one end of the second duct sealing part 882 can be provided parallel to the first duct sealing part 881, and the other end of the second duct sealing part 882 can protrude farther than the first duct sealing part 881.

As described above, the first duct sealing part 881 and the second duct sealing part 882 can be integrated into one body. For this purpose, the first sealing mount part 83241 can be provided to communicate with the second sealing mount part 83242.

The inner circumferential surface of the first sealing mount part 83241 and the inner circumferential surface of the second sealing mount part 83242 can form one continuous surface, and the diameter of the first sealing mount part 83241 and the diameter of the second sealing mount part 83242 can correspond to each other.

Thereby, the first duct sealing part 881 and the second duct sealing part 882 can be integrated into one body and can be accommodated in the sealing mount part 8324, the duct sealing unit 880 can be easily inserted into the sealing mount part 8324, and leakage of air in the circulation flow path part 820 to the outside can be more effectively blocked.

The duct cover extension 832 can include the cover insert part 8322 configured to define the inner surface of the sealing mount part 8324, and the cover stepped part 8323 configured to define the outer surface of the sealing mount part 8324.

The sealing mount part 8324 can be disposed between the cover insert part 8322 and the cover stepped part 8323, the cover insert part 8322 can be located inside the sealing mount part 8324 and can thus form the inner circumferential surface of the duct cover extension 832, and the cover stepped part 8323 can be disposed outside the sealing mount part 8324 and can thus form the outer surface of the duct cover extension 832.

The cover stepped part 8323 can extend from the outer surfaces of the communication cover body 8312 and the shield cover body 8311, and can be inserted into the transfer duct 822 and the inflow duct 821. The cover stepped part 8323 can extend downwards from the duct cover extension 832 along the outer surfaces of the transfer duct 822 and the inflow duct 821, and can come into contact with the outer surfaces of the transfer duct 822 and the inflow duct 821.

Thereby, the upper ends of the transfer duct 822 and the inflow duct 821 can be accommodated in the sealing mount part 8324 such that the outer circumferential surfaces of the transfer duct 822 and the inflow duct 821 come into contact with the cover stepped part 8323 and the inner circumferential surfaces thereof come into contact with the cover insert part 8322.

Figure 28:
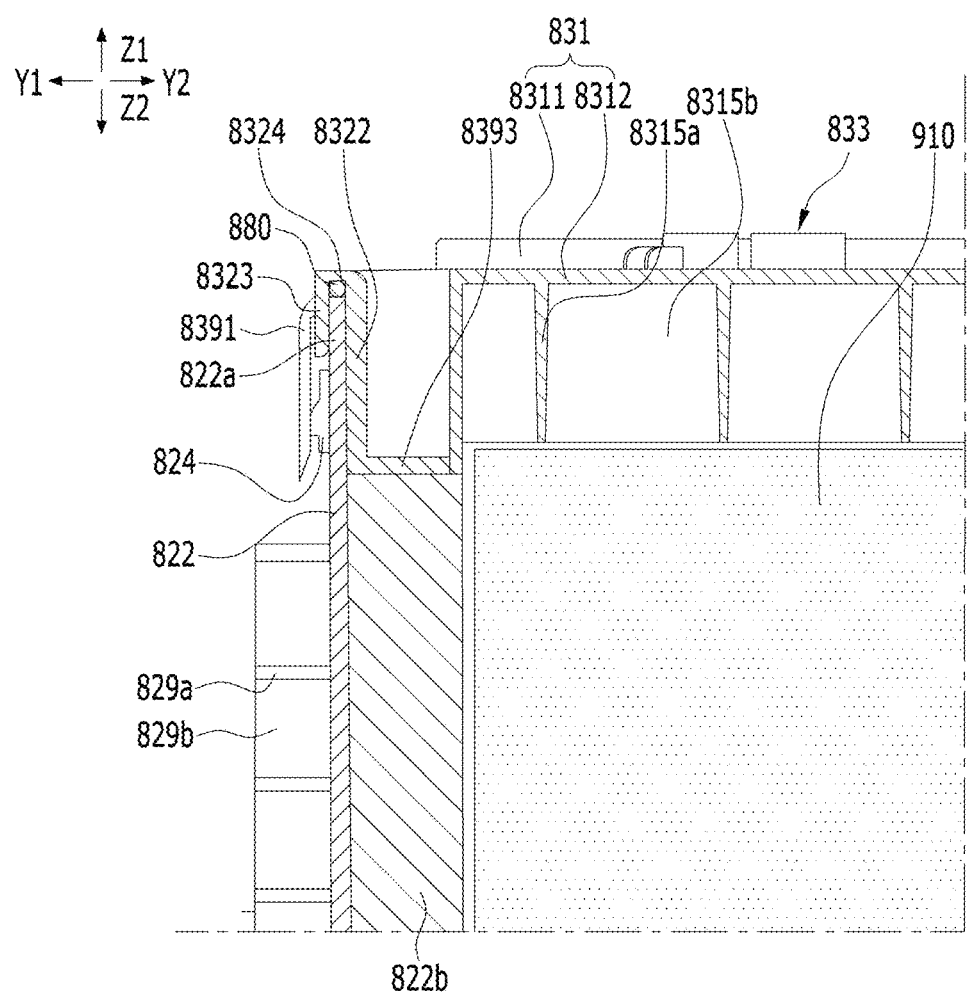
FIG. 28 is a diagram illustrating a cross-sectional view of a coupled state between the duct cover and a transfer duct in the exemplary laundry treating apparatus.

FIG. 28 is a diagram illustrating a cross-sectional view of a coupled state between the duct cover and the transfer duct in the laundry treating apparatus, and specifically, is a cross-sectional view taken along line A-A' of FIG. 27.

Each of the transfer duct 822 and the inflow duct 821 can include a duct coupling part 822*a* inserted into the sealing mount part 8324 so as to be coupled to the duct cover extension 832. The duct coupling part 822*a* can correspond to the upper end of each of the transfer duct 822 and the inflow duct 821, and can be disposed to be higher than the first heat exchanger 910 so as to be coupled to the duct cover extension 832.

The duct coupling part 822*a* can have a thickness corresponding to the sealing mount part 8324, and concretely, the thickness of the duct coupling part 822*a* can correspond to the distance between the inner circumferential surfaces of the sealing mount part 8324.

The outer circumferential surface of the duct coupling part 822*a* can come into contact with the cover stepped part 8323, and the inner circumferential surface of the duct coupling part 822*a* can come into contact with the cover insert part 8322.

Further, the duct sealing unit 880 can be disposed between the upper end of the duct coupling part 822*a* and the inner circumferential surface of the sealing mount part 8324. Thereby, the duct sealing unit 880 can block air in the circulation flow path part 820 from leaking to the outside through the sealing mount part 8324.

The duct coupling part 822*a* can be provided such that the outer circumferential surface thereof comes into contact with the cover stepped part 8323, the inner circumferential surface thereof comes into contact with the cover insert part 8322, and the upper end thereof comes into contact with the duct sealing unit 880, thereby being capable of blocking air in the transfer duct 822 and the inflow duct 821 from leaking through a gap between the duct coupling part 822*a* and the duct cover extension 832.

Further, the duct cover extension 832 can include cover mounting hooks 8391 extending from the outer surface of the cover stepped part 8323 and disposed along the circumference of the cover stepped part 8323. A plurality of cover mounting hooks 8391 can be disposed along the outer circumferential surface of the cover stepped part 8323.

Each of the transfer duct 822 and the inflow duct 821 can include duct protrusions 824 protruding from the outer circumferential surface of the duct coupling part 822*a* so that the cover mounting hooks 8391 are coupled to the duct protrusions 824. A plurality of duct protrusions 824 can be disposed along the outer circumferential surface of the duct coupling part 822*a*.

Thereby, a user can easily detachably attach the cover mounting hooks 8391 to the duct protrusions 824, and can easily couple the duct cover 830 to the transfer duct 822 and the inflow duct 821.

Further, the duct coupling part 822*a* can be inserted into the sealing mount part 8324, can be coupled to the cover stepped part 8323 and the cover insert part 8322, and can be coupled to the cover mounting hooks 8391 through the duct protrusions 824 protruding from the outer surface of the duct coupling part 822*a*. Thereby, the duct cover 830 can be firmly coupled to the transfer duct 822 and the inflow duct 821.

The transfer duct 822 can include a duct support part 822*b* configured to support the cover insert part 8322.

The duct support part 822*b* can extend in the width direction from the inner circumferential surface of the transfer duct 822, and can extend from the bottom surface of the transfer duct 822 towards the cover insert part 8322 so as to support the cover insert part 8322.

Further, the cover insert part 8322 can include a cover fastening part 8393 coupled to the duct support part 822*b* so as to couple the cover insert part 8322 to the duct support part 822*b*.

The cover fastening part 8393 can extend in a direction away from the duct coupling part 822*a*, and thus, the lower surface of the cover fastening part 8393 can face the duct support part 822*b*. The cover fastening part 8393 can be provided to be coupled to the duct support part 822*b* and, for example, can be coupled to the duct support part 822*b* using bolts and nuts.

Thereby, even when the duct cover 830 is placed on the open upper surfaces of the transfer duct 822 and the inflow duct 821, the transfer duct 822 can stably support the duct cover 830 through the duct support part 822*b* and the cover fastening part 8393.

The transfer duct 822 can include duct ribs 829*a* and 829*b* configured to discharge heat to external air.

The duct ribs 829*a* and 829*b* can protrude from the outer surface of the transfer duct 822, and can be disposed in front of the first heat exchanger 910. Thereby, the contact area of the transfer duct 822 with external air can be increased, and air discharged from the drum 200 can be rapidly cooled while passing through the first heat exchanger 910.

The duct ribs 829*a* and 829*b* can include first duct ribs 829*a* extending in the forward and rearward directions, and second duct ribs 829*b* extending in the vertical direction so as to connect the first duct ribs 829*a*.

A plurality of first duct ribs 829*a* and a plurality of second duct ribs 829*b* can be provided, and the plurality of second duct ribs 829*b* can be provided to connect the plurality of first duct ribs 829*a*.

Figure 29:
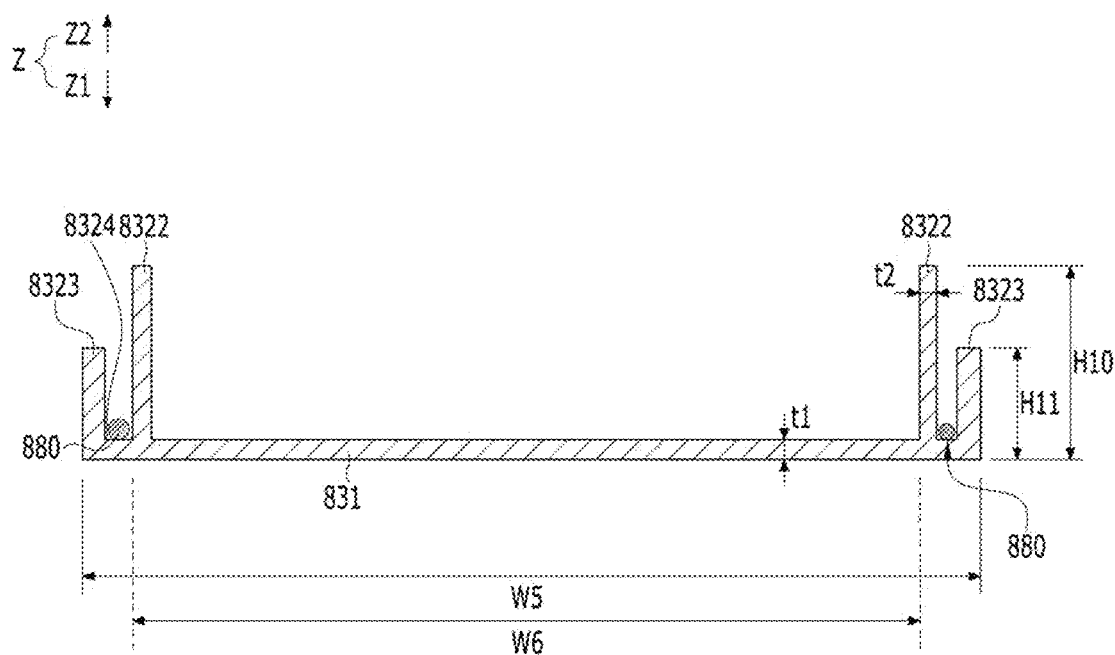
FIG. 29 is a diagram illustrating a cross-sectional view of the state in which the duct sealing unit is inserted into a sealing mount part in the exemplary laundry treating apparatus.

FIG. 29 is a diagram illustrating a cross-sectional view of the state in which the duct sealing unit 880 is inserted into the sealing mount part 8324 in the laundry treating apparatus.

The cover insert part 8322 and the cover stepped part 8323 can extend in the thickness direction (i.e., the direction Z2) from the duct cover body 831.

The height H10 of the cover insert part 8322 extending from the duct cover body 831 can be greater than the height H11 of the cover stepped part 8323 extending from the duct cover body 831.

As the cover insert part 8322 extends greater than the cover stepped part 8223, the duct cover body 831 can be blocked from being freely released from the transfer duct 822 and the inflow duct 821, and can be firmly coupled to the transfer duct 822 and the inflow duct 821.

Further, the width W5 of the cover stepped part 8323 can be greater than the width W6 of the cover insert part 8322. The width W6 of the cover insert part 8322 can be variously determined depending on the width of the sealing mount part 8324.

Thereby, the sealing mount part 8324 can be disposed between the cover stepped part 8323 and the cover insert part 8322, and the duct sealing unit 880 can be accommodated in the sealing mount part 8324. The distance between the inner circumferential surfaces of the sealing mount part 8324 can be equal to or less than the diameter of the duct sealing unit 880, and thus, the duct sealing unit 880 can be coupled to the sealing mount part 8324 through interference fit.

Figure 30:
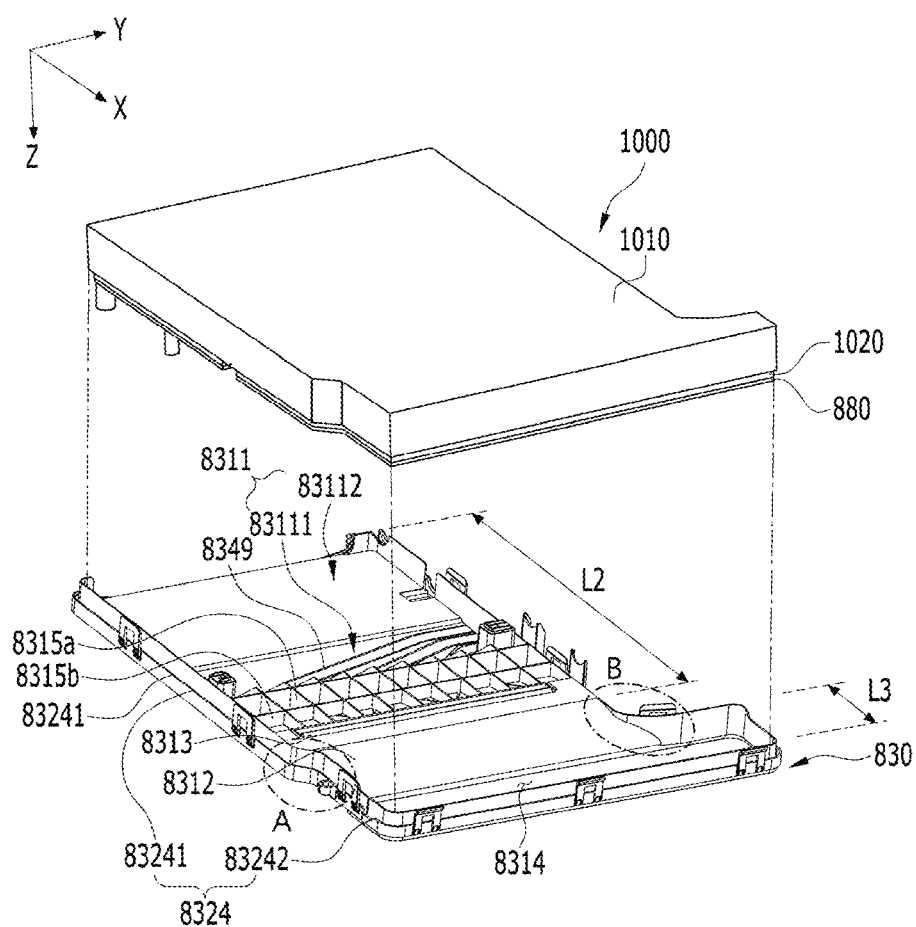
FIG. 30 is a diagram illustrating an exploded perspective view of the duct cover and a sealing jig member in the exemplary laundry treating apparatus.

FIG. 30 is a diagram illustrating an exploded perspective view of the duct cover 830 and a sealing jig member 1000 in the laundry treating apparatus.

The duct sealing unit 880 can be integrally formed, and can be mounted in the sealing mount part 8324. The first sealing mount part 83241 and the second sealing mount part 83242 can form one continuous surface, and can be made of the same material in the same shape.

The laundry treating apparatus can include the sealing jig member 1000 configured to insert the duct sealing unit 880 into the duct cover 830.

The sealing jig member 1000 can include a jig mount part 1020 placed on the lower surface of the duct cover 830 such that the duct sealing unit 880 is inserted into the jig mount part 1020, and a jig insert part provided to be movable towards the jig mount part 1020 so as to pressurize the duct sealing unit 880 against the duct cover 830.

The duct sealing unit 880 can be disposed on the outer circumferential surface of the jig mount part 1020. The jig mount part 1020 can be connected to the cover insert part 8322, and can be placed on the duct cover 830. The outer circumferential surface of the jig mount part 1020 can have a shape corresponding to the outer circumferential surface of the cover insert part 8322.

The jig insert part 1010 can be disposed on a surface of the jig mount part 1020 opposite to the duct cover 830, can be connected to the jig mount part 1020, and can reciprocate to become close to the jig mount part 1020 or to be away from the jig mount part 1020.

For example, the jig insert part 1010 can be provided on the jig mount part 1020 so as to reciprocate in the height direction (i.e., the direction Z), and can pressurize the duct sealing unit 880 so as to insert the duct sealing unit 880 into the sealing mount part 8324.

Figure 31:
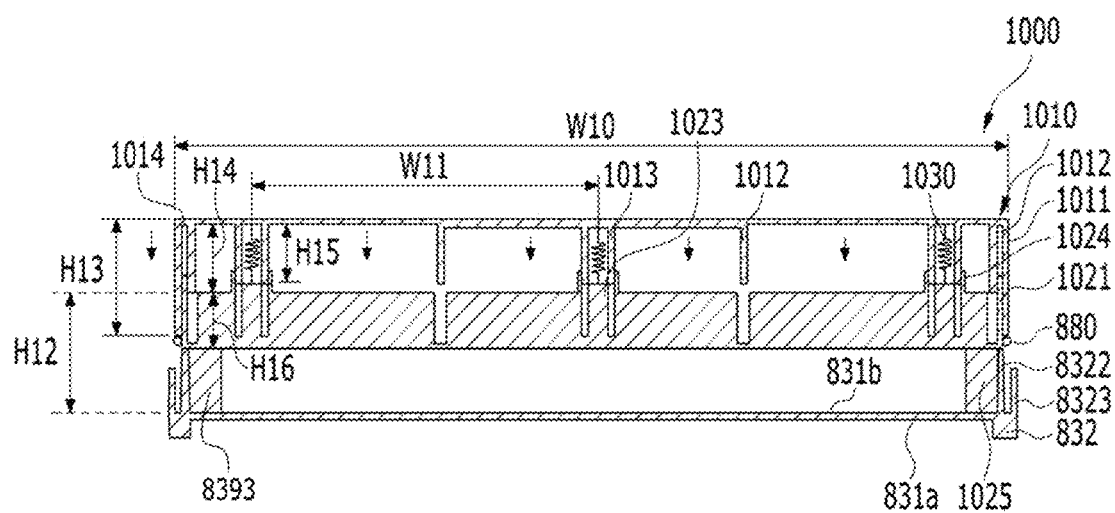
FIG. 31 is a diagram illustrating a cross-sectional view of the state in which the sealing jig member is mounted on the duct cover in the exemplary laundry treating apparatus.

FIG. 31 is a diagram illustrating a cross-sectional view of the state in which the sealing jig member 1000 is mounted on the duct cover 830 in the laundry treating apparatus.

The jig mount part 1020 can include a jig mount extension 1025 provided to space the duct sealing unit 880 apart from the cover insert part 8322.

The jig mount extension 1025 can extend from one surface of the jig mount part 1020 facing the duct cover body 831 towards the duct cover body 831. The jig mount extension 1025 can be provided to come into contact with a lower surface 831b of the duct cover body 831.

The height H12 of the jig mount extension 1025 can be greater than the height of the cover insert part 8322. Thereby, even when the jig mount part 1020 is mounted on the lower surface 831b of the duct cover body 831, the duct sealing unit 880 can be blocked from coming into contact with the cover insert part 8322.

Further, the jig mount part 1020 can come into contact with the cover fastening part 8393, and the jig mount part 1020 can be supported by the cover fastening part 8393 and can be mounted on the lower surface of the duct cover body 831.

The sealing jig member 1000 can further include jig elastic members 1030 configured to provide elastic force to the jig insert part 1010 and the jig mount part 1020.

The jig elastic members 1030 can be provided between the jig insert part 1010 and the jig mount part 1020, and come into contact with the jig insert part 1010 and the jig mount part 1020.

One end of each of the jig elastic members 1030 can come into contact with a corresponding one of elastic member support parts 1023 of the jig mount part 1020 and the other end of each of the jig elastic members 1030 can come into contact with the jig insert part 1010, and thus, the jig elastic members 1030 can provide elastic force so that the jig insert part 1010 can reciprocate.

Further, the jig insert part 1010 can include elastic member accommodators 1013 configured to accommodate the jig elastic members 1030.

A plurality of elastic member accommodators 1013 can be provided on the inner circumferential surface of the jig insert part 1010, and can be disposed to be spaced apart from each other by a designated distance W11. The jig elastic members 1030 can extend in the direction of extension of the elastic member accommodators 1013 (i.e., in the height direction).

The jig mount part 1020 can include a mount insert part 1021 on which the duct sealing unit 880 is mounted.

One end of the mount insert part 1021 can be inserted into the jig insert part 1010, and the other end of the mount insert part 1021 can come into contact with the cover insert part 8322. The outer circumferential surface of the mount insert part 1021 can be provided in a shape corresponding to the outer circumferential surface of the cover insert part 8322.

Further, the jig insert part 1010 can include a mount accommodator 1014 into which the mount insert part 1021 is inserted when the jig insert part 1010 is moved towards the jig mount part 1020, and a jig guide part 1012 extending from the inner circumferential surface of the mount accommodator 1014 towards the jig mount part 1020 so as to be inserted into the jig mount part 1020.

The jig mount part 1020 can serve as a factor to determine the direction of movement of the jig insert part 1010 when the jig insert part 1010 is inserted into the jig mount part 1020.

Further, the jig insert part 1010 can further include a sealing insert part 1011 extending from the outer circumferential surface of the mount accommodator 1014 towards the sealing mount part 8324 so as to pressurize the duct sealing unit 880 against the sealing mount part 8324.

The height H13 of the sealing insert part 1011 can be less than the sum of the thickness H16 of the jig mount part 1020 and the distance H14 between the jig insert part 1010 and the jig mount part 1020.

Thereby, the duct sealing unit 880 can be disposed between the sealing insert part 1011 and the mount insert part 1021.

Figure 32:
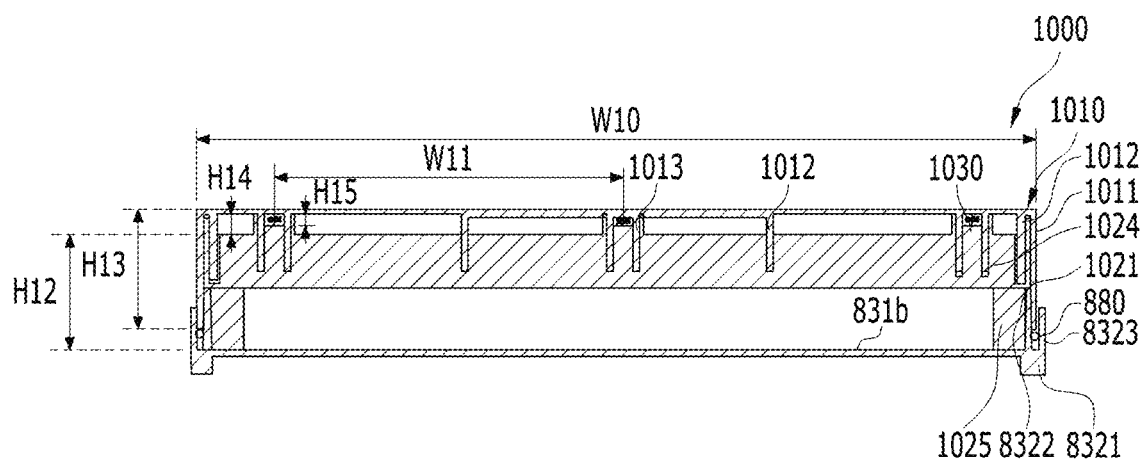
FIG. 32 is a diagram illustrating a cross-sectional view of the state in which the duct sealing unit is inserted into the duct cover through the sealing jig member in the exemplary laundry treating apparatus.

FIG. 32 is a diagram illustrating a cross-sectional view of the state in which the duct sealing unit 880 is inserted into the duct cover 830 through the sealing jig member 1000 in the laundry treating apparatus.

As the first sealing mount part 83241 and the second sealing mount part 83242 communicate with each other so as to form one continuous surface and the first duct sealing part 881 and the second duct sealing part 882 are formed in a closed curve, the sealing jig member 1000 can insert the duct sealing unit 880 into the sealing mount part 8324.

Concretely, when the jig insert part 1010 is moved towards the jig mount part 1020 of the sealing jig member 1000 shown in FIG. 31, the jig guide part 1012 can be inserted into the jig mount part 1020, the mount insert part 1021 can be inserted into the mount accommodator 1014, and the sealing insert part 1011 can move the duct sealing unit 880 towards the sealing mount part 8324 so as to insert the duct sealing unit 880 into the sealing mount part 8324.

In this case, the height H13 of the sealing insert part 1011 can be equal to or less than the distance from the sealing mount part 8324 to the upper surface of the jig insert part 1010. The lower end of the sealing insert part 1011 can be moved to a position at which the duct sealing unit 880 can be completely inserted into the sealing mount part 8324.

When the jig insert part 1010 inserts the duct sealing unit 880 into the sealing mount part 8324, the pressurized jig elastic members 1030 can apply elastic force to the jig insert part 1010 so as to become away from the jig mount part 1020, and the sealing insert part 1011 inserted into the sealing mount part 8324 can be released from the sealing mount part 8324.

The shapes and sizes of the jig insert part 1010 and the jig mount part 1020 can be varied as long as the jig insert part 1010 inserts the duct sealing unit 880 into the sealing mount part 8324.

Further, the shapes and sizes of the jig insert part 1010 and the jig mount part 1020 can be variously designed depending on the shapes and sizes of the duct sealing unit 880, the sealing mount part 8324 and the lower surface of the duct cover body 831.

As shown in FIG. 30, the duct cover 830 can be formed to have a shape corresponding to the shape of the circulation flow path part 820, and the cover insert part 8322 and the cover stepped part 8323 between which the duct sealing unit 880 of the duct cover 830 is inserted can also be formed to have a shape corresponding to the shape of the circulation flow path part 820.

For example, the cover insert part 8322 and the cover stepped part 8323 of the duct cover 830 can have corners formed in a shape protruding in the outward direction of the duct cover 830 and/or corners formed in a shape depressed in the inward direction of the duct cover 830 depending on the shape of the duct cover 830.

For example, as shown in a portion A and a portion B of FIG. 30, the duct cover 830 can include the cover insert part 8322 and the cover stepped part 8323 can have corners formed in a shape depressed towards the inside of the duct cover 830 so as to correspond to the shape of the circulation flow path part 820.

The duct sealing unit 880 is pressurized by the above-described sealing jig member 1000 in the state in which the duct sealing unit 880 is placed outside the cover insert part 8322, and is thus inserted into a space between the cover insert part 8322 and the cover stepped part 8323.

Here, the duct sealing unit 880 is formed as an O-ring having designated elasticity and formed in a closed curve along the contact region of the duct cover 830 with the supply duct 828.

In order to insert the duct sealing unit 880 between the cover insert part 8322 and the cover stepped part 8323 through the sealing jig member 1000, the duct sealing unit 880 should be placed on the outer circumferential surface of the cover insert part 8322, and when the duct sealing unit 880 is placed on the outer circumferential surface of the cover insert part 8322, a part of the duct sealing unit 880 located in the concave corner of the cover insert part 8322 may not be adhered to the cover insert part 8322 and may be spaced apart from the cover insert part 8322 due to elastic force of the duct sealing unit 880.

In this case, when the duct sealing unit 880 is pressurized by the sealing jig member 1000, the part of the duct sealing unit 880 which is not adhered to the cover insert part 8322 may be released from the jig mount part 1020, or may be released from the space between the cover insert part 8322 and the cover stepped part 8323, and may thus not be smoothly inserted into the space between the cover insert part 8322 and the cover stepped part 8323.

Therefore, it may be necessary to change or limit the position of the duct sealing unit 880 so that the duct sealing unit 880 is located in the space between the cover insert part 8322 and the cover stepped part 8323 before the duct sealing unit 800 is pressurized by the sealing jig member 1000.

For this purpose, duct sealing unit-engaging protrusions 83231 configured to pressurize parts of the duct sealing unit 880 located on the concave corners of the cover insert part 8322 against the concave corners of the cover insert part 8322 can be further provided on the cover stepped part 8323.

Figure 33:
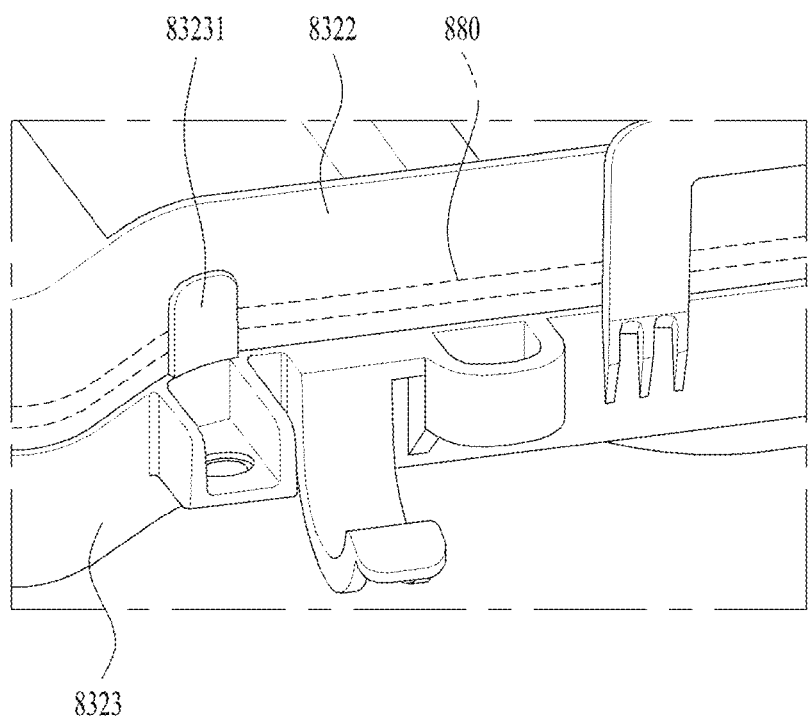
FIG. 33 is a diagram illustrating an enlarged perspective view of a portion A of FIG. 30.
Figure 34:
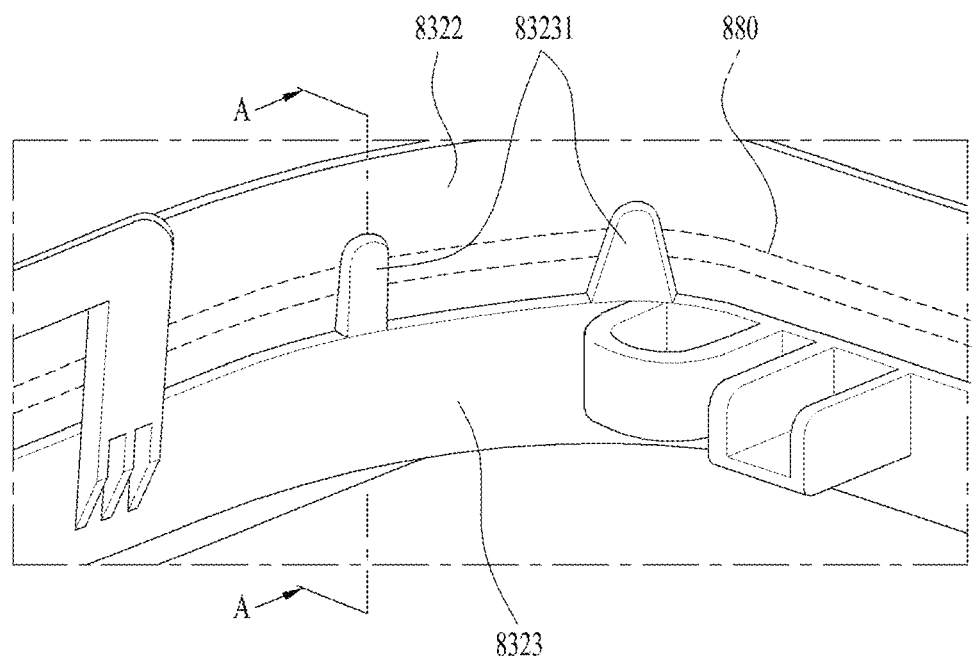
FIG. 34 is a diagram illustrating an enlarged perspective view of a portion B of FIG. 30.

FIGS. 33 and 34 are diagrams illustrating enlarged perspective views of the portion A and the portion B shown in FIG. 30.

As shown in these figures, concave corners depressed towards the inside of the duct cover 830 so as to correspond to the shape of the circulation flow path part 820 can be provided on the outer circumferential surface of the duct cover 830 (i.e., the outer circumferential surface of the cover insert part 8322). Therefore, the duct sealing unit 880 placed on the cover insert part 8322 may not be adhered to the concave corners of the cover insert part 8322.

In some implementations, in order to minimize spacing of the duct sealing unit 880 from the concave corners of the cover insert part 8322, the duct sealing unit-engaging protrusions 83231, which pressurize the duct sealing unit 880 against the cover insert part 8322, can protrude from regions of the cover stepped part 8323 facing the concave corners of the cover insert part 8322. The duct sealing unit-engaging protrusions 83231 can protrude in the direction of extension of the cover stepped part 8323, and can thus block the duct sealing unit 880 placed on the cover insert part 8322 from being spaced apart from the cover insert part 8322 towards the outside of the cover stepped part 8323.

Figure 35:
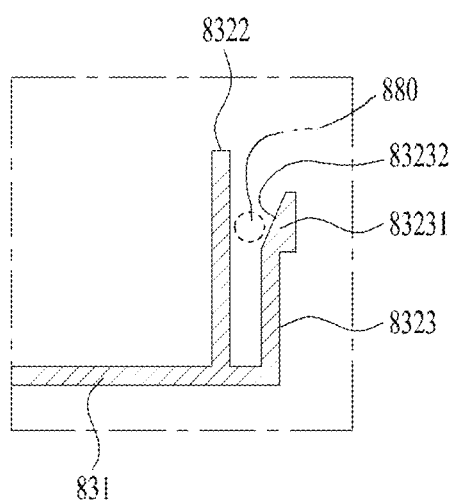
FIG. 35 is a diagram illustrating a cross-sectional view taken along line A-A' of FIG. 34.

For example, as shown in FIG. 35, when the duct sealing unit 880 is placed on the cover insert part 8322 so as to be inserted into the duct cover 830 by the sealing jig member 1000, the duct sealing unit-engaging protrusion 83231 can pressurize a part of the duct sealing unit 880 against the cover insert part 8322 so that the duct sealing unit 880 placed on the cover insert part 8322 can be located between the cover insert part 8322 and the cover stepped part 8323.

Further, one surface of the duct sealing unit-engaging protrusion 83231 facing the cover insert part 8322 can be provided as an inclined surface 83232 so that the duct sealing unit 880 is slidably moved along the inclined surface 83232 when the duct sealing unit 880 is pressurized by the sealing jig member 1000 so as to be moved to the space between the cover insert part 8322 and the cover stepped part 8323.

The inclined surface 83232 can be formed such that the distance between the cover insert part 8322 and the inclined surface 83232 at the end of the duct sealing unit-engaging protrusion 83231 is greater than the distance between the cover insert part 8322 and the cover stepped part 8323, and the distance between the cover insert part 8322 and the inclined surface 83232 gradually decreases as the distance from the space between cover insert part 8322 and the cover stepped part 8323 decreases.

Therefore, when the duct sealing unit 880 is placed on the cover insert part 8322 and is pressurized by the sealing jig member 1000, the duct sealing unit 880 located at the concave corners of the cover insert part 8322 can be guided to the space between the cover insert part 8322 and the cover stepped part 8323 by the duct sealing unit-engaging protrusions 83231 and the inclined surfaces 83232 of the duct sealing unit-engaging protrusions 83231, and can thus be smoothly inserted into the space between the cover insert part 8322 and the cover stepped part 8323.

As is apparent from the above description, a laundry treating apparatus can shorten an assembly process of a duct cover along which air discharged from a drum is transferred.

Further, a laundry treating apparatus can integrally form a duct cover coupled to the upper part of a supply duct to which air discharged from a drum is transferred.

Further, a laundry treating apparatus can include a duct sealing unit provided between a supply duct and a duct cover so as to prevent air in the supply duct from leaking.

Further, a laundry treating apparatus can easily place a duct sealing unit on a duct cover.

What is claimed is:
1. A laundry treating apparatus comprising:
  a cabinet defining an opening at a front portion of the cabinet;
  a drum rotatably provided in the cabinet and having an inlet configured to receive laundry;
  a base provided below the drum and defining a space configured to move air in the drum; and
  a motor that is (i) disposed behind the drum, (ii) spaced apart from the base, and (iii) configured to provide power to rotate the drum,
  wherein the base comprises:
    a supply duct in fluid communication with the drum and configured to receive air from the drum and move the air to the drum,
    a heat exchange unit provided in the supply duct and comprising (i) a first heat exchanger configured to cool the air and (ii) a second heat exchanger spaced apart from the first heat exchanger and configured to heat the air cooled by the first heat exchanger,
    a duct cover (i) coupled to an upper portion of the supply duct, (ii) covering the first heat exchanger and the second heat exchanger, and (iii) defining an inflow communication hole through which the supply duct and the drum are in fluid communication with each other,
    a duct sealing unit disposed between the supply duct and the duct cover and configured to block the air in the supply duct from leaking through the duct cover, and
    a sealing mount part provided on a first surface of the duct cover facing the supply duct and configured to receive the duct sealing unit,
    wherein the sealing mount part comprises:
      a first sealing mount part extending along a circumference of the duct cover, and
      a second sealing mount part surrounding at least a portion of the inflow communication hole,
      wherein the first sealing mount part is in fluid communication with the second sealing mount part, and the duct sealing unit, the first sealing mount part, and the second sealing mount part are integrally provided as one body.

2. The laundry treating apparatus according to claim 1, wherein the duct cover comprises:
  a duct cover body provided above the supply duct and covering an inside of the supply duct, and
  a duct cover extension extending from an outer surface of the duct cover body along a circumference of the duct cover body and coupled to the supply duct.

3. The laundry treating apparatus according to claim 2, wherein the sealing mount part is provided on the duct cover extension such that an upper end of the supply duct is inserted into the sealing mount part.

4. The laundry treating apparatus according to claim 3, wherein:
  the supply duct comprises a duct coupling part extending upward from the base and inserted into the sealing mount part, and
  the duct sealing unit is provided between the duct coupling part and the sealing mount part.

5. The laundry treating apparatus according to claim 4, wherein:
  the duct coupling part has a thickness equal to a thickness of the sealing mount part, and
  the duct sealing unit is inserted into the sealing mount part so as to contact the duct coupling part.

6. The laundry treating apparatus according to claim 4, wherein the duct cover extension comprises:
  a cover insert part that (i) extends in a thickness direction from an inner circumferential surface of the sealing mount part and (ii) is inserted into the supply duct, and
  a cover stepped part extending in the thickness direction from an outer circumferential surface of the sealing mount part and coupled to the duct coupling part along an outer surface of the duct coupling part.

7. The laundry treating apparatus according to claim 6, wherein the duct coupling part couples the cover insert part to the cover stepped part.

8. The laundry treating apparatus according to claim 7, wherein a length of the cover insert part extending in the thickness direction from the sealing mount part is greater than a length of the cover stepped part extending in the thickness direction from the sealing mount part.

9. The laundry treating apparatus according to claim 4, wherein the supply duct comprises:
  a transfer duct extending upward from the base and configured to accommodate the first heat exchanger and the second heat exchanger, and
  an inflow duct that (i) extends forward from transfer duct and (ii) is in fluid communication with the inflow communication hole so that air discharged from the drum is supplied to the inflow duct.

10. The laundry treating apparatus according to claim 9, wherein the duct sealing unit is provided along circumferences of the transfer duct and the inflow duct.

11. The laundry treating apparatus according to claim 10, wherein the duct cover body comprises:
- a shield cover body coupled to an upper portion of the inflow duct and covering the first heat exchanger and the second heat exchanger, and
- a communication cover body extending forward from the shield cover body, coupled to an upper portion of the inflow duct, and defining the inflow communication hole.

12. The laundry treating apparatus according to claim 11, wherein the duct sealing unit is provided along circumferences of the shield cover body and the communication cover body.

13. The laundry treating apparatus according to claim 11, wherein the duct sealing unit comprises:
- a first duct sealing part provided between the shield cover body and the transfer duct and configured to block air in the transfer duct from leaking through the shield cover body, and
- a second duct sealing part provided between the communication cover body and the inflow duct and configured to block air in the inflow duct from leaking through the communication cover body.

14. The laundry treating apparatus according to claim 13, wherein the first duct sealing part and the second duct sealing part are integrally provided as one body.

15. The laundry treating apparatus according to claim 13, wherein the second duct sealing part surrounds at least a portion of the inflow communication hole and is configured to block the air discharged from the drum from leaking through the inflow communication hole.

16. The laundry treating apparatus according to claim 13, wherein:
- the first sealing mount part is provided along a circumference of the shield cover body so that the first duct sealing part is inserted into the first sealing mount part, and
- the second sealing mount part is provided along a circumference of the communication cover body so that the second duct sealing part is inserted into the second sealing mount part.

17. The laundry treating apparatus according to claim 16, wherein the first sealing mount part and the second sealing mount part provide a continuous surface.

18. The laundry treating apparatus according to claim 16, wherein:
- an upper end of the transfer duct is inserted into the first sealing mount part, and
- the first duct sealing part is (i) provided between the first sealing mount part and the upper end of the transfer duct and (ii) configured to block air in the transfer duct from leaking through the shield cover body.

19. The laundry treating apparatus according to claim 16, wherein:
- an upper end of the inflow duct is inserted into the second sealing mount part, and
- the second duct sealing part is (i) provided between the second sealing mount part and the upper end of the inflow duct and (ii) configured to block air in the inflow duct from leaking through the communication cover body.

20. The laundry treating apparatus according to claim 6, wherein the cover stepped part includes a plurality of duct sealing unit-engaging protrusions configured to press the duct sealing unit against the cover insert part.

* * * * *